(12) United States Patent
Wood et al.

(10) Patent No.: US 9,440,177 B2
(45) Date of Patent: Sep. 13, 2016

(54) CRANKCASE VENTILATION FILTER SYSTEMS; COMPONENTS; FEATURES; AND, METHODS OF ASSEMBLY AND USE

(75) Inventors: Robert Wood, Hoeilaart (BE); Gert Willems, Wilsele (BE)

(73) Assignee: Donaldson Company, Inc., Minneapolis, MN (US)

(*) Notice: Subject to any disclaimer, the term of this patent is extended or adjusted under 35 U.S.C. 154(b) by 0 days.

(21) Appl. No.: 14/126,674

(22) PCT Filed: Jun. 29, 2012

(86) PCT No.: PCT/US2012/045019
§ 371 (c)(1),
(2), (4) Date: Mar. 5, 2014

(87) PCT Pub. No.: WO2013/003762
PCT Pub. Date: Jan. 3, 2013

(65) Prior Publication Data
US 2014/0215982 A1    Aug. 7, 2014

Related U.S. Application Data

(60) Provisional application No. 61/503,063, filed on Jun. 30, 2011, provisional application No. 61/664,340, filed on Jun. 26, 2012, provisional application No. 61/665,501, filed on Jun. 28, 2012.

(51) Int. Cl.
*B01D 39/00* (2006.01)
*B01D 46/00* (2006.01)
(Continued)

(52) U.S. Cl.
CPC ..... *B01D 46/2411* (2013.01); *B01D 2265/021* (2013.01); *B01D 2265/026* (2013.01); *B01D 2271/027* (2013.01); *B01D 2279/35* (2013.01); *F01M 2013/0438* (2013.01)

(58) Field of Classification Search
CPC .................... B01D 46/2411; B01D 2265/021; B01D 2265/026; B01D 2271/02; B01D 2279/35; F01M 2013/043
See application file for complete search history.

(56) References Cited

U.S. PATENT DOCUMENTS

| 5,882,367 | A |   | 3/1999  | Morgan et al. |
|-----------|---|---|---------|---------------|
| 6,161,529 | A | * | 12/2000 | Burgess ................ F01M 13/04 123/572 |
| 6,638,332 | B1 |  | 10/2003 | Schmitz et al. |

(Continued)

FOREIGN PATENT DOCUMENTS

| EP | 1 382 810   | 1/2004 |
|----|-------------|--------|
| WO | WO 99/37386 | 7/1999 |

(Continued)

OTHER PUBLICATIONS

Exhibit A, claims in U.S. Appl. No. 14/127,081.
(Continued)

*Primary Examiner* — Amber R Orlando
(74) *Attorney, Agent, or Firm* — Merchant & Gould P.C.

(57) ABSTRACT

Crankcase ventilation filter assemblies are described and shown. Components, features and methods of assembly and use are described. Many of the principles relate to preferred cartridge configurations for engagement with selected housings. Selected optional features described can be used to provide indication to a service provider that a proper cartridge is not positioned appropriately in the housing for use.

19 Claims, 54 Drawing Sheets

(51) Int. Cl.
   *B01D 46/24* (2006.01)
   *F01M 13/04* (2006.01)

(56) References Cited

U.S. PATENT DOCUMENTS

| | | | |
|---|---|---|---|
| 6,792,925 B2 * | 9/2004 | Dworatzek | B01D 46/0087 |
| | | | 123/573 |
| 6,918,939 B2 | 7/2005 | Dworatzek et al. | |
| 8,404,014 B2 * | 3/2013 | Israel et al. | B01D 39/1623 |
| | | | 55/385.3 |
| 2001/0054418 A1 | 12/2001 | Burgess | |
| 2008/0245037 A1 | 10/2008 | Rogers et al. | |
| 2009/0071111 A1 | 3/2009 | Lundgren et al. | |
| 2010/0031940 A1 * | 2/2010 | Mosset | B01D 46/004 |
| | | | 123/573 |
| 2011/0017155 A1 * | 1/2011 | Jacob | B01D 46/0031 |
| | | | 123/41.86 |
| 2012/0167534 A1 * | 7/2012 | Munkel | B01D 46/0031 |
| | | | 55/385.3 |

FOREIGN PATENT DOCUMENTS

| | | |
|---|---|---|
| WO | WO 2006/084282 | 10/2006 |
| WO | WO 2008/157251 | 12/2008 |

OTHER PUBLICATIONS

International Search Report for PCT/US2012/045019 mailed Sep. 28, 2012 (6 pages).

* cited by examiner

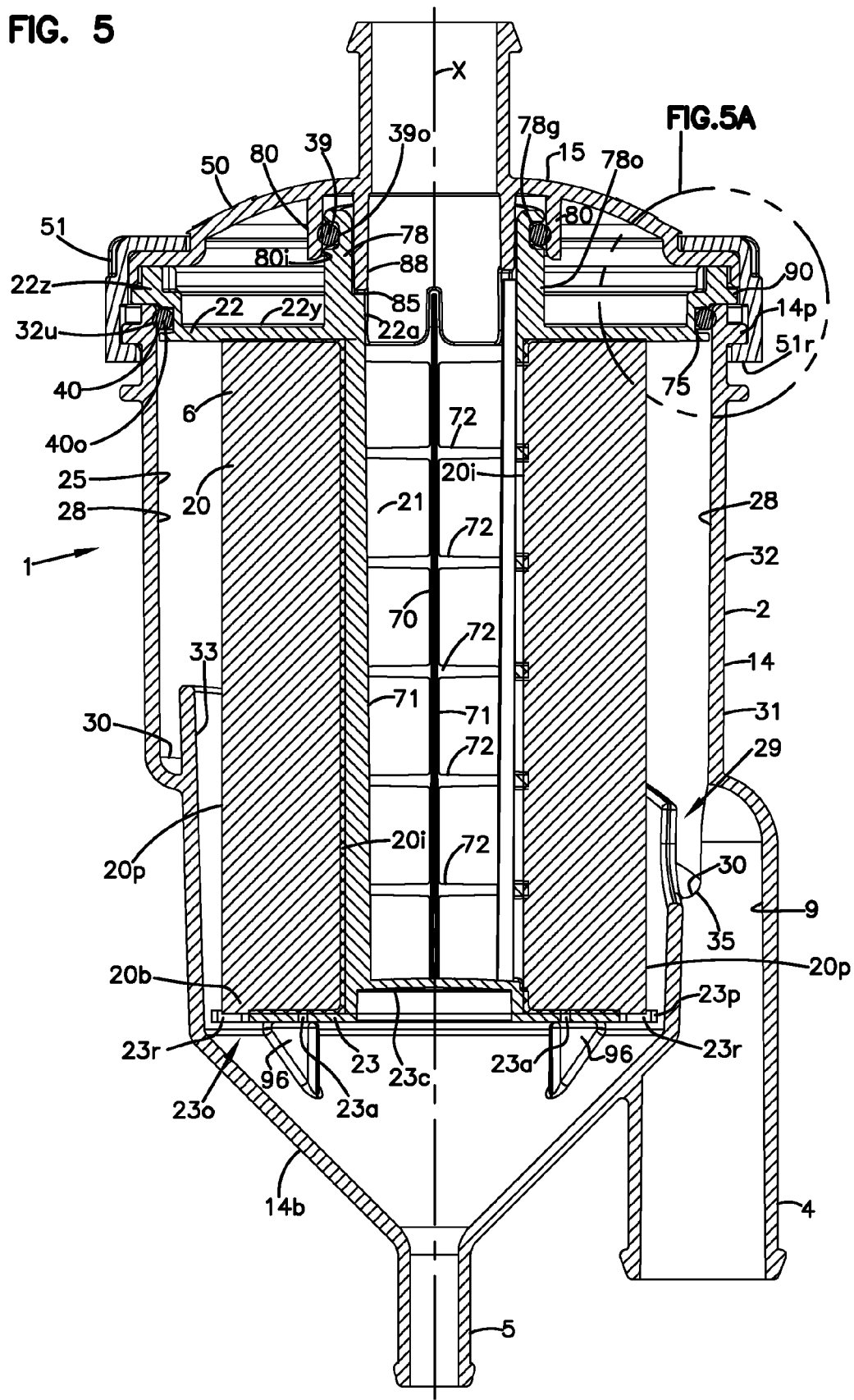

CRANKCASE VENTILATION FILTER SYSTEMS; COMPONENTS; FEATURES; AND, METHODS OF ASSEMBLY AND USE

CROSS-REFERENCE TO RELATED APPLICATIONS

This application is being filed on 13 Dec. 2013, as a US National Stage of PCT International Patent application No. PCT/US2012/045019, filed 29 Jun. 2012 in the name of Donaldson Company, Inc., a U.S. national corporation, applicant for the designation of all countries except the US, Robert Wood and Gert Willems, both citizens of Belgium, applicants for the designation of the US only and claims priority to U.S. Provisional Application Ser. No. 61/503,063, filed 30 Jun. 2011, U.S. Provisional Application Ser. No. 61/664,340, filed 26 Jun. 2012, and U.S. Provisional Application No. 61/665,501, filed 28 Jun. 2012. PCT/US2012/045019, U.S. 61/503,063, U.S. 61/664,340 and U.S. 61/665,501 are incorporated herein by reference. To the extent appropriate, a claim of priority is made to each of the above disclosed applications.

The present application also includes the disclosure of U.S. provisional 61/664,340 filed Jun. 26, 2012. The complete disclosure of U.S. 61/664,340 is incorporated herein by reference.

The invention disclosed herein is also implemented in one of the embodiments described in U.S. Ser. No. 61/665,501 filed Jun. 28, 2012. The complete disclosure of U.S. Ser. No. 61/665,501 is incorporated herein by reference.

A claim of priority is made to each of U.S. Ser. Nos. 61/503,063; 61/664,340; and, 61/665,501, to the extent appropriate.

This application is being filed on 29 Jun. 2012, as a PCT International Patent application in the name of Donaldson Company, Inc., a U.S. national corporation, applicant for the designation of all countries except the US, Robert Wood and Gert Willems, both citizens of Belgium, applicants for the designation of the US only.

FIELD OF THE DISCLOSURE

This disclosure relates to systems and methods for separating hydrophobic fluids (such as oils) which are entrained as aerosols in gas streams, for example in crankcase ventilation filter gases. Further, the arrangements also provide for filtration of other contaminants such as carbon soot material from the gas streams. The arrangements are typically used to filter crankcase ventilation gases, from engine systems. Methods for conducting the separations are also provided. Techniques, assemblies, components and methods are described, to help ensure: that a filter cartridge is positioned within a crankcase ventilation filter assembly during use; and, that the cartridge is a proper filter cartridge for the system of use and is properly positioned and sealed for use.

BACKGROUND

Certain gas streams, such as engine blow-by gases (i.e., crankcase ventilation gases, from the crankcases of the diesel engines) carry substantial amounts of entrained oils (liquid) therein, as aerosol. The majority of the oil (liquid) droplets within the aerosol are often within the size of 0.1-5.0 microns. In addition, such gas streams also carry substantial amounts of fine particulate contaminant, such as carbon contaminant (soot).

In some systems, it is desirable to vent such gases to the atmosphere. In general it is preferred that before the gases are vented to the atmosphere, they be cleaned of a substantial portion of aerosol and/or organic particulate contaminate therein.

In other instances, it is desirable to direct the air or gas stream into equipment. Such systems are sometimes referenced as "closed" crankcase ventilation systems. With such closed systems, it may be desirable to separate aerosolized liquids and/or particulates from the gas stream during circulation, in order to provide such benefits as: reduced negative effects in the downstream equipment; improved efficiencies; recapture of otherwise lost oil; and/or, to address environmental concerns.

Improvements in crankcase ventilation filter systems (i.e., blow-by gas filtration systems) constructed for application with a variety of engine or equipment systems, are generally sought.

SUMMARY

According to the present disclosure, crankcase ventilation filter assemblies; components; features; and, methods of assembly and use are provided. In certain example arrangements, among the components are filter cartridges which comprise media positioned around a central cartridge axis and adjacent a first end piece. In examples depicted, first and second axially (vertically in use) spaced seals or seal members are provided on the first end piece. A second end piece (typically closed, although alternatives are possible) is often (and typically) positioned adjacent a second end of the media.

As indicated herein below, unless otherwise stated, there is no specific requirement that the first and second vertically spaced seals or seal members be separately molded seal members, i.e. they can be portions of an integral molded construction. However, in typical example assemblies using principals according to the present disclosure, it will be convenient to have the referenced first and second vertically (i.e. axially) spaced seals or seal members comprise separate molded seal members. In an example, they each comprise o-rings, but alternatives are also described and shown.

The first and second vertically spaced seals or seal member can be, independently of one another, be a radially directed seal, or an axially directed seal, or can include segments of both. The two seals can be used to provide advantageous positioning of the cartridge, within an assembly, and to help ensure that the cartridges are a proper cartridge for the assembly. Indeed, the assembly can be configured so that if the two seals are not properly in place, the service provider will immediately know that the cartridge is the wrong one for the assembly. Also, the assembly can be configured so that if the cartridge with the appropriate seal is not in place, the service provider will immediately know this, when an attempt is made to lock close the access cover.

In a general characterization of techniques according to the present disclosure, there is no specific requirement as to whether there is or is not a third seal positioned between the first and second vertically spaced seals or seal member. In at least one depicted embodiment herein there is no such third seal; and, in at least depicted embodiment there is such a third seal.

Also according to the present disclosure, filter cartridges are described and depicted which can (optionally in some instances) include a housing base/access cover spacer arrangement thereon. Such a spacer arrangement on the cartridge is used to space apart the access cover and the housing base, in a crankcase ventilation filter assembly: sufficiently for a tight engagement between the base and access cover; and, so that if the cartridge is not present, the service cover will not properly tighten onto the housing base. The examples depicted are particularly configured for use when the access cover is mounted to the housing base with a rotational interlock arrangement such as: a threaded mounted ring; or, mounting ring with a non-threaded engagement arrangement. Variations are described.

In advantageous arrangements according to the present invention, filter cartridges are provided that include both the referenced first and second vertically, i.e. axially, spaced seals or seal members; and, the housing base/access cover spacer arrangement. However, advantages in some applications can be obtained when only one of the features is present.

Housing arrangements for use with crankcase ventilation filter assemblies are described. The housing arrangements generally include a gas flow inlet arrangement, a gas flow outlet arrangement and a coalesced liquid drain arrangement. Optional features to facilitate condensed water drain (i.e. for a condensation drain arrangement) are also depicted and described.

According to the present disclosure, optional but advantageous arrangements are provided to accommodate preferred rotational orientation between a filter cartridge and a housing base in use; such features are generally referenced herein as comprising a housing base/filter cartridge (or filter cartridge/housing base) rotational alignment arrangement, or by similar terms. In an example depicted, the projection/receiver arrangement is used in which a lower portion of the filter cartridge is provided with a perimeter shape that can only be installed in a housing base in a selected rotational orientation, or interference between the two will occur. This housing base/filter cartridge rotational alignment arrangement can be implemented with selected ones of the features described above, or be implemented in alternate arrangements.

Also, in the disclosure presented herein, an optional, but advantageous, access cover/filter cartridge (or filter cartridge/access cover) rotational alignment arrangement is described. This arrangement is applicable to provide for selected rotational alignment between the access cover and the cartridge, during assembly, or the access cover will not properly install on the housing. In examples described herein, this arrangement is provided by projection/receiver arrangement that can only properly engage in a single selected rotational orientation between the two components. The access cover/filter cartridge rotational alignment arrangement can be implemented with selected ones of the features described above, or alternate arrangements if desired.

There is no specific requirement that a crankcase ventilation filter assembly, component or method of assembly or use involve all of the features of characterized herein, in order to obtain some benefit according to the present disclosure. The embodiments depicted are meant to be examples only, and indicate a wide variety of environments and structural features that are possible.

It is noted that multiple embodiments are described. To the extent appropriate, each embodiment can be implemented with selected features from one or more of the other embodiments. The embodiments are not meant to be mutually exclusive, then, with respect to the features depicted.

BRIEF DESCRIPTION OF THE DRAWINGS

FIG. 5 is a schematic cross-sectional view of the assembly of FIG. 1, taken generally along line 5-5, FIG. 4.

DETAILED DESCRIPTION

I. General

As indicated previously, the present disclosure generally relates to crankcase ventilation filter assemblies, components, features thereof, and methods of assembly and use. A typical crankcase ventilation filter assembly according to the present disclosure comprises a housing having a serviceable filter cartridge therein, i.e. a filter cartridge that can be removed and be replaced within the housing, without damage to the housing or the cartridge. Typically, the housing comprises a housing base and a removable access cover. Among the features and principles described herein, are features and principles that relate to helping a service provider immediately understand if a filter cartridge is not appropriately installed in a housing, when the access cover is positioned. A number of embodiments depicting such features are described. Many of the features are particularly adapted for use in a system, in which the access cover includes a rotatable mounting ring, for engagement with a housing, whether that rotational engagement is through a threaded connection or non-threaded connection.

It is noted that there are also features described that relate to ensuring that a proper filter cartridge for the assembly is used and is properly positioned for appropriate use when installed in the housing.

Numerous other features are described in connection with certain of the embodiments that can be used together with features that help indicate that a cartridge is not properly installed, or which can be used independently of such features.

There is no specific requirement that a crankcase ventilation filter assembly or feature, component, or method of assembly or use, include all of the features and characteristics described and depicted in detail, in order to obtain some benefit according to the present disclosure.

II. A First Embodiment

FIGS. 1-27

Figure 1:
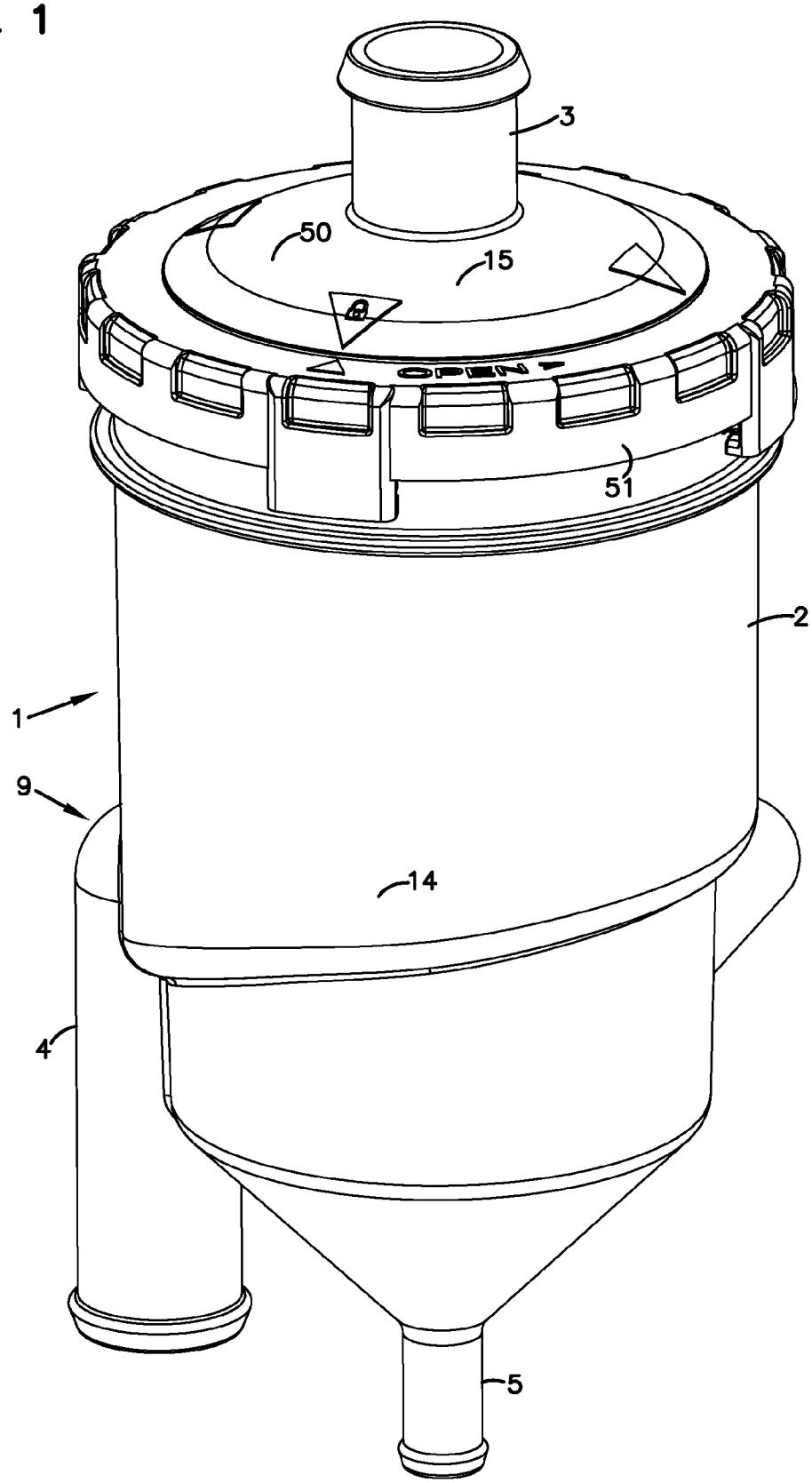
FIG. 1 is a schematic top perspective view of a first crankcase ventilation filter assembly according to the present disclosure.

A first embodiment of a crankcase ventilation filter assembly according to the present disclosure is depicted in FIGS. 1-27. Referring first to FIG. 1, at 1 the crankcase ventilation filter assembly is generally depicted. The assembly 1 generally comprises a housing 2 having: a gas flow inlet arrangement 3, gas flow outlet arrangement 4, and a coalesced liquid (oil) drain outlet arrangement 5. Within the housing 2 is generally depicted a serviceable filter cartridge 6 (not shown in FIG. 1 see the cross-sectional views of FIGS. 5 and 6; and, the cartridge views of FIGS. 23-26, discussed below).

In general operation, engine blowby or crankcase ventilation filter gases from an engine system with which the assembly 1 is used, are directed into the housing 2 through the gas flow inlet arrangement 3. Within the housing 2, the gases are passed into filter media of an internally received serviceable filter cartridge 6. Within the media, the gases are filtered. Oil coalesces within the media of the cartridge 6 and is drained outwardly from the cartridge 6, and eventually from housing 2 through a coalesced liquid (oil) drain outlet arrangement 5. Outlet drain arrangement 5, then, is a coalesced oil drain and is generally connected to housing or ducting which will direct the liquid (oil) to a sump or other location within the system with which the assembly 1 is used. A flow line attached to outlet 5 can include valving therein, to manage the coalesced liquid flow in a desirable manner.

Still referring to FIG. 1, filtered gases that have passed through the internally received cartridge 6 are generally directed outwardly from the assembly 1, through gas flow outlet arrangement 4.

Referring to FIG. 1, it is noted that for the particular crankcase ventilation filter assembly 1 depicted: the gas flow inlet arrangement 3; the gas flow outlet arrangement 4; and, the coalesced liquid drain outlet arrangement 5, are each depicted as a single tube/aperture arrangement in flow communication with an interior of the housing 2. While this is typical, in alternate embodiments the gas flow inlet arrangement 3, the gas flow outlet arrangement 4 and/or the liquid drain outlet arrangement 5 can each, independently, be multiple apertures and/or multiple tubes.

Still referring to FIG. 1, the housing 2 generally comprises a housing base or bottom 14 having, removably secured thereto, an access or service cover arrangement 15. The access or service cover arrangement 15 can be removed from the housing base 14 for service access to an interior of the housing 2. This allows, for example, for installation or removal of an internally positioned filter cartridge 6.

It is noted that for the assembly 1 depicted, connection or mounting interaction between the service cover arrangement 15 and the housing base 14 is a rotational interaction arrangement, i.e. at least a portion of the service cover 15 is rotated relative to the housing base 14, to securely connect the two. This will be typical for arrangements according to the present disclosure, although in some applications of selected techniques described herein alternatives are possible.

Also referring to FIG. 1, it is noted that the gas flow inlet arrangement 3 is depicted as a top gas flow inlet arrangement, directed generally downwardly. This is typical, although alternatives are possible.

Figure 2:
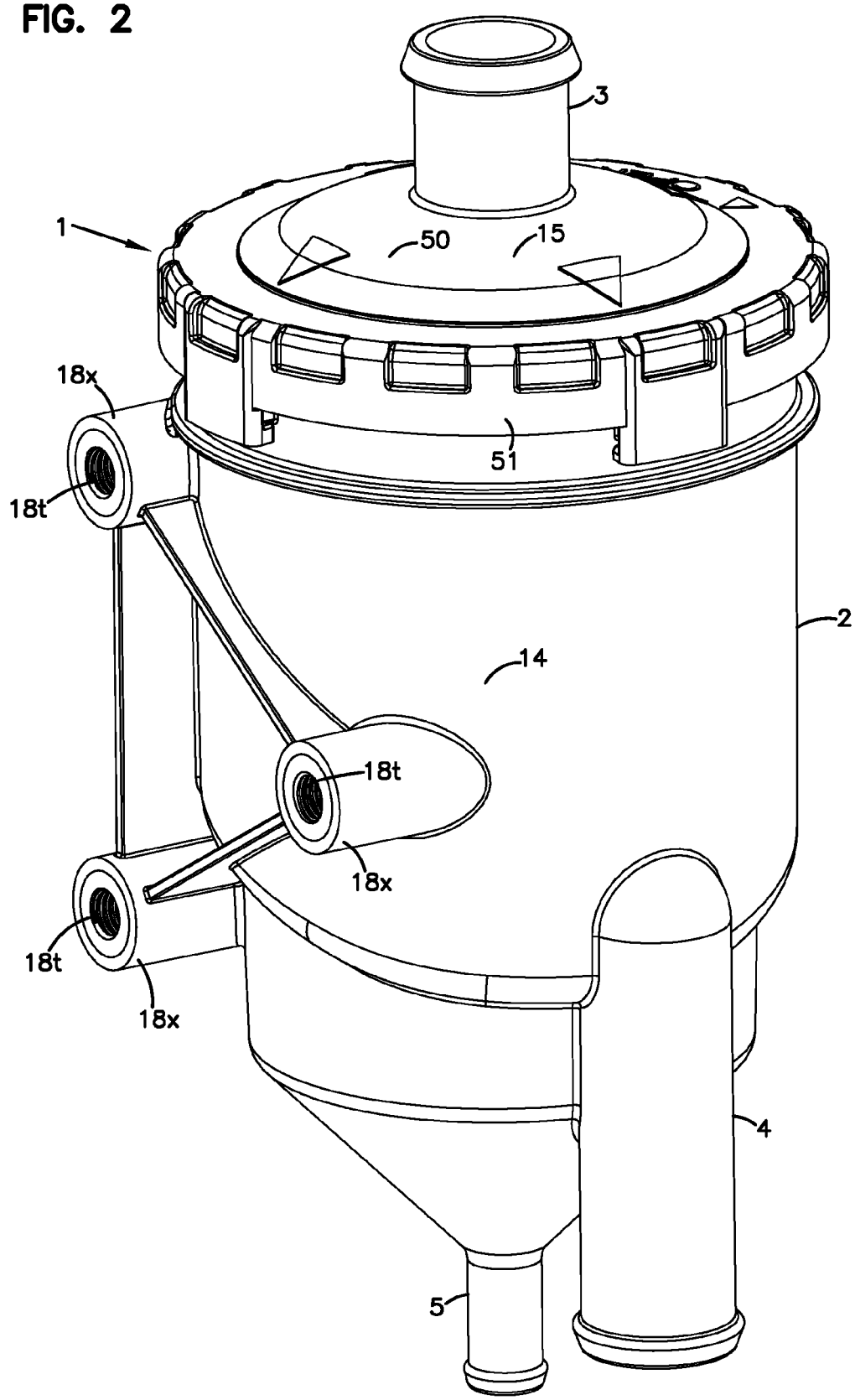
FIG. 2 is a schematic second top perspective view of the assembly of FIG. 1; the view of FIG. 2 being generally a left rear perspective relative to FIG. 1.

In FIG. 2, a second top perspective view of the assembly 1 is provided. The view of FIG. 2 is analogous to FIG. 1; except that the viewer's position is rotated somewhat around the left of FIG. 1. In FIG. 2, a mounting pad arrangement 18 is shown positioned on housing 2, and in particular the housing base 14. The mounting pad arrangement 18 is oriented so that the assembly 1 can be mounted on equipment for use. Mounting pad arrangement 18 can be a custom arrangement designed for a particular equipment system for use. However, it can alternately be a general mounting arrangement for a variety of equipment systems. The particular mounting pad arrangement 18 depicted includes mounting posts or receivers 18*x* oriented appropriately for positioning on the equipment involved. Each is configured to receive a bolt or similar connector arrangement projecting therein, to secure the position of the assembly 14. Threaded metal inserts in the receivers 18*x* can be used for this. There is no specific requirement that the mounting pad arrangement for all applications be similarly positioned, formed, or similarly include three posts on receivers 18*x*.

The particular mounting pad arrangement 18 comprises three posts 18*x* which are molded-in-place as part of housing base 14, as discussed below, and fitted with inserts. Alternatives are possible. Indeed, the housing 2 can be provided without a mounting pad arrangement, and be secured by mounting band or similar arrangement attached thereto during installation. Again, each of the posts 18*x* depicted includes an optional threaded insert member 18*t* inserted therein, for attachment via a bolt.

Figure 3:
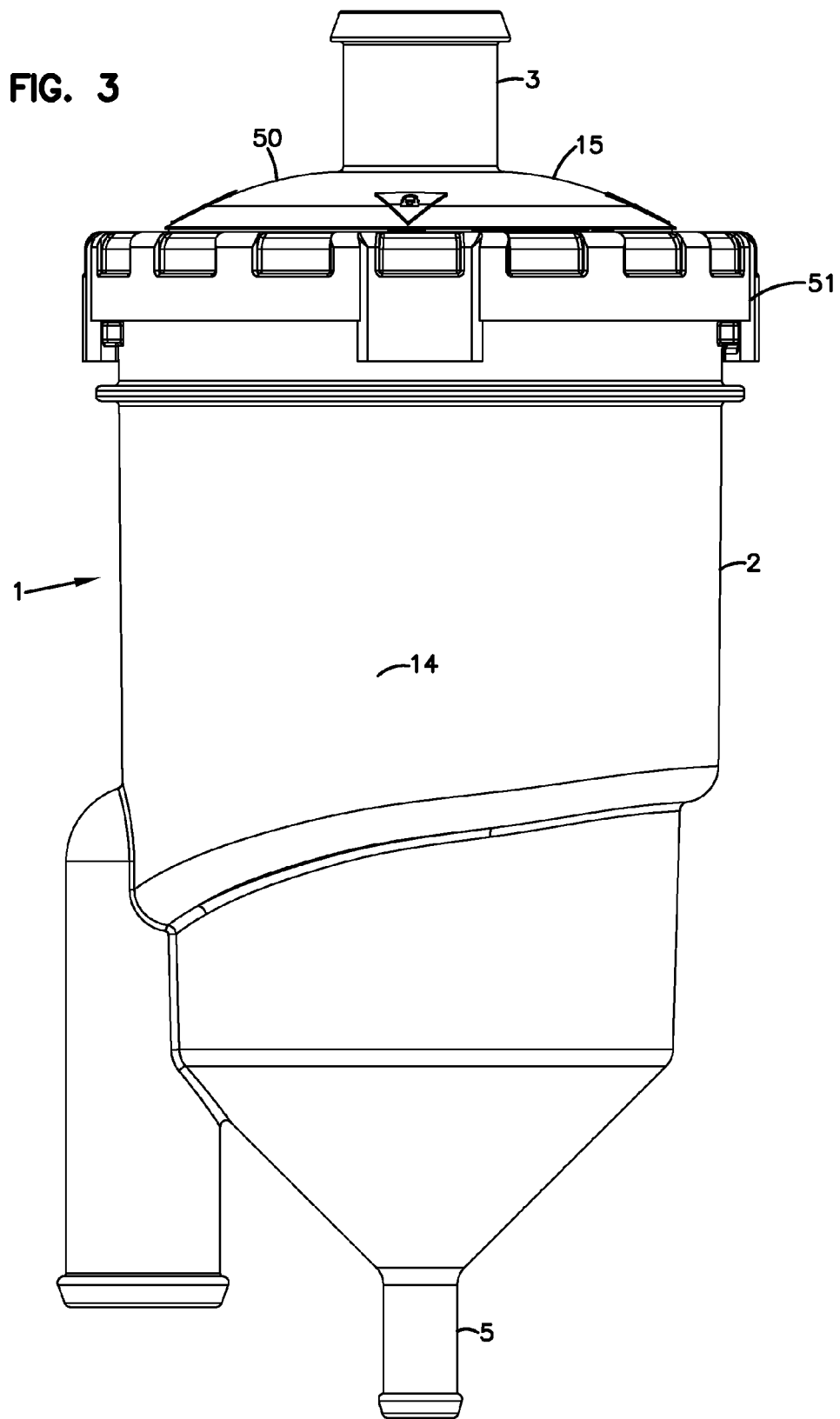
FIG. 3 is a schematic side elevational view of the assembly of FIG. 1.

Attention is now directed to FIG. 3. FIG. 3 is a side elevational view of assembly 1. Features previously characterized generally include: the housing 2, comprising housing bottom 14 and service access cover 15; gas flow inlet 3; coalesced liquid outlet 5; and, gas flow outlet arrangement 4.

Referring to FIGS. 1-3, it is noted that for the particular assembly 1 depicted, the gas flow inlet arrangement 3 is in the service access cover 15; and, the gas flow outlet arrangement 4 and coalesced liquid drain outlet 5 are provided in the housing base 14. Although alternatives are possible, such an arrangement will be typical.

Figure 4:
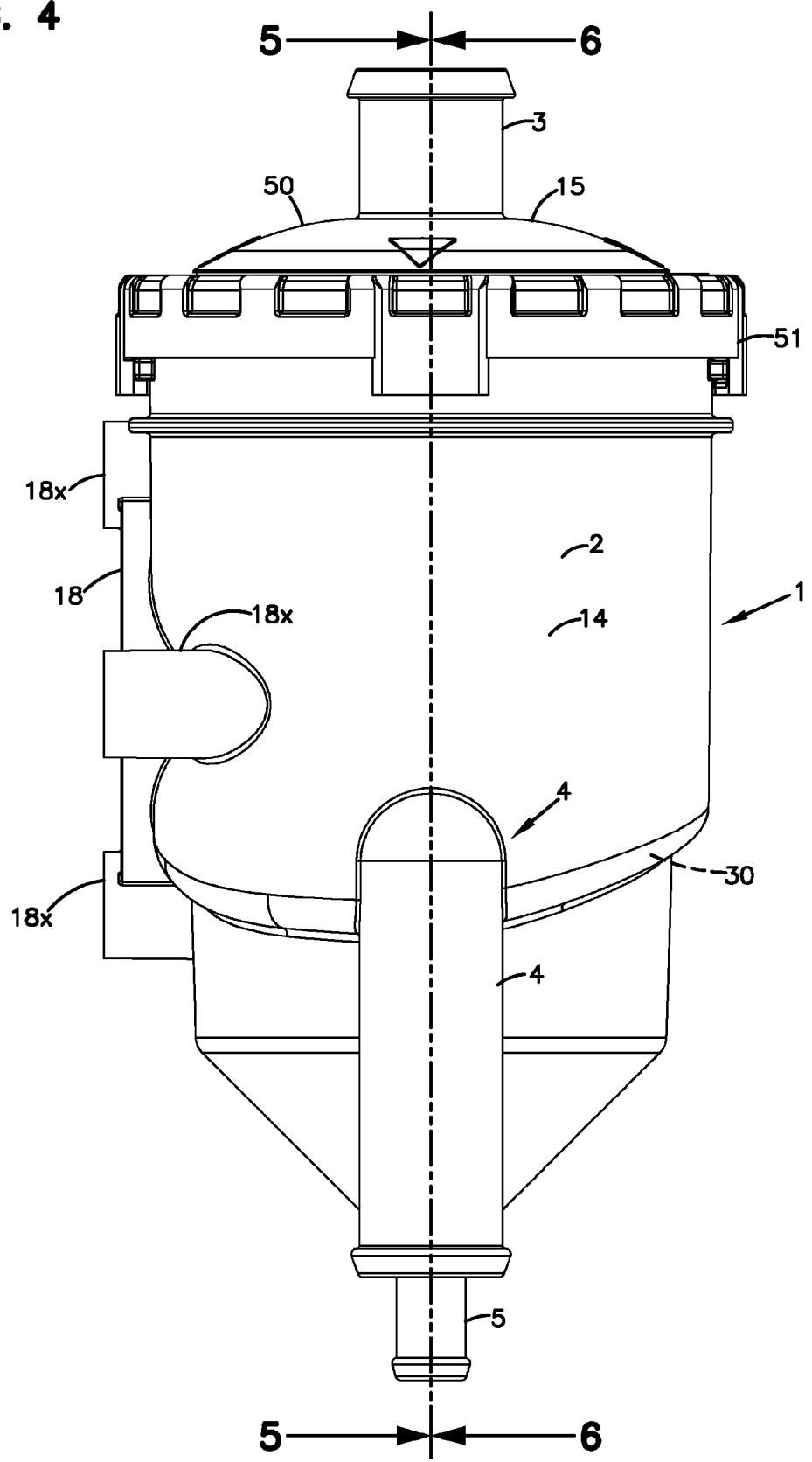
FIG. 4 is a second schematic side elevational view of the assembly of FIG. 1.

Attention is now directed to FIG. 4. FIG. 4 is a side elevational view generally directed toward the gas flow outlet arrangement 4, referenced above. Selected other features previously discussed that are viewable in FIG. 4 include: housing 2, comprising housing base 14 and service access cover 15; gas flow inlet arrangement 3; coalesced liquid drain outlet 5; and, mounting pad arrangement 18 with mounting pads 18*x* thereon.

FIG. 5 is a cross-sectional view taken generally along line 5-5, FIG. 4. In FIG. 5, the cross-sectional view shows cartridge 6, previously identified, operably positioned within interior 2*i* of housing 2.

Referring to FIG. 5, in general the cartridge 6 comprises an extension of media 20 positioned around an open filter interior 21 and positioned in extension between first and second end pieces 22, 23. The media 20 is generally selected for a given application, for filtering and coalescing properties. Example media is discussed below.

Herein, the cartridge 6, housing 2, and/or assembly 1 can be sometimes characterized as having a central axis X. The axis X is indicated in FIG. 5, and is a central, typically vertically oriented in use, axis around which the media 20 is positioned, and which extends vertically through a center or approximate center of the cartridge 6, housing 2, and assembly 1. The axis X is referenced in numerous ones of the figures.

Still referring to FIG. 5, crankcase ventilation filter gases or engine blowby gases are directed into the assembly 1 through inlet arrangement 3. The gases are then directed through flow aperture 22*a* in end piece 22 and into the open filter interior 21. The gases then flow (with filtering) through the media 20 to annulus 25. Annulus 25 is a filtered gas annulus surrounding cartridge 6. In general, annulus 25 is in gas flow communication with filtered gas flow outlet arrangement 4. That is, the filtered gases can pass outwardly from housing 2, through outlet 4.

During operation, within the media 20, liquid carried within the gases will coalesce and develop a liquid head. Under gravity, the liquid will tend to drain outwardly from the media 20 (and cartridge 6). Some of the liquid may reach a downstream (in the example outer) perimeter 20*p*, of the media 20, before it drains downwardly to lower end 14*b* of housing bottom or base 14, and eventually, under gravity influence and prompted by a funnel configuration as shown, to coalesced liquid drain outlet arrangement 5. Some of the liquid can pass directly downwardly through end piece 23, however, through use of a media axial overlap drain arrangement 23*o*. Arrangement 23*o* can comprise a media axial overlap drain arrangement using principles described in WO 2007/053411, incorporated herein by reference.

In more general terms, the cartridge 6 includes media axial overlap drain arrangement 23*o*. The particular media axial overlap drain arrangement 23*o* depicted comprises spaces or apertures in and/or through the second end piece 23 (lower in installation) directly overlapped by an end 20*b* of the media 20. Liquid draining directly downwardly through the media 20 can pass directly downwardly via media axial overlap drain arrangement 23*o*, to reach the bottom 14*b*.

In more general terms, the media axial overlap drain arrangement is an arrangement which allows flow of liquid outwardly from the media 20 directly downwardly, without having to pass outwardly through one of the media flow faces. This could be affected by having a portion of a lower end of the media 20 not closed by the lower end piece 23.

The media axial overlap drain arrangement 23*o* can comprise a variety of optional features. Referring to FIG. 5, one of the features depicted comprises a plurality of recesses 23*r* in an outer perimeter 23*p* of the lower end piece 23, each recess extending radially inwardly to a location directly underneath (i.e. overlapped by) the media 20. The second example feature comprises an aperture arrangement, in the example depicted comprising a plurality of apertures 23*a* through the end piece 23, at a location underneath the media 20, i.e. in axial overlap with the media 20. There is no specific requirement that the media axial overlap drain arrangement 23*o* comprises either or both of the specific features described and depicted. Rather, in general, the term "media axial overlap drain arrangement" 23*o* is meant to refer generally to a drain pathway provided at a location such that at least some liquid coalesced within the media 20 can drain directly downwardly from the media without having to flow through to a media perimeter such as outer perimeter 20*p*. For example, in some instances it could be provided by simply having some or all of the lower end piece 23 not extend radially outwardly as far as the outer perimeter 20*p* of the media 20.

Referring to FIG. 5, it is noted that, in some instances, water vapor carried in the inlet gases entering through inlet tube 3 will tend to condense against an interior surface 28 of housing base or bottom 14. In general, it is preferable to prevent, to the extent reasonable, that condensed water vapor from draining through the coalesced liquid (oil) drain outlet arrangement 5. To inhibit at least a portion of such condensed water vapor from reaching coalesced liquid drain outlet 5, assembly 1 includes a sidewall 32 having an optional coalesced water collection/drainage arrangement 29. The optional condensed water collection/drainage arrangement 28 comprises a drain channel or gutter 30 positioned between upper portion 31 of the sidewall 32 (of housing base portion 14) and an interior flange 33 in base 14, and extending substantially completely around the sidewall 22 and the cartridge 6. The gutter 30 is generally slanted to funnel or channel moisture toward gutter outlet 35 and into water drain outlet arrangement 9. This isolates the collected condensed water from the outlet 5.

In the example depicted, the water drain arrangement 9 also comprises the gas flow outlet arrangement 4. That is, the condensed water directed to the condensed water outlet arrangement 9 is directed outwardly through the gas flow outlet arrangement 4. This will be of particular convenient assembly, when the gas flow outlet 4 is vented downwardly to the atmosphere. It is noted that in some instances, additional structure can be used to manage water flow and drainage.

Referring to FIGS. 4 and 5, it can be seen that should water condense along surface 28, above channel 30, that water will tend to drain downwardly into channel or gutter 30, and be inhibited by flange 33 from reaching lower region 14*b* of base 14 and coalesced liquid drain outlet arrangement 5. This collected water will tend to drain downwardly to outlet 35 and into water drain arrangement 9, FIG. 5. It is noted that the condensed water drain arrangement is optional, but generally advantageous.

In general, the cartridge 6 is provided with a housing seal arrangement. The housing seal arrangement, generally, inhibits gas flow entering the housing from bypassing media 20 and reaching gas flow outlet 4. The housing seal arrangement for the particular assembly 1 depicted can be understood by reference to FIGS. 5 and 6.

Referring to FIG. 5, as indicated previously, the cartridge 6 comprises media 20 positioned between opposite end pieces 22, 23. For the example assembly 1 depicted, the cartridge 6 is provided with a housing seal arrangement comprising first and second housing seals or seal members 39, 40, respectively. In the example depicted, the housing seal arrangement comprises first and second housing seals or seal members 39, 40 each positioned on the first end piece 22. The first end piece is typically a rigid structural member (metal or plastic) which supports the seal members 39, 40.

Also, in the example depicted, the first and second housing seals or seal members 39, 40, are vertically spaced. By the term "vertically spaced" in this context, it is meant that the seals or seal members 39, 40, are spaced vertically from one another, when the cartridge 6 is oriented with central axis X extending vertically. This is the orientation shown in FIG. 5 and is typical for embodiments described herein. Usually, the amount of vertical spacing between seals or members 39, 40 is at least 0.5 mm, usually at least 1 mm, often at least 2 mm, typically at least 5 mm, and typically not more than 50 mm, usually not more than 40 mm, and often not more than 30 mm, although alternatives are possible. Reasons and advantages from vertical spacing will be apparent from further descriptions below.

Typically, the seals or seal members 39, 40 are isolated from one another (i.e. are not integral with one another). By this it is meant that typically each of the two identified seals or members 39, 40 are separately formed, and do not comprise separate portions of the same molded material. Alternately stated, typically and preferably, they are produced independently of one another and are independently mounted. However, the seals or seal members 39, 40, can be formed integral with one another as part of a single overmold or molded section of seal material, with regions appropriately spaced to form the desired seals. Herein, when it is stated that the arrangement includes first and second seals or seal members, it is not meant to be indicated whether the seals or seal members are formed completely separately from one another and are not portions of a single integral region of seal material, unless it is specifically stated or unless it is indicated that each comprises a structure such as an o-ring, which might inherently be separate from one another.

Typically, housing seal or seal member 39 is positioned to releasably seal against a portion of cover assembly 15; and, housing seal or seal member 40 is positioned to releasably seal against a portion of housing base 14, in a housing 2 in which the cover assembly 15 and base 14 are separable from one another. Thus: gas flow that enters through inlet 3 cannot reach outlet 4 without being filtered; and, gas flow that enters through inlet 3 is inhibited from escaping out of the housing 1 between the access cover 15 and the base 14.

Herein, when it is said that a housing seal or seal member is positioned to "releasably seal" it is meant that the seal will be engaged when the cartridge 6 is properly installed in the housing 2, and the seal will disengage when the cartridge 6 is separated from a portion of the housing 2 against which it will seal, without damage to either the housing or the seal.

Figure 11:
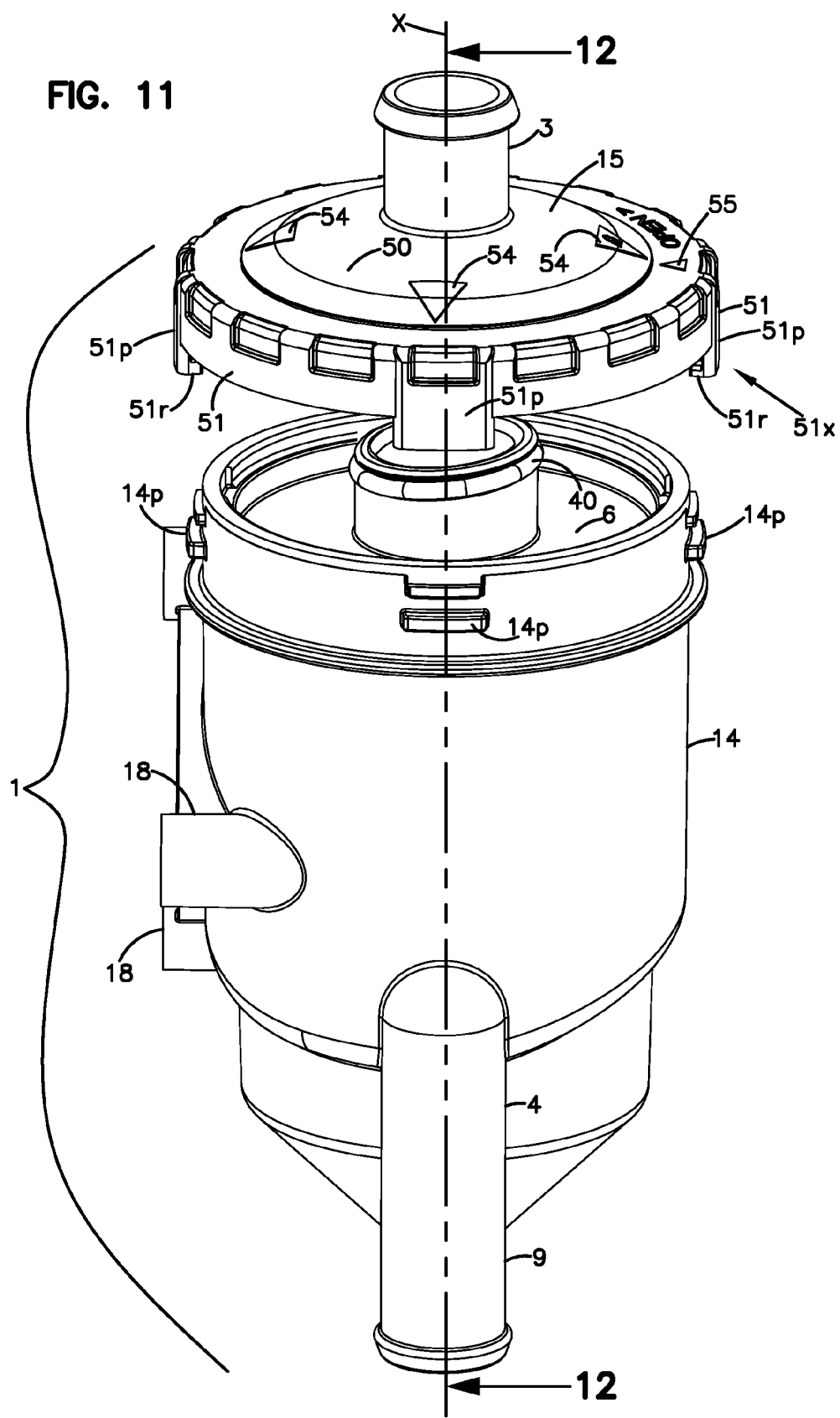
FIG. 11 is a schematic top, perspective, partially exploded view of the assembly of FIGS. 1-11.
Figure 12:
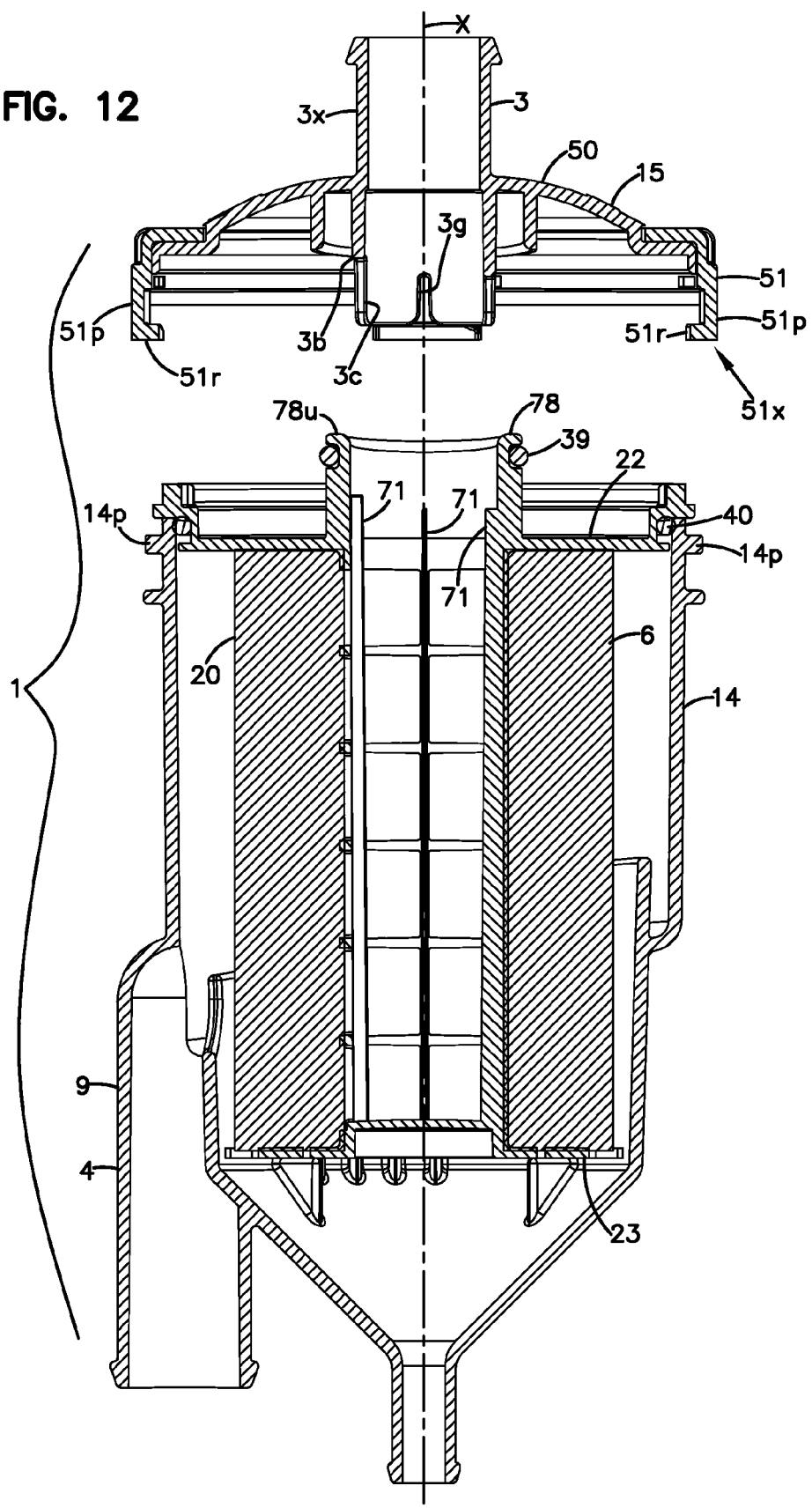
FIG. 12 is a schematic cross-sectional view taken generally along line 12-12, FIG. 11.
Figure 13:
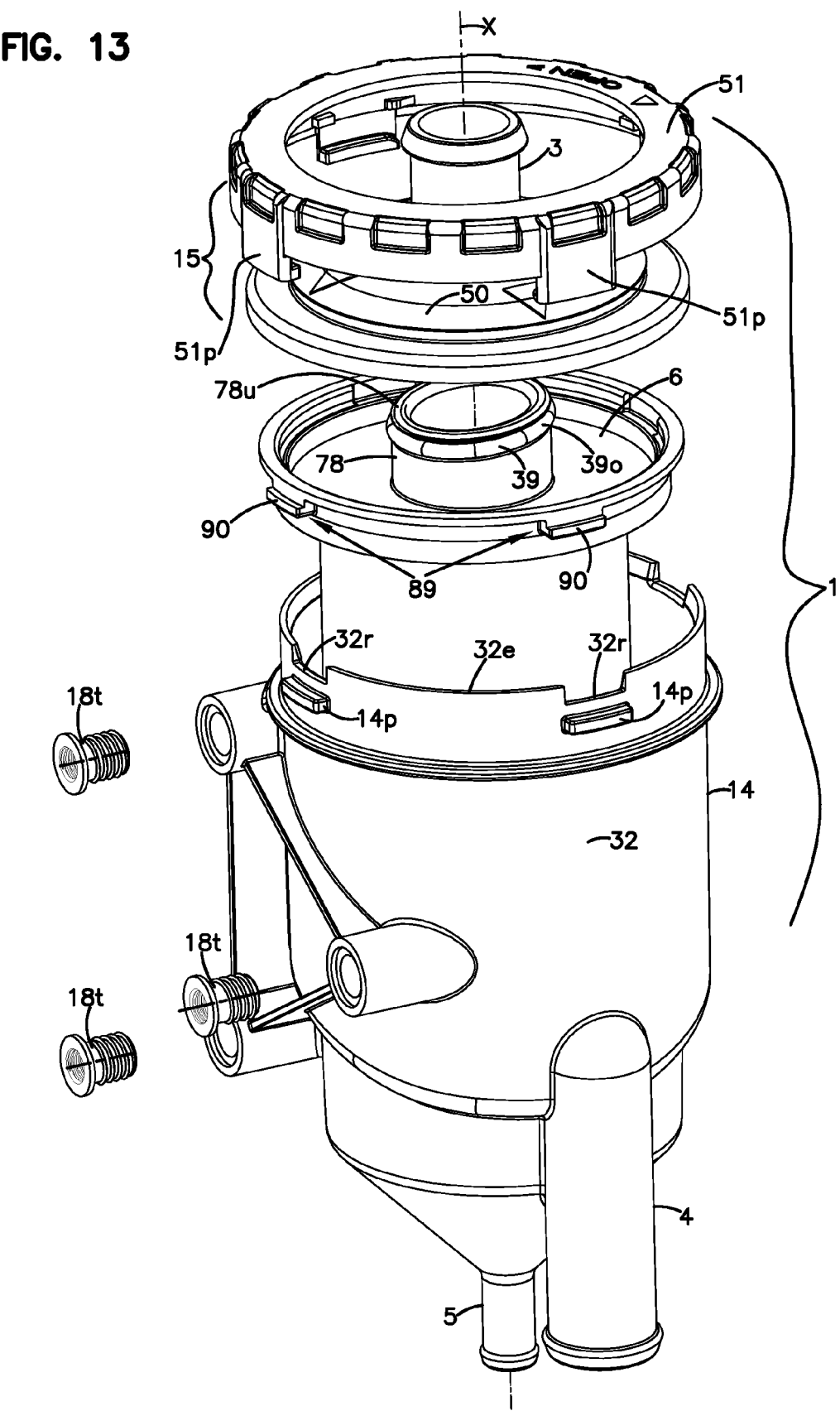
FIG. 13 is a schematic, top, perspective, exploded view of the assembly of FIGS. 1-12.

Attention is now directed to FIGS. 11, 12 and 13, in which various exploded views of the assembly 1 are provided.

Referring to FIG. 11, the assembly 1 is depicted with the cover assembly 15 separated from the housing base 14. Interiorly positioned cartridge 6 can be seen.

It is noted that the cover assembly 15 for the particular assembly 1 depicted, comprises a centerpiece or central cover (portion) 50 and a mounting ring 51. When the service cover assembly 15 is positioned in the assembly 1, the mounting ring 51 is rotatable relative to the centerpiece (central cover) 50. The mounting ring 51 is rotatable between locked (tightened) and unlocked (loosened) positions. When the mounting ring 51 is in the unlocked position, the access cover or cover assembly 15 can be removed from housing base 14. When the mounting ring 51 is rotated to the locked position, (sometimes referenced as a tightened position) the cover or cover assembly 15 cannot be separated from the housing base 14. It is observed that in FIG. 11, the mounting ring 51 is depicted rotated to the locked or tightened position, in the exploded view depicted.

Attention is now directed to FIG. 12. FIG. 12 is a cross-sectional view taken generally along line 12-12, FIG. 11. Referring to FIG. 12, it can be seen that mounting ring 51 includes a lock projection arrangement 51x comprising plurality of locking projections 51p, each having a lower radially inwardly extending projection 51r. After the cover 15 is positioned on the housing base 14, the mounting ring 51 can be rotated until the lower projections 51r are positioned underneath projections 14p on the housing base 14, FIG. 5A. The cartridge 6 and mounting ring 51 can be provided with configurations for an interference fit to inhibit unlocking under vibration of equipment involved, in various circumstances. An example is described below, in connection with FIG. 27.

By comparison of FIGS. 5, 5A, 6, 11 and 12, then, it can be seen that the mounting ring 51 is configured to rotate independently of cover center piece 50, during locking of the access cover 15 in place, and so that after unlocking the entire access cover 15 can be removed. As can be seen by reference to FIG. 11, optional indicia 54 can be provided on the centerpiece 50, with additional indicia 55 provided on the mounting ring 51, configured to operate together to show when locking (or unlocking) has been achieved. This is also viewable in the top perspective view of FIG. 1.

Still referring to FIG. 11, for the example assembly 1 depicted the engagement between the mounting ring 51 (i.e. the service cover assembly 15) and the housing base 14 is through a "non-threaded rotational engagement arrangement." The example rotational engagement arrangement comprises a plurality of holders or locking projections 51p on the ring 51, which align (during loading) with a plurality of projections or holders 14p on the housing base 14, without the engagement using threads. It is noted that the a threaded (rotational) engagement arrangement can be used with many of the principles of the embodiment of FIGS. 1-27, as will be apparent from further descriptions below.

Attention is now directed to the cartridge 6. Referring to FIG. 5, cartridge 6, again, comprises an extension of media 20 positioned between end pieces 22, 23 and surrounding an open filter interior 21. In general, and still referring to FIG. 5, in a typical cartridge 6, the media 20 is positioned surrounding a central cartridge support 70. In the example depicted, the central cartridge support 70 comprises a plurality of longitudinal extensions or ribs 71 interconnected by cross-ribs or radial ribs 72 defining an open porous structure through which gas flow can occur during use.

Although alternatives are possible, typically, the media 20 is a cylindrical construction, positioned around the axis X. The media 20 can be a coiled construction made from/with multiple windings or coils of media, if desired.

Still referring to FIG. 5, the example cartridge 6 depicted is shown with a central cartridge support 70 formed integral with the bottom end piece 23. This is a typical construction, but alternatives are possible.

Also, referring to FIG. 5, the cartridge 6 depicted is shown with the upper end piece 22 formed integral with the central cartridge support 70. This too is typical, although alternatives are possible.

Still referring to FIG. 5, the particular cartridge 6 depicted, is shown with the bottom end piece 23 closed in extension across the open filter interior 21. That is, a central portion 23c of the cartridge 6 is closed, i.e. has no apertures therethrough, although alternatives are possible in some applications of principles described herein. Such a closed end piece 23 is typical for cartridge 6 configured for "in-to-out" flow of gas during filtering, i.e. in which filtering occurs as the gases flow from an interior perimeter 20i of the media pack toward an outer perimeter 20p. As will be understood from descriptions below, many of the features described herein can be applied in an assembly in which the cartridge is configured for flow in an opposite direction, i.e. from "out-to-in" during filtering.

Although alternatives are possible, for a typical cartridge such as cartridge 6 depicted in FIG. 5, the upper end piece 22, central cartridge support 70 and lower end piece 23 will be preformed as a single integral, rigid, molded unit, for example from a plastic. The media would then be applied by coiling around the central cartridge support, and the seal members 39, 40 would be added, to complete construction of the cartridge. Of course, alternatives are possible.

Still referring to FIG. 5, attention is now directed toward first end piece 22. It is noted that for the particular cartridge 6 depicted, no seal member is positioned surrounding the media 20 and no portion of the upper end piece 22 projects downwardly to a location that surrounds the media 20. This is typical, when the cartridge 6 is assembled using a preform or spool as described, with coiling of the media 20 therearound. However, certain of the principles described herein can be applied in alternate arrangements.

In FIG. 5, the first end piece 22 can be seen as being, in the example depicted, at a location above the media 20. This is typical, again, when the cartridge 6 is assembled by using a preform or spool as described, with coiling of the media 20 therearound. However, certain of the principles described herein can be applied in alternate arrangements.

Referring to FIG. 5, the cartridge 6 can be seen as having a perimeter ring 22z on the first end piece 22 that projects upwardly around an outer perimeter of the first end piece 22, and provides for recessed region 22y above the media 20. The perimeter projection 22z is typically a rigid structure, configured, in part, to support one of the seals or seal members 40.

In general, the first end piece 22 includes a central aperture 22a therethrough, which is a gas flow aperture through a center of the end piece 22, typically centered around axis X. In the example assembly depicted, aperture 22a is a gas flow inlet aperture for the cartridge 6, since gas flow to be filtered passes into the cartridge interior 21 through aperture 22a. This is typical with "in-to-out" flow arrangements.

Still referring to FIG. 5, the first housing seals or seal member 39 and the second housings and/or seal member 40 are depicted as separate o-rings 39o, 40o. Although this is typical, alternatives such as molded-in-place seals are possible. That is, there is no specific requirement that one or both of the housing seals or seal members 39, 40, comprise separate o-rings as opposed to alternate seal materials or seal types, whether separate or not. Also, there is no requirement that each of seal members 39, 40 form a single seal, as will be understood from examples below.

Still referring to FIG. 5, it is noted that for the particular cartridge 6 depicted, the first housing seal or seal member 39 is a radially directed seal member. Specifically, in the example seal member 39o is a radially outwardly directed seal member. There is no specific requirement that this be the case, in all applications of principles according to the present disclosure, but it is convenient for the assembly of FIG. 5.

It is also noted that in the example depicted, seal or seal member 40 is also a radially directed seal member. Specifically, in the example, seal member 40o is a radially outwardly directed seal member. Again, while this is typical and convenient, alternative seal types can be used with many of the principles according to the present disclosure.

Herein, a seal member such as each of the housing seals or seal members 39, 40, is referred to as a "radial" seal member, when sealing forces are directed toward or away from the central axis X, i.e. radially relative to the central axis X. The term "outwardly directed" in this context, is meant to refer to a seal member which is positioned on the cartridge 6 to engage a housing portion that surrounds the seal member. An oppositely directed radial seal would sometimes be referred to as a "inwardly directed radial seal" or by similar terms.

In FIG. 5, the first end piece 22 can be seen as having (and in the example depicted, at a location above the media 20) an o-ring groove or seal groove 75, in the perimeter wall 22z in which seal member 40 is positioned. The groove 75 is configured to be used with an o-ring 40o as the seal member 40, and to retain the o-ring in place. The groove 75 is positioned to support the o-ring 40o or housing seal member 40 at an appropriate location to seal with a upper portion 32u of the sidewall 32 (of housing base 14) when the cartridge 6 is properly installed.

For the particular example assembly 1 depicted, and in particular for the cartridge 6 depicted, the housing seal member 40 is positioned in a circular pattern that is defined in a seal plane generally orthogonal to central axis X. While this is not required, it will be typical. Also, typically the housing seal member 40 defines a circular pattern, although alternate non-circular patterns, for example oval or elliptical patterns are possible.

Still referring to the cartridge 6, FIG. 5, first end piece 22 includes thereon, a housing seal support or central tubular projection 78 comprising a tubular extension on the housing seal support 22 projecting in a direction generally away from the media 20. The support 78 is generally a rigid flow collar, and can extend generally parallel to (or aligned with) axis X, although alternate configurations are possible. The support 78 can have a circular cross-sectional outer perimeter, although alternatives are possible.

For the particular cartridge 6 depicted, the support 78 is configured to have mounted, in extension therearound, housing seal or seal member 39. To accommodate this, an outer surface 78o of the support 70 is provided with a receiving groove 78g therein, for housing seal member 39. The housing seal member 39 for the example depicted can comprise an o-ring 39o positioned in groove 78g.

Still referring to FIG. 5, each of the seal members 39, 40, can be characterized as having a largest perimeter cross-sectional dimension. For seal member 40, when circular and in a plane orthogonal to the center axis X, this would generally comprise a seal diameter. However, all that is meant by the term "largest perimeter cross-sectional dimension" is a largest dimension across a perimeter of the seal member.

Seal or seal member 39, which will be understood from discussion below is not (for the example depicted) in a seal plane orthogonal to the central axis X, a largest perimeter cross-sectional dimension of the seal 39 also corresponds a largest dimension across a perimeter of the seal member, but in this case in the seal plane in which the seal 39 sits. Also, the seal member 39, when not in a plane orthogonal to the central axis X, can be projected into a plane that is orthogonal to the central axis X, and the projection can also be characterized as having a "largest" perimeter seal dimension corresponding to that projection into a plane orthogonal to the cartridge central axis.

The first seal member 39 can be characterized as having a largest perimeter seal dimension of $D_1$, and the second seal member 40 can be characterized as having a largest perimeter cross-sectional dimension of $D_2$. For the particular example assembly depicted in the FIG. 5, $D_1 < D_2$. Typically, for such an example construction, $D_1$ it is at least 0.5 mm less than $D_2$, usually at least 1 mm less than $D_2$ often it is at least 10 mm less than $D_2$ and in the example depicted, it is at least 20 mm less than $D_2$ (alternately stated, $D_2$ is at least 0.5 mm greater than $D_1$, usually at least 1 mm greater than $D_1$, typically at least 10 mm greater than $D_1$ and in the example depicted, at least 20 mm greater than $D_1$). Alternates are possible as will be will understood from discussions below.

Still referring to FIG. 5, it is noted that the media 20 has a first outer perimeter 20p. In the example depicted, the second seal member $D_2$ depicted has a larger outer perimeter largest cross-dimension than the media 20, although alternatives are possible. Typically, the second seal member 40 has a largest outer perimeter cross-dimension $D_2$ that is at least 10 mm larger than a largest perimeter cross-dimension of the media 20, usually at least 15 mm larger, although alternatives are possible.

Also, it is noted that, for the example depicted, the largest cross-sectional perimeter dimension $D_1$ for the first seal 39 is smaller than the outer perimeter 20p of the media 20, usually at least 2 mm smaller, often at least 5 mm smaller, although alternatives are possible.

Attention is directed to FIG. 13, in which an exploded perspective view of assembly 1 is depicted. In FIG. 13, a portion of the cartridge 6 is shown, and in particular end piece 22. It can be seen, referring to FIG. 13, that o-ring 39o is planar and is positioned in a plane defined not orthogonal to central axis X, but rather that extends non-perpendicularly thereto. This is discussed further below, in connection with FIGS. 23-27.

Referring back to FIG. 5, housing access cover 15 is provided with a seal collar 80 thereon, for engagement by the housing seal member 40. In the example depicted, the housing seal collar 80 is configured with an interior surface 80i as a seal surface for an outwardly directed radial seal defined by the housing seal member 39. The seal collar 80 is configured in the example depicted, as a portion of the central portion 50 of the service cover arrangement 15.

Still referring to FIG. 5, surrounding an interior of support 78, the end piece 22 is provided with an inner shoulder 85 defined by upper ends of supports 71. The service cover 15, and in particular central piece 51, is provided with a downwardly directed collar portion 88 directed downwardly toward shoulder 85. The collar 88 can comprise a lower, collar portion of inlet arrangement 3, directed downwardly into the housing interior 2i when the housing 2 is assembled. This is discussed further below, in connection with FIGS. 23-27.

Referring to FIG. 13, it is noted that the upper end 78u of the support 78 defines a plane that extends non-orthogonally to the central axis X, FIG. 5, i.e. which is slanted relative to the central axis X. This is typical, although alternatives are possible. It is discussed further below in connection with FIGS. 23-27.

It is noted that the assembly 1 includes an arrangement that helps ensure a service provider would immediately recognize whether or not a cartridge is properly positioned within the housing, as the housing access cover is put in place. This helps ensure that there is not an accidental closure of the housing 2 without the proper cartridge 6 installed therein. It also helps ensure knowledge that any cartridge which has been installed is the proper one (6) for the housing 2 of use. Features which would facilitate this can be understood, in part, by reference to FIG. 13.

Referring to FIG. 13, a top, perspective, exploded view, of the assembly 1 is provided. The housing base 14 can be seen as having a sidewall 32 with an upper tip or edge 32e. The upper edge 32e induces a receiver recess arrangement comprising receiver recesses 32r therein. The receiver recesses 32r can be viewed as spaced recesses or notches in edge 32e. The particular example assembly 1 depicted, includes four recesses 32r, although the number can be varied. Typically, the number of receiver recesses 32r will be at least one (1) usually at least two (2) and usually not more than six (6), although alternatives are possible.

Still referring to FIG. 13, the cartridge 6 includes, on upper end piece 22, a peripheral projection arrangement 89 comprising a plurality of radially outwardly extending projections 90. The cartridge 6 will typically include the same number of projections 90 as the number of recesses 32r in the housing base 14, although alternatives are possible. The projections 90 are generally sized and positioned to engage the recesses 32r, by projecting therein, and typically therethrough, as the cartridge 6 is lowered into the housing base 14, and when the cartridge 6 is appropriately rotated around central axis X to be fully lowered into the housing base 14.

Figure 5A:
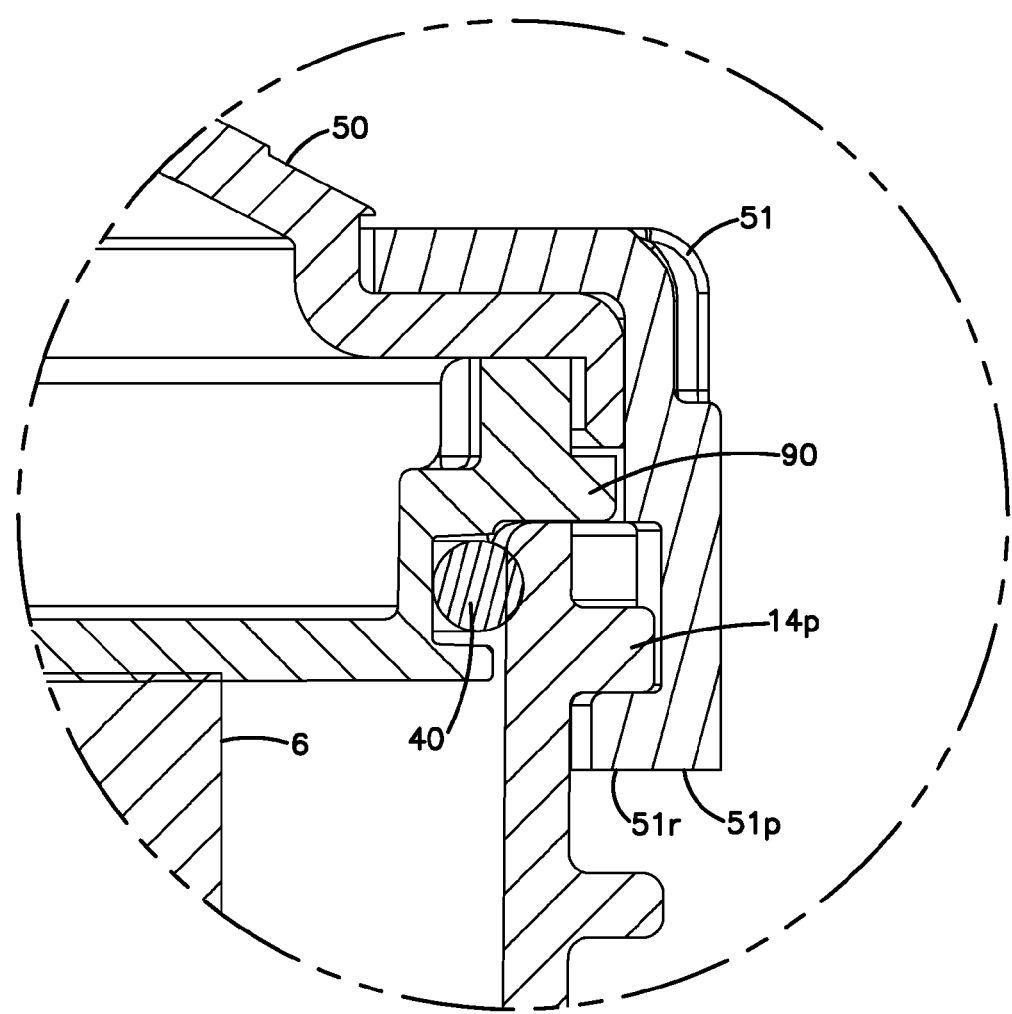
FIG. 5A is a schematic, enlarged, fragmentary view of an identified portion of FIG. 5.
Figure 6:
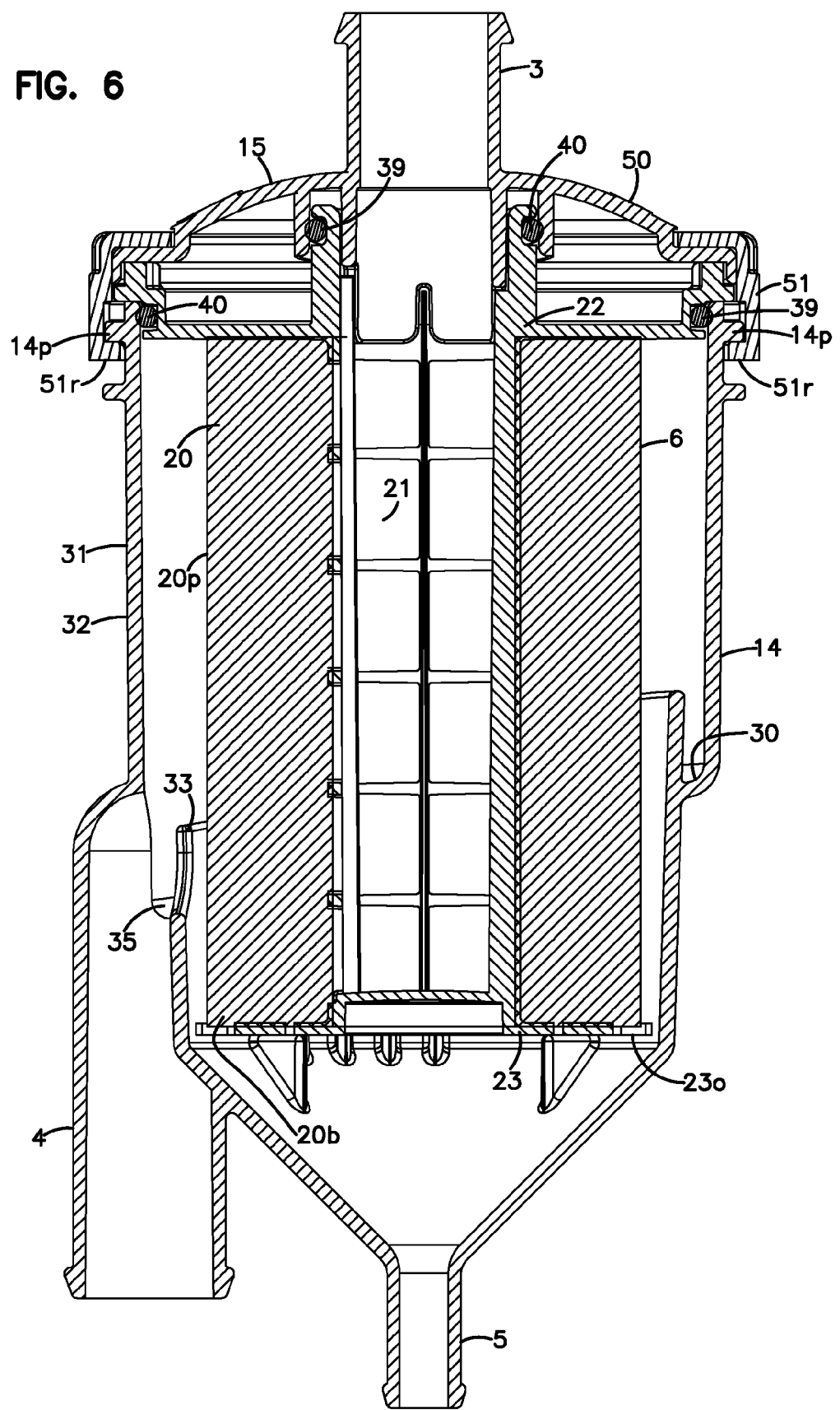
FIG. 6 is a second schematic cross-sectional view of the assembly of FIG. 1, taken generally along line 6-6, FIG. 4.

Attention is now directed to FIG. 5 (and to FIG. 5A, an enlarged fragmentary view of a portion of FIG. 5). Here, projection(s) 90 extending through recess(es) 32r can be seen. The projection arrangement 89 comprising the projections 90 can be seen as a vertical spacer arrangement, (or access cover housing base—or housing base/access cover—spacer arrangement) that ensures center portion 51 of a service cover arrangement 15 is positioned sufficiently far from end 32e of sidewall 32 so that the locking ring 51 can tightly engage a projection arrangement comprising projections 14p when the mounting ring 51 is rotated. Alternately stated, if the cartridge 6 is not present within the assembly 1, when the service cover 15 is lowered in place, and the ring 51 is rotated, there will not be a tight engagement; rather the mounting ring 51 will remain loose. The service provider will immediately notice this, and recognize that the proper cartridge 6 is not present. Also, if the service provider tries to position a wrong cartridge within the housing 14, in place of cartridge 6 a similar problem will likely result. Further, the engagement between the projections 90 and the receivers 32r can be used to properly rotate the cartridge 6, so that it is appropriately oriented for engagement with various portions of the housing as may be needed.

In general terms, the assembly 1 can be characterized as having a housing base/access cover (or access cover/housing base) vertical spacer arrangement. For the particular example depicted, the housing base/access cover vertical spacer arrangement is an arrangement positioned on the cartridge 6, and in the particular example depicted on the first end piece 22. The housing base/access cover vertical spacer arrangement depicted includes a rigid projection arrangement on the cartridge first end piece 22 oriented to project radially outwardly from a remainder of the first end piece to a location radially outwardly from a maximum radial outward extension of each of the first and second housing seal members 39, 40. In the example depicted, the projection arrangement 89 comprises projections 90, which are positioned as described. Since they project further radially outwardly than the seal members 39, 40, they can engage the recesses 32r as desired.

Herein, the term "vertical spacer dimension" and variants thereof will be used to identify the amount of vertical spacing between the centerpiece 50 of the service cover 15 and the housing base 14 that results from housing base/access cover spacer arrangement. Typically, an amount of spacing is at least 0.5 mm, usually at least 1 mm, often at least 2 mm and can be at least 3 mm and in some instances even 5 mm or more. The issue is merely for the amount of vertical spacing provided to be sufficient so that the rotatable locking ring 51 cannot properly engage the housing base 14 to properly tighten or lock, unless the centerpiece 50 of the service cover arrangement 15 is adequately lifted by the vertical spacer arrangement.

Still referring to FIGS. 5, 5A and 13, it is noted that the second seal member 40 is positioned so that it will engage the housing 14 at a location below the receivers 32r, to ensure appropriate isolation of clean gas annulus 25 from exterior regions to the housing 2. Also, the first seal member 39 is positioned above the projections 90, to engage the housing centerpiece 50 appropriately and to ensure the gas flow through a joint between the access cover 15 and housing base 14, does not reach, undesirably, locations within the assembly 1. It also helps ensure that crankcase ventilation filter gases do not leak outwardly from the assembly 1 through a joint between an access cover 15 and housing base 14.

Figure 14:
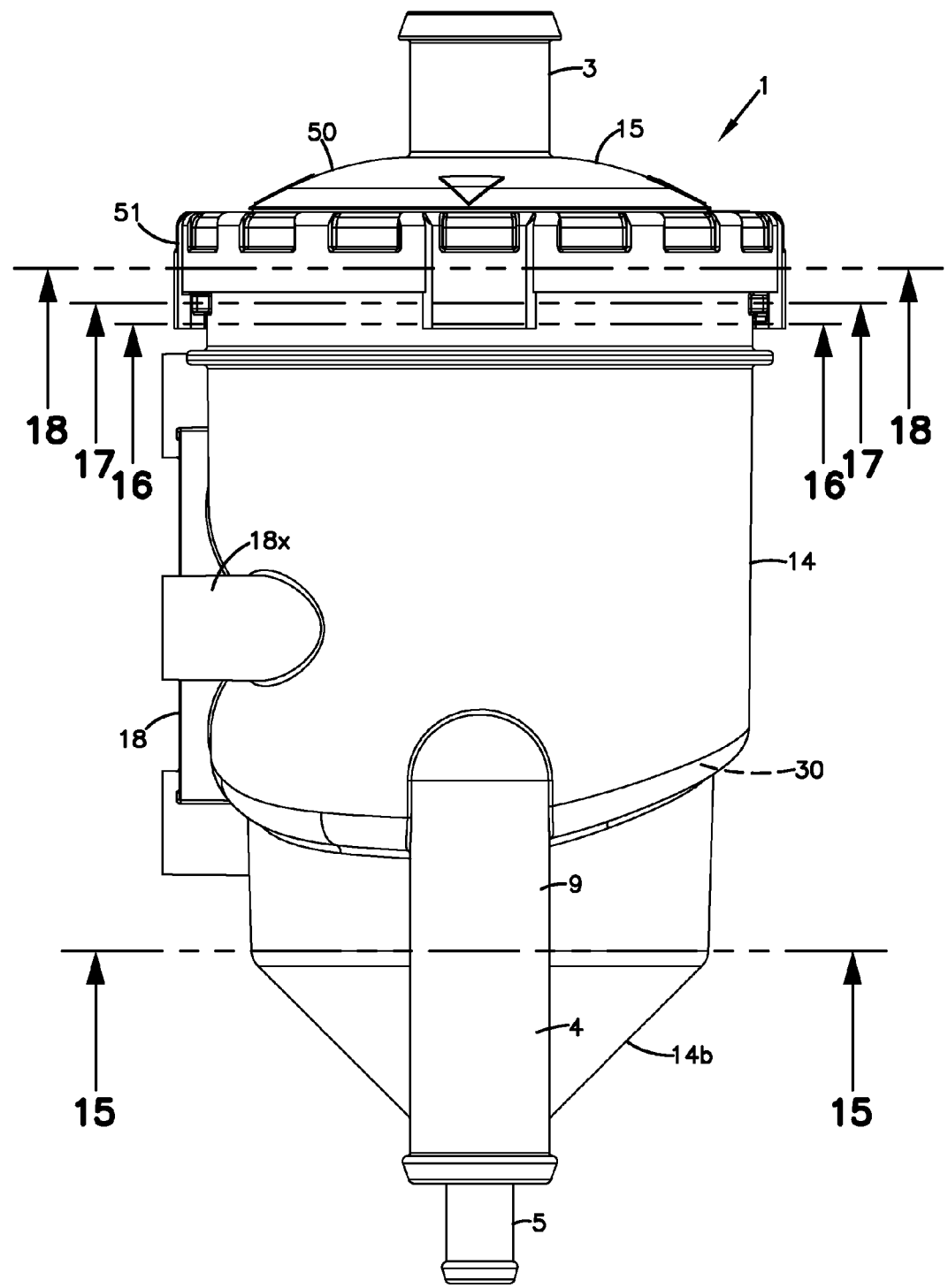
FIG. 14 is a schematic side elevational view generally analogous to FIGS. 4 and 7, with some cross-sectional lines indicated.
Figure 15:
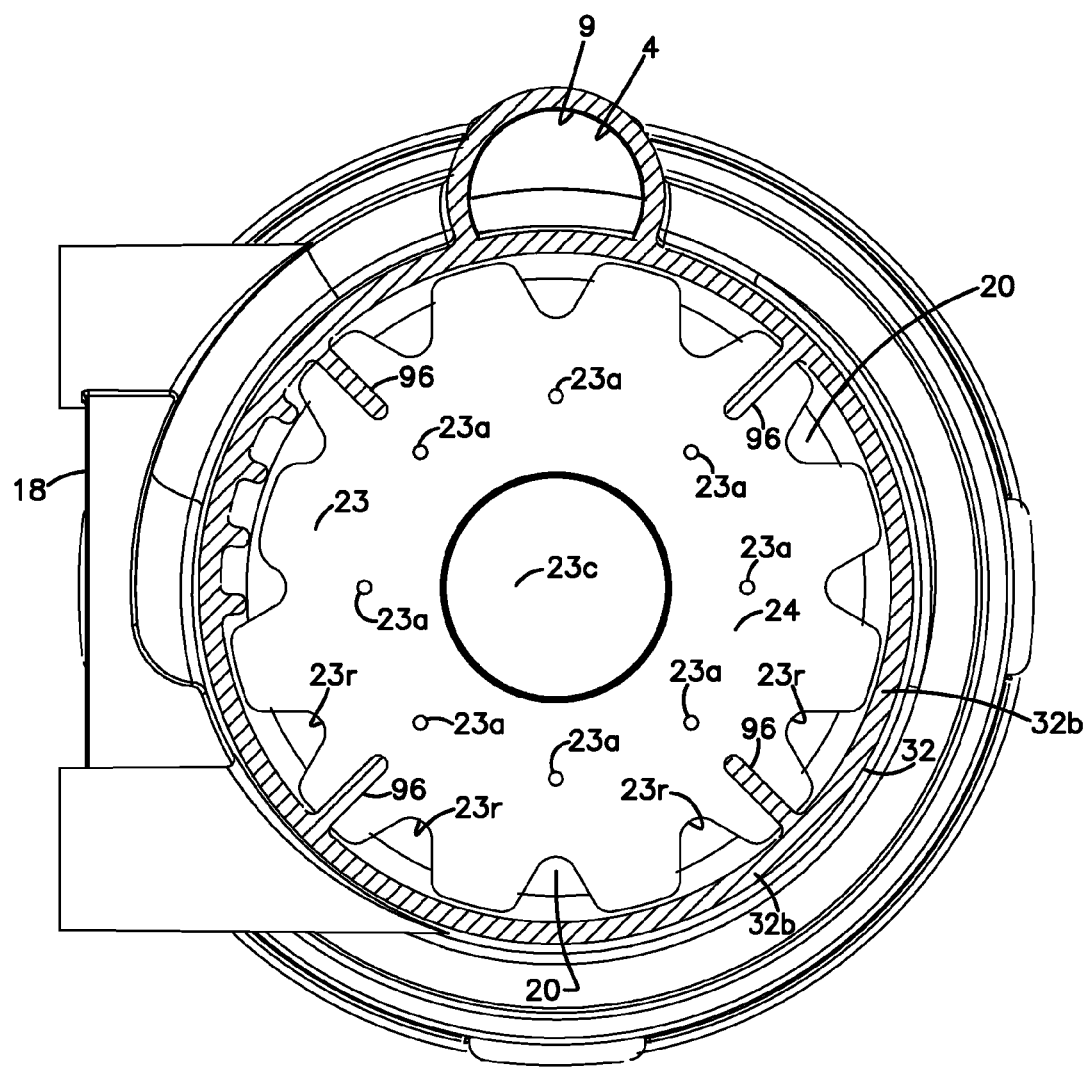
FIG. 15 is a schematic cross-sectional view taken along line 15-15, FIG. 14.

Attention is now directed to FIGS. 14-19, for further understanding of the engagement between the cartridge 6 and the housing 2. In FIG. 14, a side elevational view of the assembly 1 with the cartridge 6 internally positioned is shown. In FIG. 15, a cross-sectional view taken along line 15-15, FIG. 14, is shown. This view generally shows: lower end piece 23, and selected features thereof. For example, recesses 23r which comprise a lower media outlet drain arrangement can be viewed. It is also noted that apertures 23a extend through end piece 23 also in axial overlap with the media 20. Together, aperture 23a and recesses 23 operate as the media axial overlap arrangement previously described. At 23c, closure across a lower end of the cartridge 6 can be seen. At 96, a cross-sectional view through supports 96 in a bottom of the housing 14 can be seen. The supports 96 are shown, for example, in FIG. 5. During installation in housing base 14, the cartridge 6 is lowered in use until it rests on the supports 96.

At 32b, FIG. 15, a cross-section through a lower part 32b of the housing sidewall 32 is shown. It can be seen that in FIG. 15, that this lower part is isolated from the water drain outlet 9, as discussed above.

Figure 16:
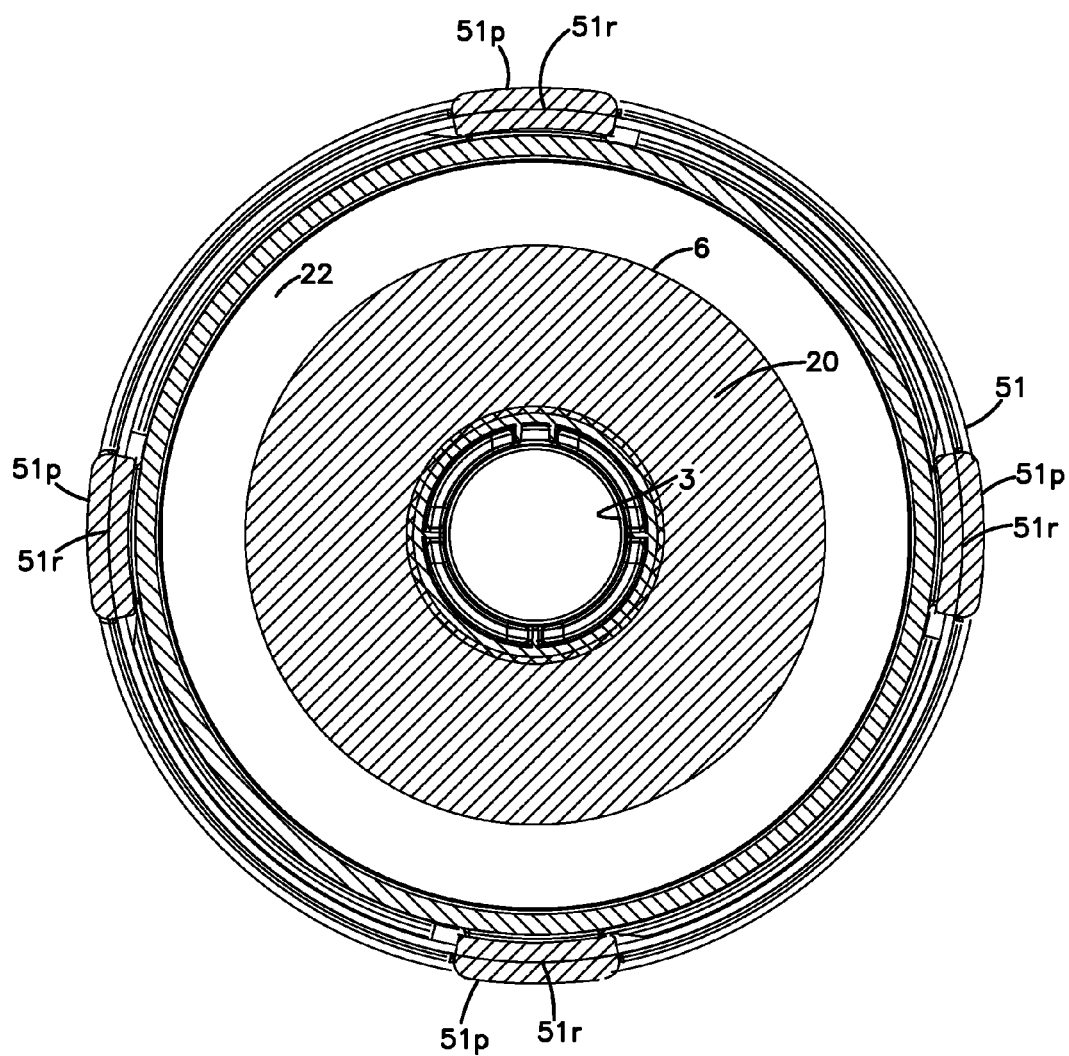
FIG. 16 is a schematic cross-sectional view taken generally along line 16-16, FIG. 14.

FIG. 16 is a cross-sectional view taken along line 16-16, FIG. 14. Here, the cross-section is generally below end piece 22 looking upwardly. The cross-section extends through the retaining lips or edges 51r on mounting ring 51, FIG. 6.

Figure 17:
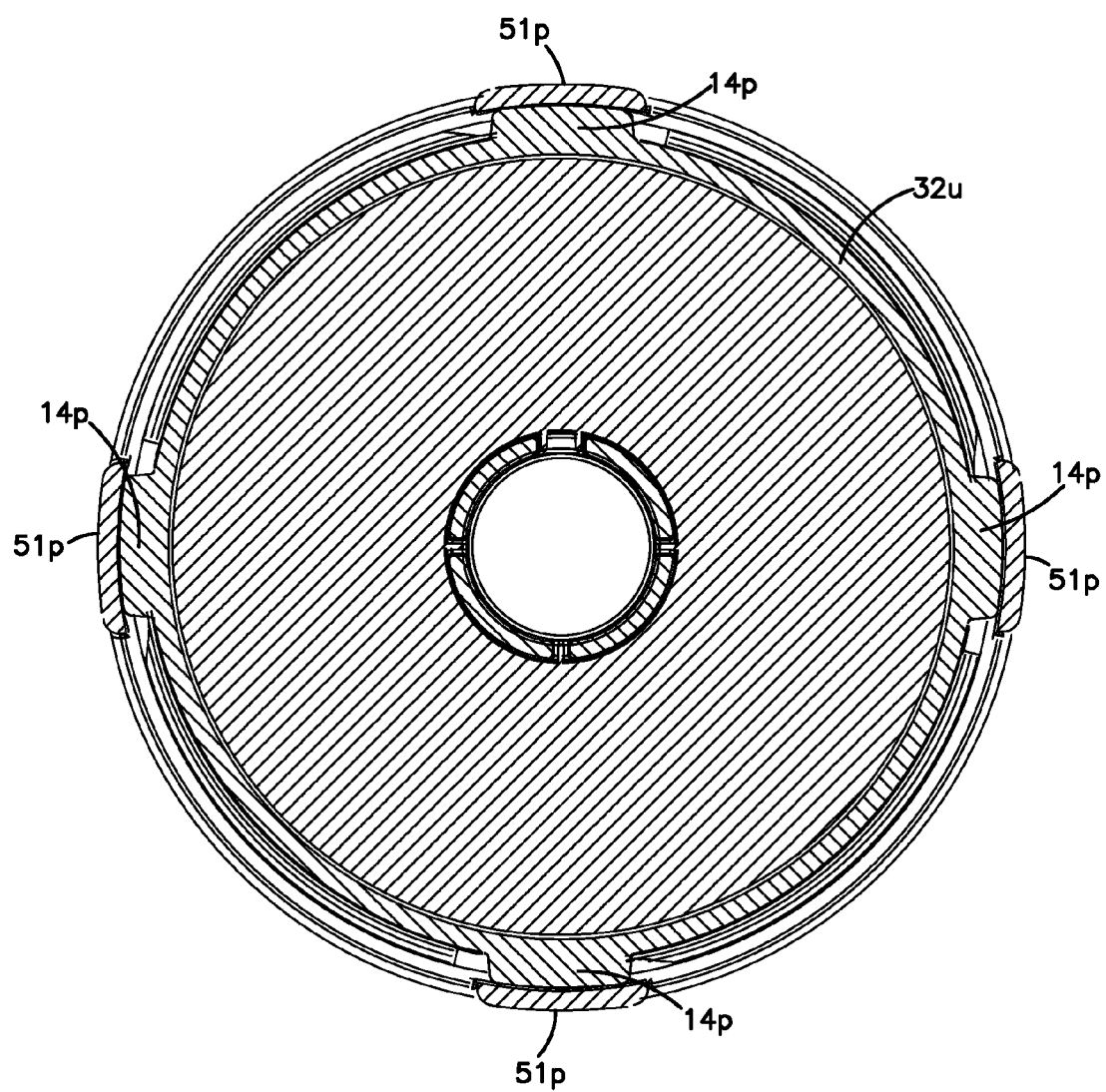
FIG. 17 is a schematic cross-sectional view taken along line 17-17, FIG. 14.

In FIG. 17, the cross-sectional view provided is taken along line 17-17, FIG. 14. The cross-section now extends through the upper portion 32u of the sidewall 32 where projections 14p are located for engagement by the lips 51r on mounting ring 51.

Figure 18:
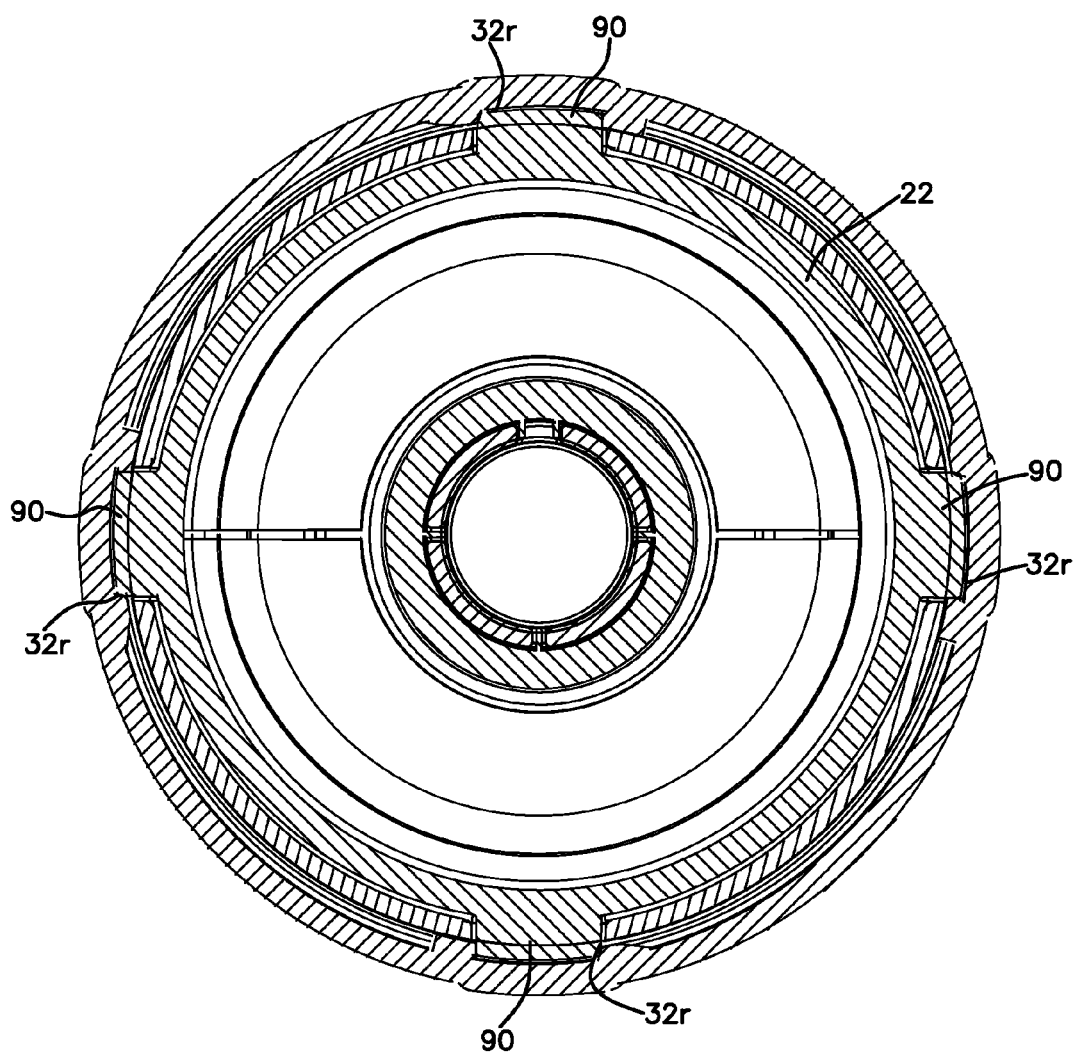
FIG. 18 is a schematic cross-sectional view taken along line 18-18, FIG. 14.

Attention is now directed to FIG. 18. FIG. 18 is a cross-sectional view taken generally along line 18-18, FIG. 14, looking upwardly. The cross-section now extends through a portion of end piece 22 that includes projections 90 thereon. The projections 90 can be seen as resting in the recesses 32r.

Figure 19:
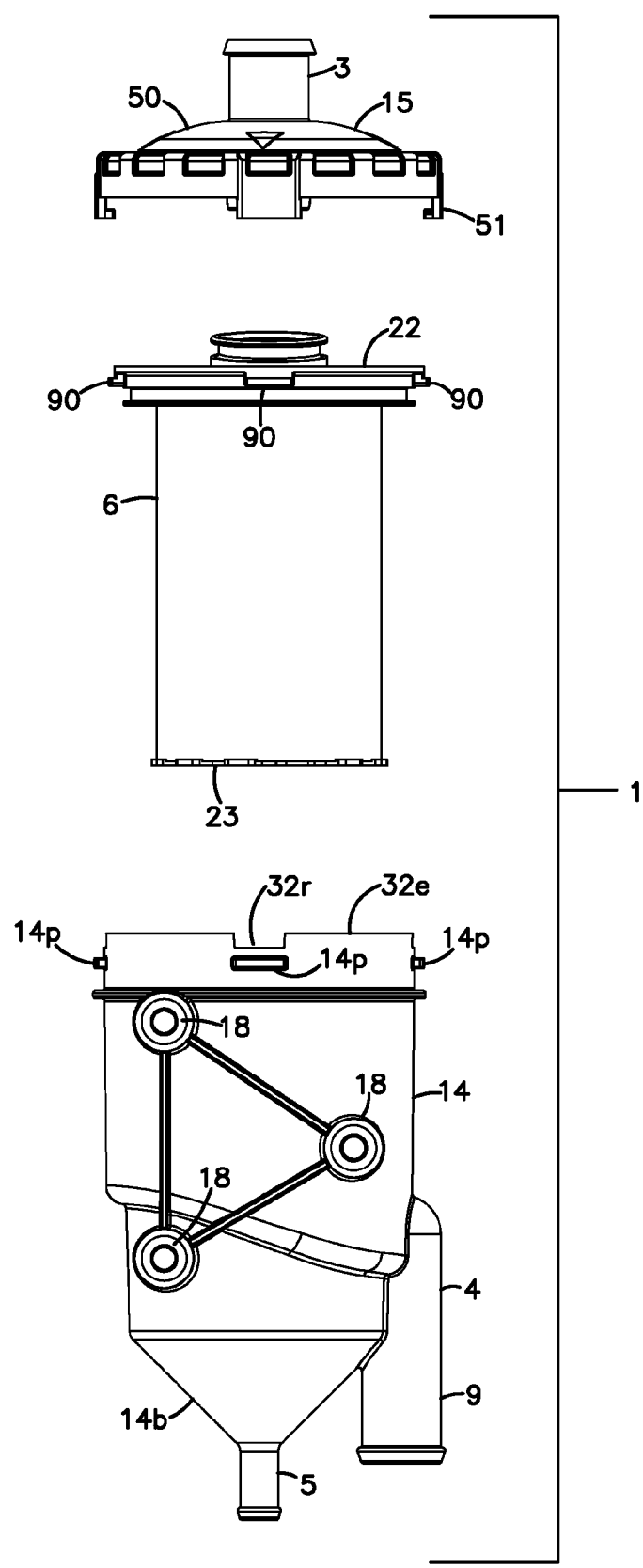
FIG. 19 is a schematic exploded side elevational view of the assembly depicted in FIGS. 1-18.

In FIG. 19, an exploded view of assembly 1 is provided. In FIG. 19, the cartridge 6 is located rotated appropriately for lowering into the housing base 14. Thus, the projections 90 on the first end piece 22 can lower into the recesses 32r. In FIG. 19, the service cover 15 is shown with the mounting ring 51 rotated, to the position that it would have when engaging projections 14p. For actual lowering, the ring 51 would be rotated either slightly to the right or slightly to the left, to allow the mounting projections 51p to pass between projections 14p, with ring 51 then rotated to lock (tighten).

Figure 20:
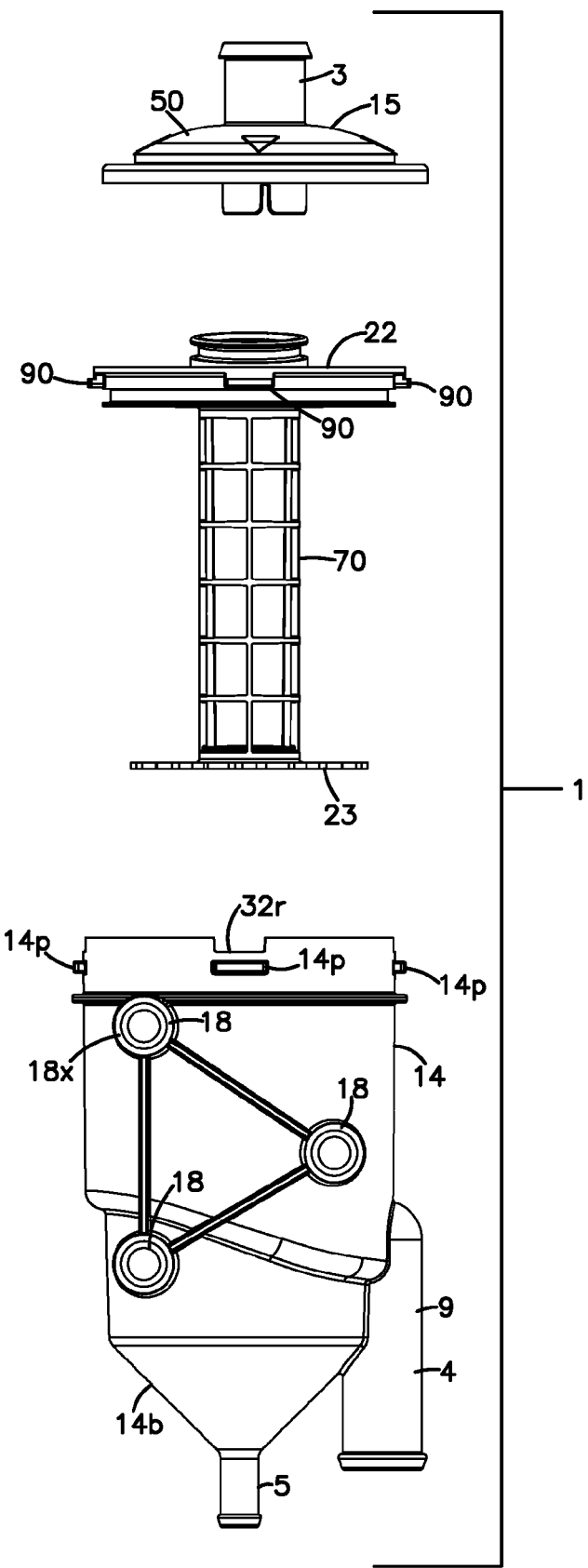
FIG. 20 is a schematic exploded view of selected portions of the assembly depicted in FIG. 19.

In FIG. 20, a view generally analogous to FIG. 19 is shown, except the cartridge 6 is depicted without the media 20 thereon. Therefore, what is viewable is a preform comprising the upper end piece 22, the lower end piece 23 and the central cartridge support 70, formed integral with one another. It is also noted that in FIG. 20, the mounting ring 51 is separated and not shown, the only portion of the access cover 15 being viewable, being the center portion 50.

The components depicted in FIG. 20, can each be preformed (for example molded plastic) components except to the extent that inserts may be positioned within the mounting pads 18 to receive bolts.

Figure 21:
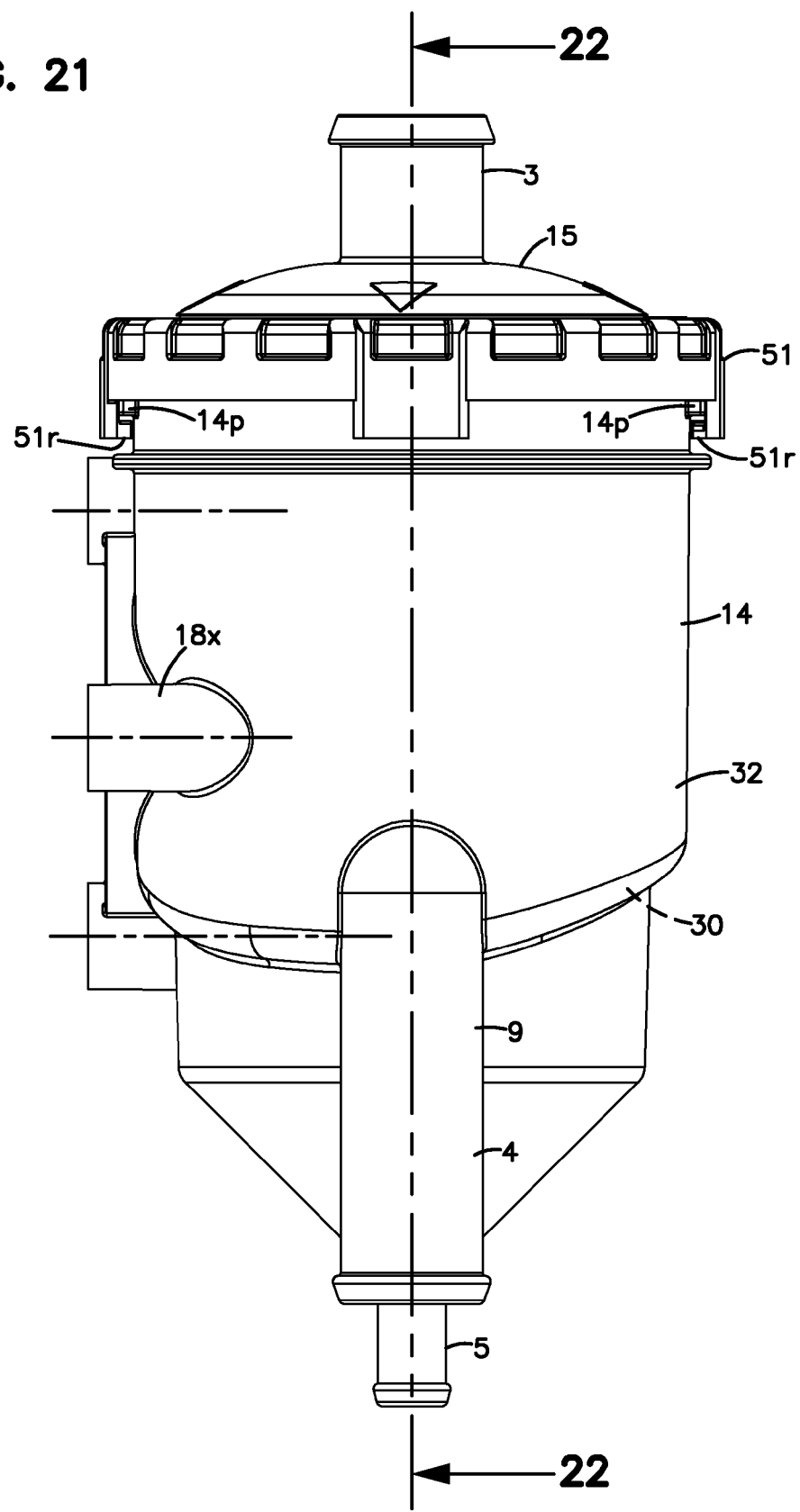
FIG. 21 is a schematic side elevational view generally analogous to FIG. 4, but depicting the assembly without a filter cartridge positioned therein.

In FIG. 21, a view of the housing 2 is depicted, without a filter cartridge installed. It can be seen that the mounting ring 51 cannot tightly engage the projection 14p since the radial projections 51r on the ring 51 are beneath those projections 14p and spaced therefrom.

Figure 22:
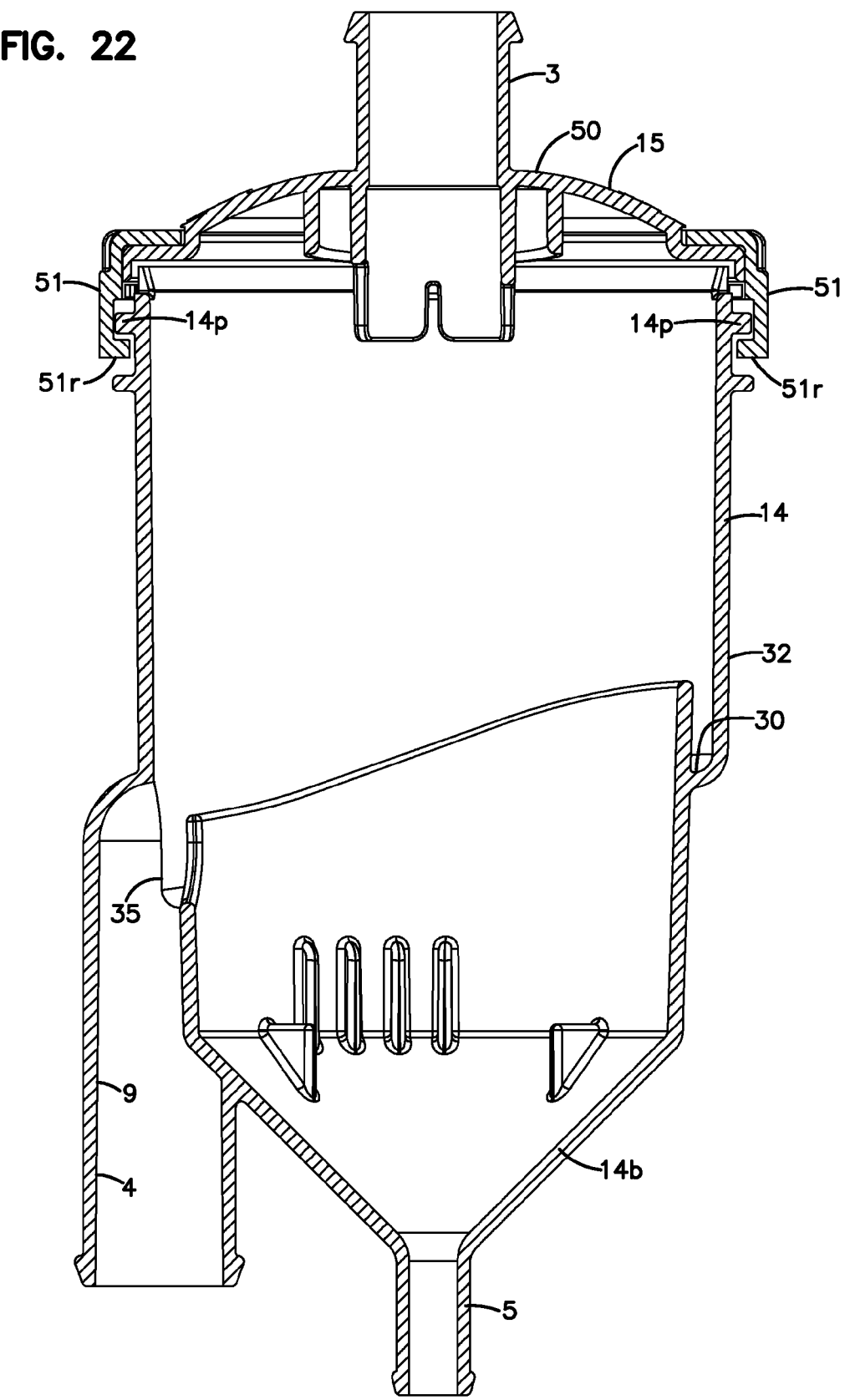
FIG. 22 is a schematic cross-sectional view taken generally along line 22-22, FIG. 21.

In FIG. 22, a cross-sectional view taken generally along line 22-22, FIG. 21 is shown. Again, the housing 2 is depicted without a cartridge therein, and as a result, the mounting ring 51 is loose. A service provider attempting to tighten the ring 51 would recognize, immediately, that there was something wrong, since the ring would not tighten on the projections 14p.

Also in FIGS. 21 and 22, one can see that the drain groove 30 in housing sidewall 32 is shaped to drain downwardly toward end 35 and water drain 9.

Figure 7:
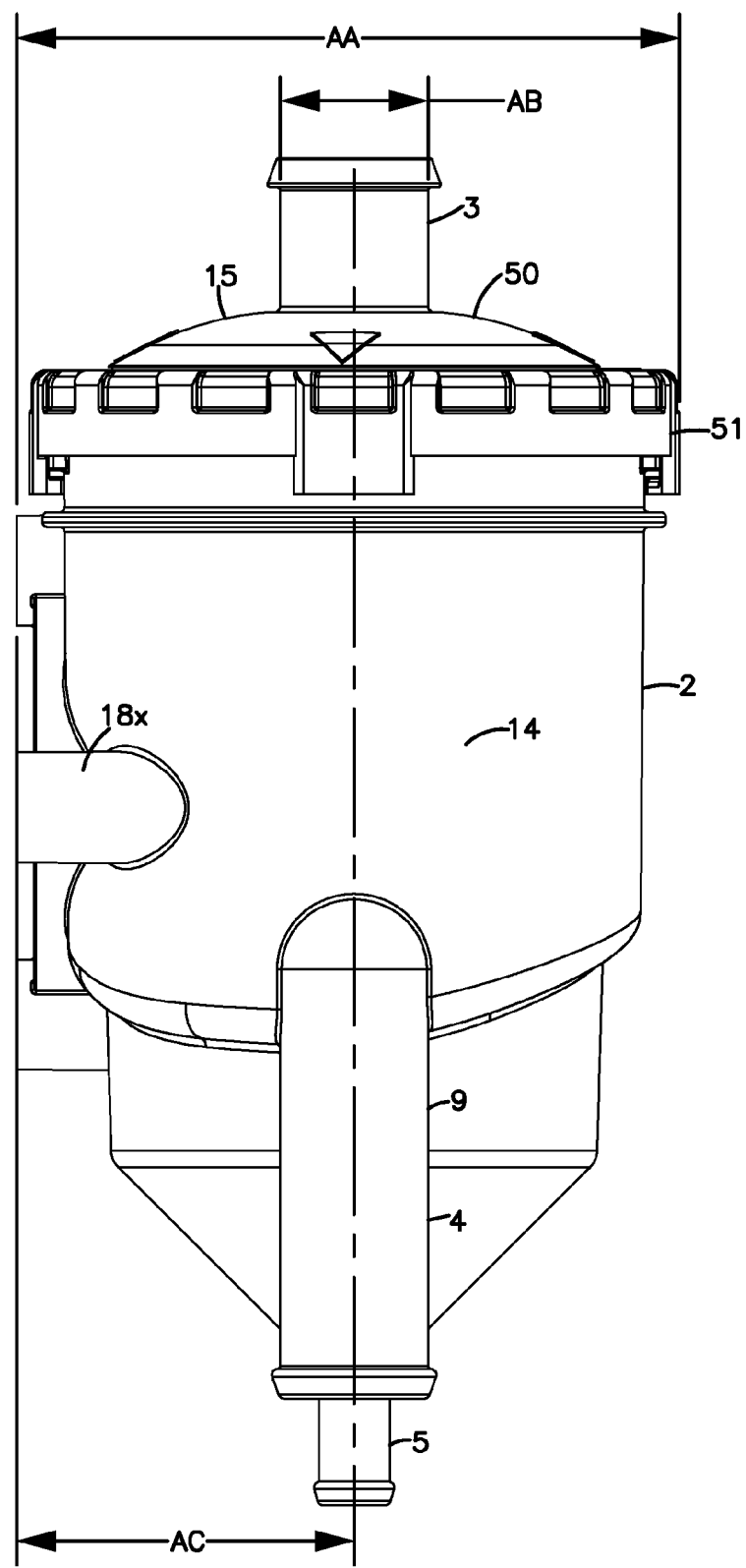
FIG. 7 is a schematic view generally analogous to FIG. 4, with selected dimensions indicated.

In FIG. 7, a side elevational view of the assembly 1 is depicted. Example dimensions are indicated as follows: AA=111.9 mm; AB=25 mm; AC=57 mm.

Figure 8:
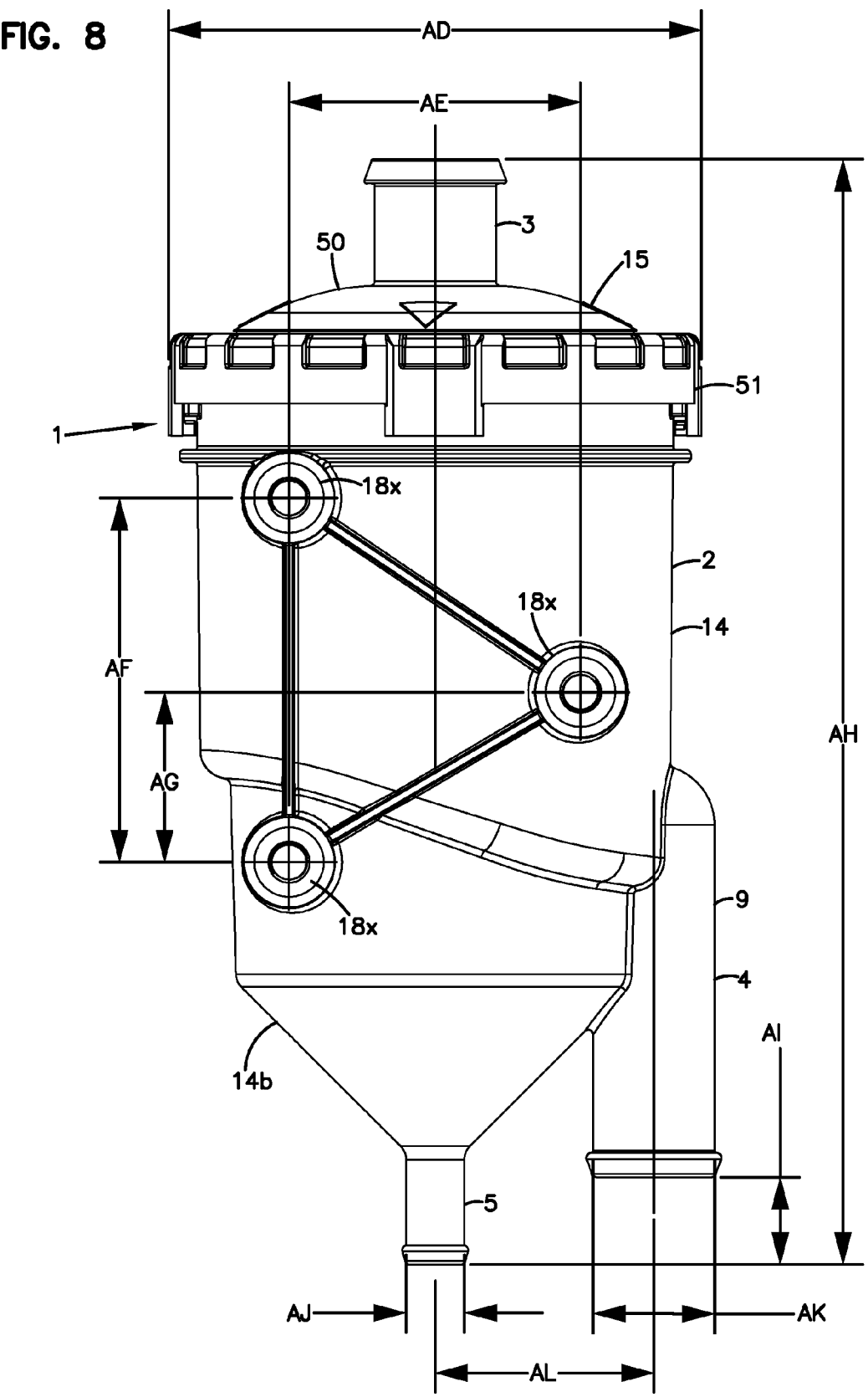
FIG. 8 is a second schematic side elevational view taken generally from the left of FIG. 7, with example dimensions generally indicated.

In FIG. 8, a second side elevational view is provided with dimensions as indicated: AD=109.8 mm; AE=60 mm; AF=75 mm; AG=35 mm; AH=227.7 mm; AI=18 mm; AJ=12 mm; AK=25 mm; and, AL=45 mm.

Figure 9:
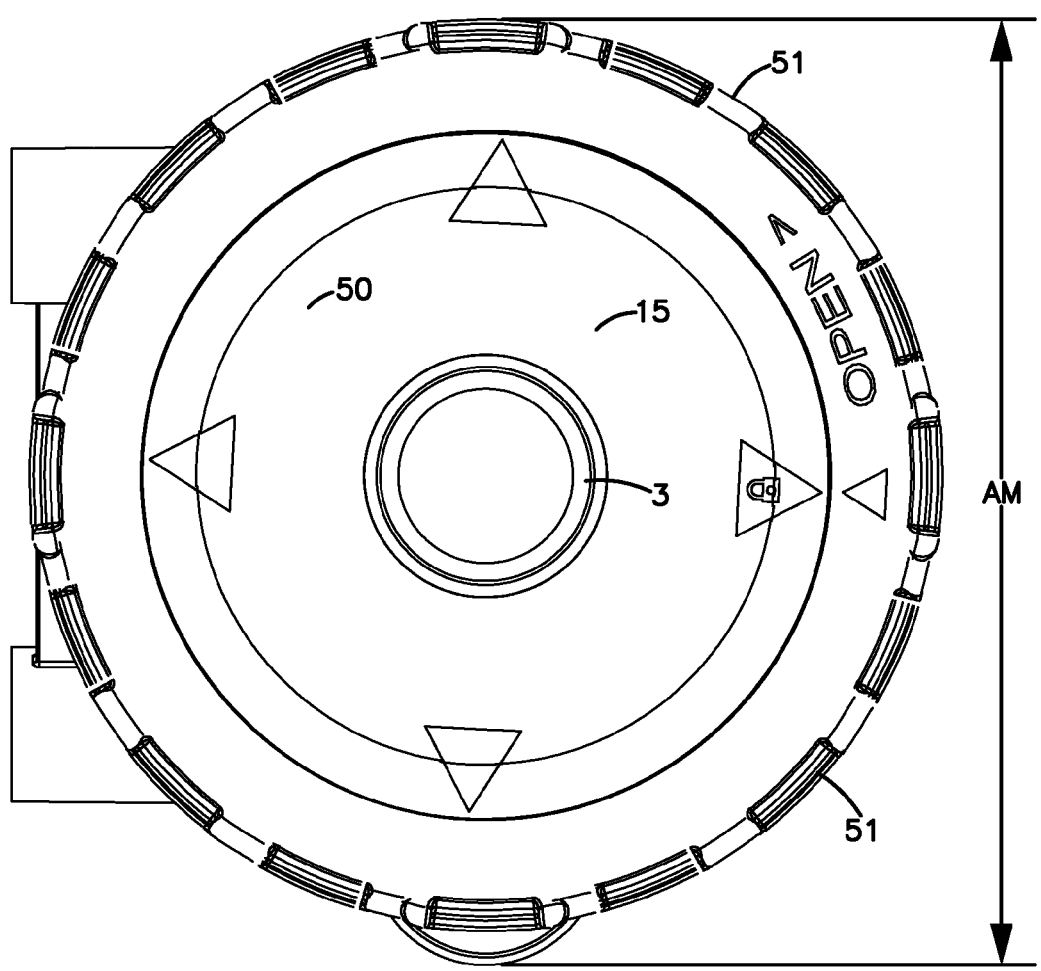
FIG. 9 is a schematic top plan view of the assembly of FIGS. 1-8.

In FIG. 9, example dimension is indicated as follows: AM=113.9 mm. It is noted that alternate dimensions can be used with many of the principles according to the present disclosure.

Figure 10:
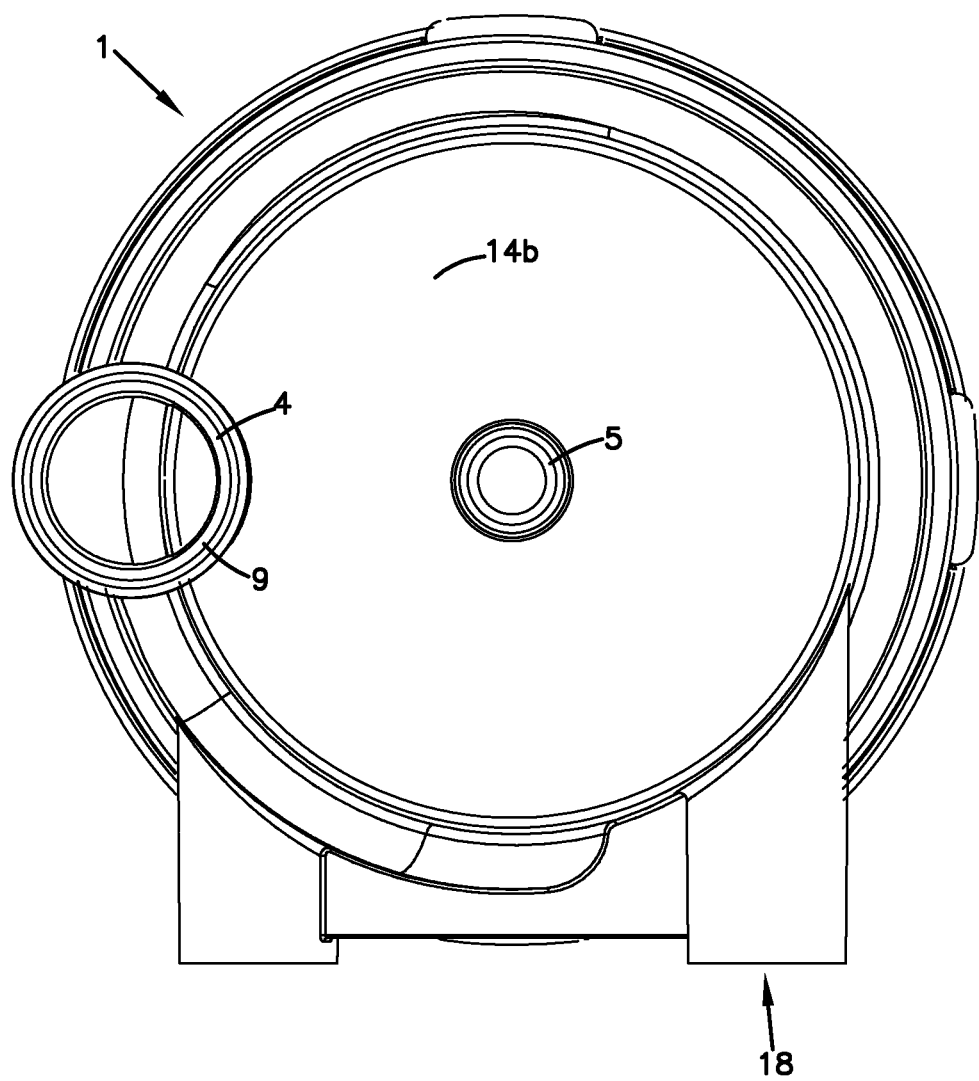
FIG. 10 is a schematic bottom plan view of the assembly of FIGS. 1-9.

An additional view provided not previously referenced in this section, is FIG. 10, a bottom view of the assembly 1.

Attention is now directed to FIGS. 23-27, with respect to various features of the filter cartridge 6; and, features relating to engagement between a filter cartridge 6 and the service cover arrangement 15, and in particular center cover portion 50.

Figure 23:
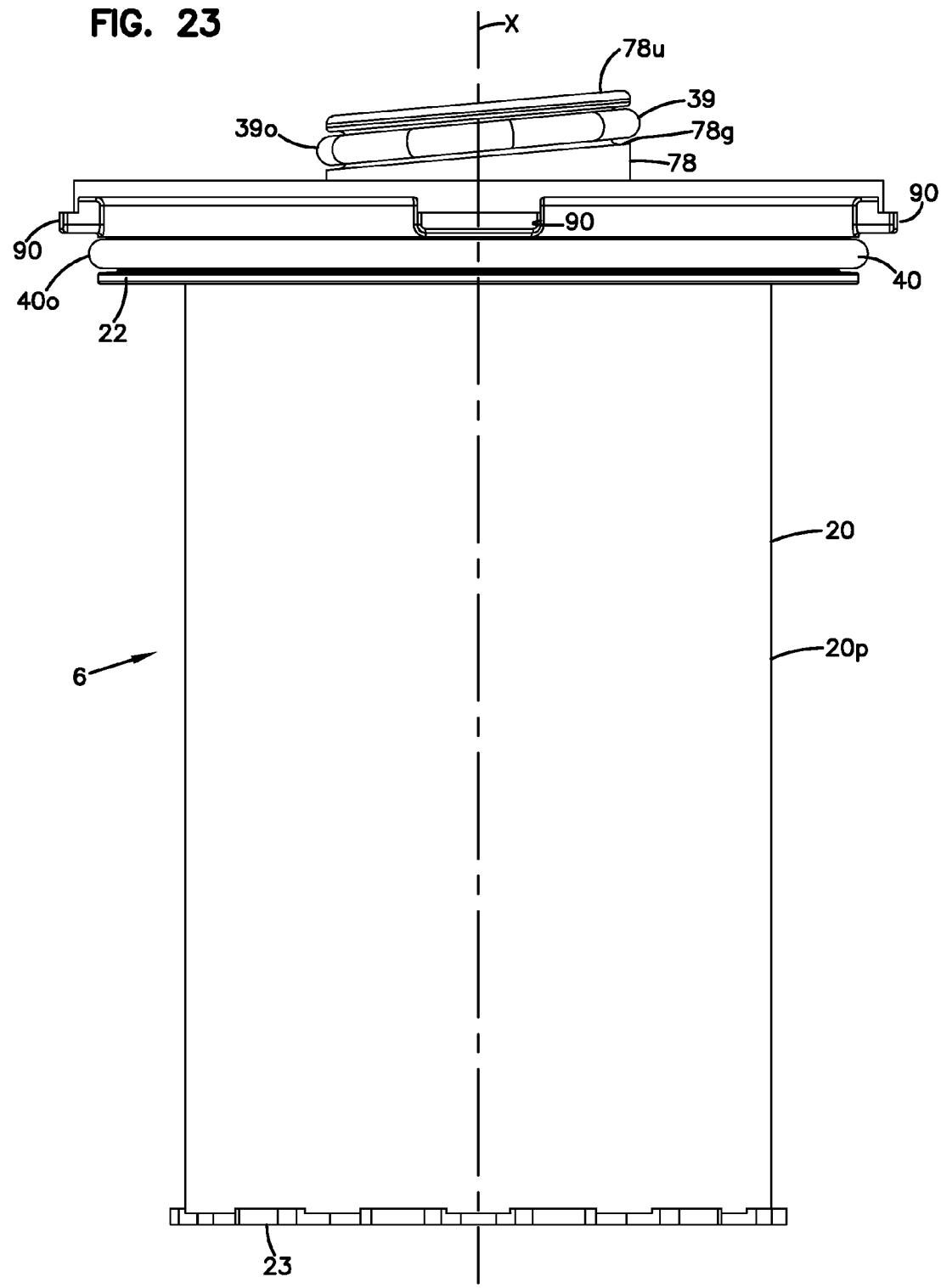
FIG. 23 is a schematic side elevational view of a filter cartridge component of the assembly of FIGS. 1-22.

Referring first to FIG. 23, filter cartridge 6 is depicted in side elevational view, relative to central axis X. The cartridge 6, again, comprises media 20, positioned around an open cartridge interior and between end pieces 22, 23. End piece 22 is an upper end piece in use, and is depicted with a vertical tubular projection 78 thereon, in the example depicted having receiving groove 78g therein for an o-ring 39o, FIG. 5. The cartridge 6 is also depicted, as having on end piece 22, a groove for o-ring 40o.

Also depicted on end piece 22 are spacer projections 90.

Referring to FIG. 23, it is noted again that upper end 78u of projection 78 and seal member 39 are each slanted relative to a plane orthogonal to central axis X.

Figure 24:
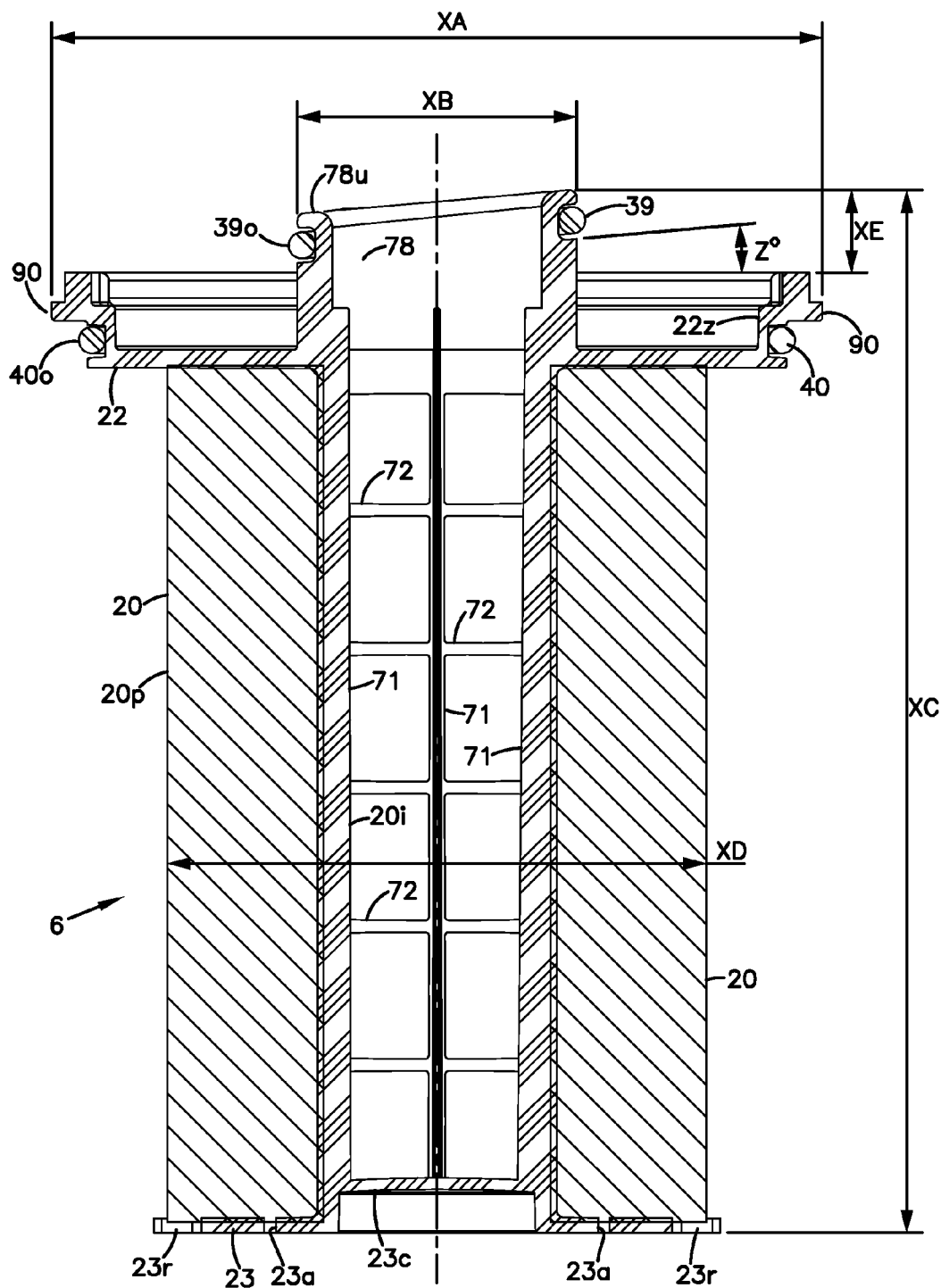
FIG. 24 is a schematic cross-sectional view of the filter cartridge of FIG. 23.

In FIG. 24, a cross-sectional view of cartridge 6 is depicted. It is noted that in FIG. 24, o-ring 75 is depicted in place, in groove 40. Also viewable in FIG. 24 are other features and pieces 22, 23 previously described.

At Z an angle of plane of o-ring 39o and end 78u relative to a plane orthogonal to central axis X is depicted. Typically, the angle Z will be at least 1°, and not greater than 30°, typically not greater than 20°, and often at least 2°.

Figure 25:
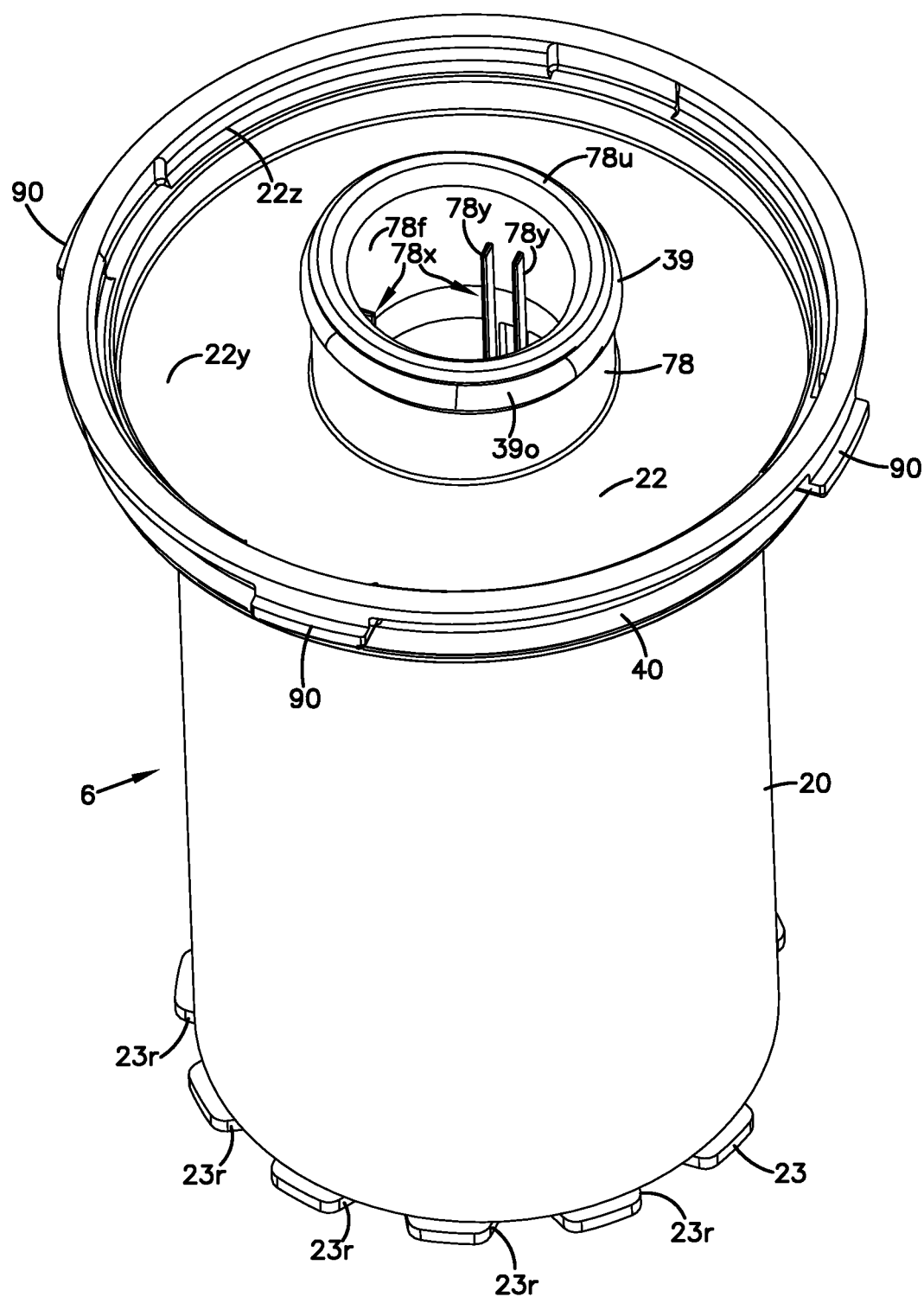
FIG. 25 is a schematic top perspective view of the filter cartridge of FIG. 23.

In FIG. 25, a top perspective view of cartridge 6 is provided. The view is taken toward end piece 22. In FIG. 25, it can be seen that projection 78 is a tubular projection with an inside surface 78f. Projection 78 extends away from the media 20 to an end or tip 78u. The end or tip 78u generally is defined in a plane non-orthogonal to a central axis X as indicated above in connection with FIG. 24.

The cartridge 6 also includes a first member of a cartridge-to-access cover (or access cover-to-cartridge) projection/receiver arrangement, the first member being indicated generally at 78x positioned on interior surface 78f. The first member depicted is a projection arrangement, and in the example depicted, comprises a plurality of axial ribs 78y. The plurality of ribs 78y depicted comprises at least some asymmetrically oriented ribs relative to the cartridge central axis X. By asymmetrically oriented in this context, it is meant that the not all of the ribs are positioned evenly radially spaced around the central axis X. The typical asymmetric orientation is for rib arrangement having at least three ribs 78y with a pair of the ribs positioned radially closer to one another than either is relative to a third rib.

Figure 26:
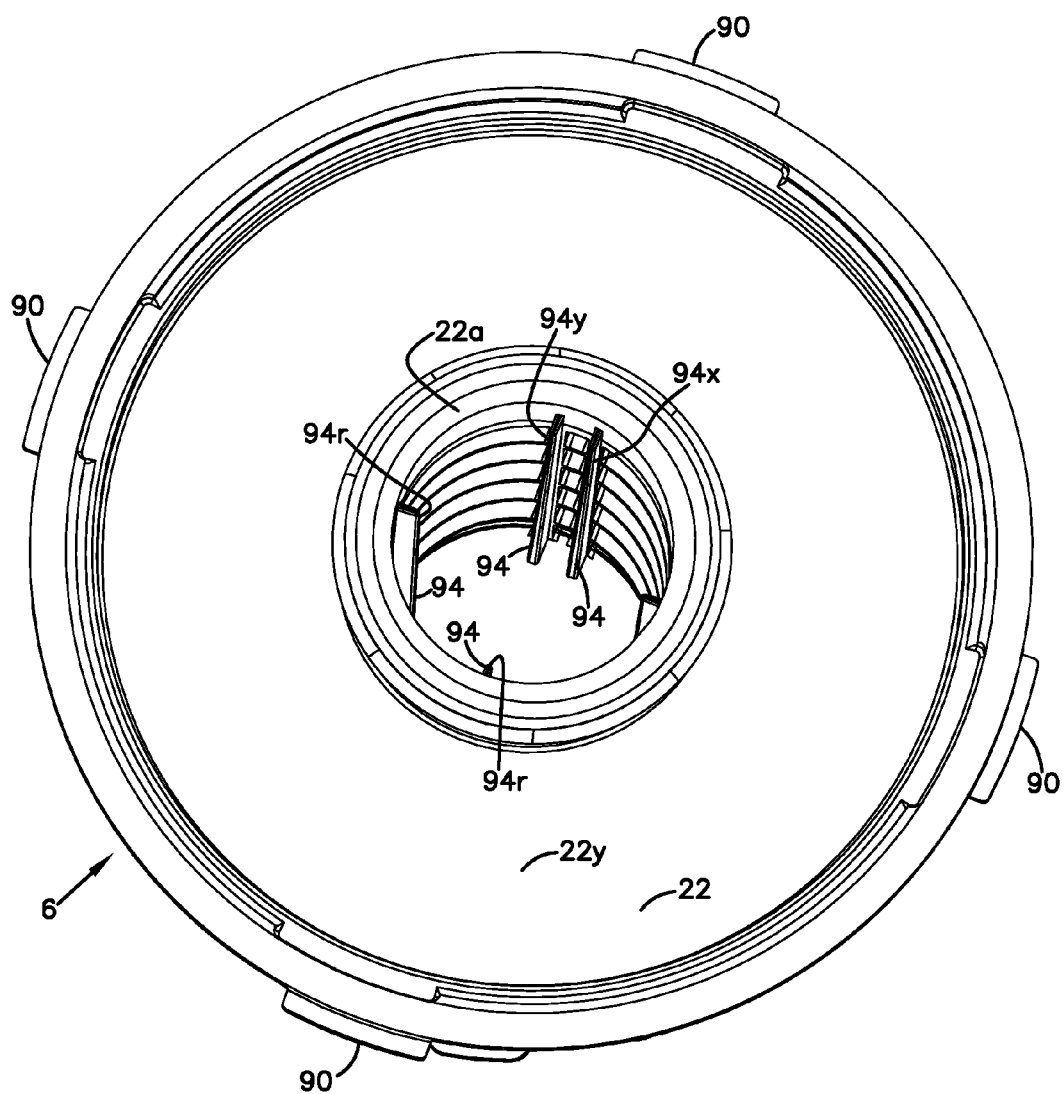
FIG. 26 is a second schematic top perspective view of the filter cartridge of FIG. 23.

Referring to FIG. 26, the ribs 78y can be seen as comprising as five ribs 78y, with two located closely spaced from one another, and another three positioned further radially spaced.

Figure 27:
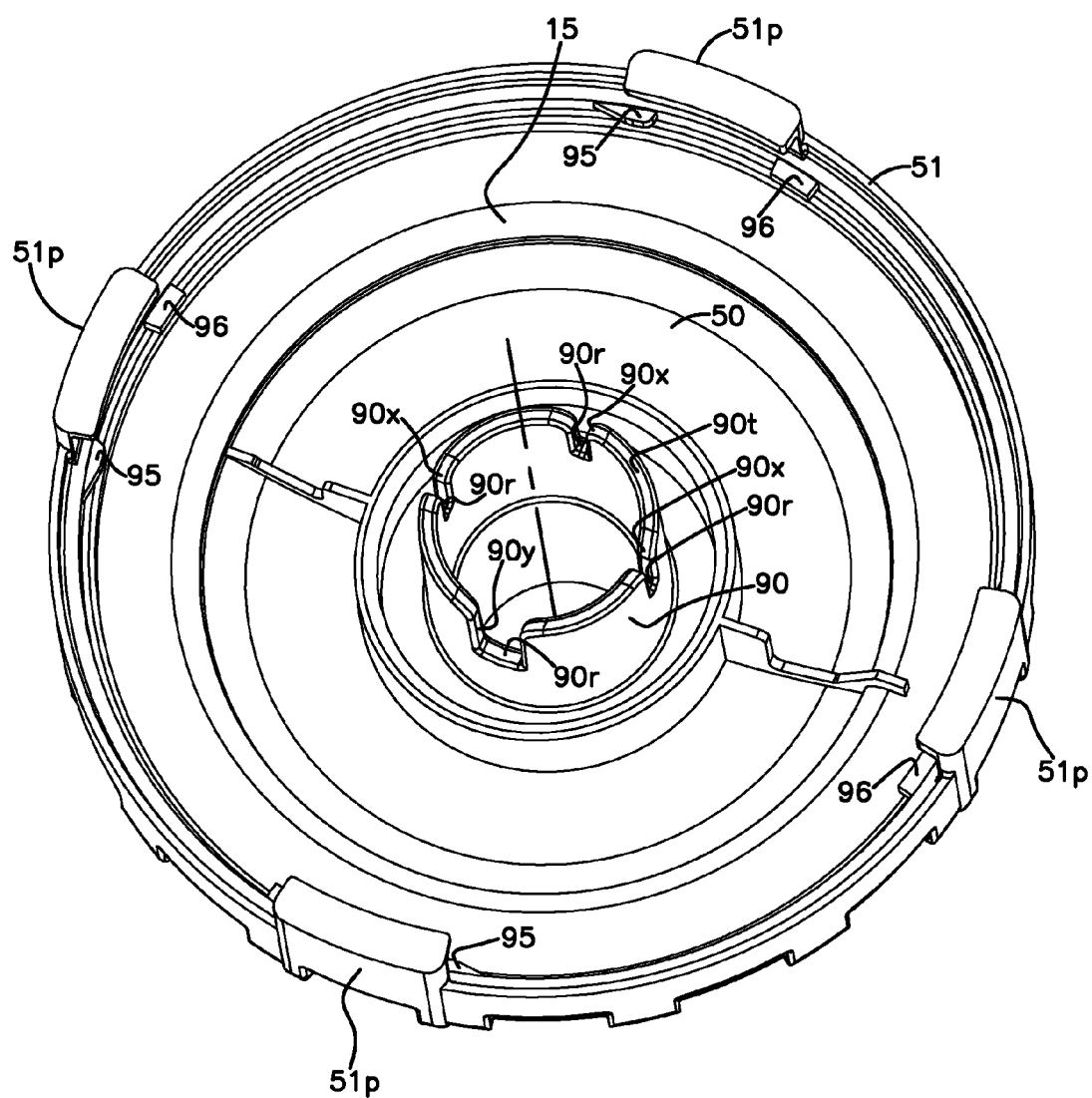
FIG. 27 is an underside, schematic, perspective view of the cover component of the assembly of FIGS. 1-22 configured for engagement with the filter cartridge of FIGS. 23-26.

In FIG. 27, a bottom perspective view or underneath view of service cover 15, comprising central cover portion 50 and rotatable mounting ring 51 is provided.

Attention is particularly directed toward center projection 90, which extends downwardly around cartridge projection 78 in use. Attention is first directed to lower tip 90t of projection 90. The lower tip 90t has a number of recesses or gaps 90r therein.

Referring to FIG. 26, attention is directed to center projections or ribs 94. It is noted that there are five ribs 94 depicted. Ribs 94r are single ribs well-spaced, by at least an arc of 45° relative to the nearest rib. Ribs 94x and 94y, however, are closely radially spaced, relative to one another.

By comparison of the cartridge 6, FIG. 26 and the projection 90 on cover piece 50, FIG. 27, one can understand that the cover piece 50 can only be fully lowered over the access cartridge 6, when the access cartridge 6 is in a single rotational orientation relative to gaps 90r. In particular, each of gaps 90x is too narrow to receive as a projection therein, the two aligned ribs 94x, 94y, FIG. 26, whereas gap 90y is sufficiently wide for such receipt. However, each of gaps 90r is positioned to receive one each of ribs 94r therein. Thus, as the cover assembly 50 is lowered, and projection 78 extends into tube 90, the cover 15 cannot completely lower until rotation is appropriate. This helps ensure that the seal is appropriately oriented relative to various features in the projection 90 for proper sealing.

Also referring to FIG. 27, it is noted that an over center or snap-fit lock arrangement is provided in association with projections 51p on mounting ring 51. In particular, in association with at least one (and in some instances each) of projections 51p a cammed member 95 and stop 96 is depicted. During rotational lock, cams 95 will engage projections 14p, FIG. 11. Rotation of mounting ring 51 will occur until cams 95 are passed and stops 96 are engaged. This will operate as a snap-fit mechanism to inhibit the ring 51 from rotating under typical vibration circumstances. However, cams 95 are sufficiently sized and shaped, and the arrangement is sufficiently flexible, so that as a service provider rotates the ring 51 for unlocking, the cams 95 can be overcome, overcoming locking, allowing the ring 51 to be separated.

In FIG. 24, some example dimensions were provided as follows: XA=101.5 mm; XB=36.8 mm; XC=137.6 mm; XD=71 mm; XE=10.9 mm; and, angle Z=5°.

In remaining portions of this description, additional embodiments are described. It is noted that many of the features for the additional embodiments can be applied in the previously described embodiments; and, many of the features of the previously described embodiment can be applied in the additional embodiments. The disclosure represented herein is not intended to be exclusive, then, with respect to the features of the various embodiments.

III. A Second Example Embodiment

FIGS. 28-31

Figure 28:
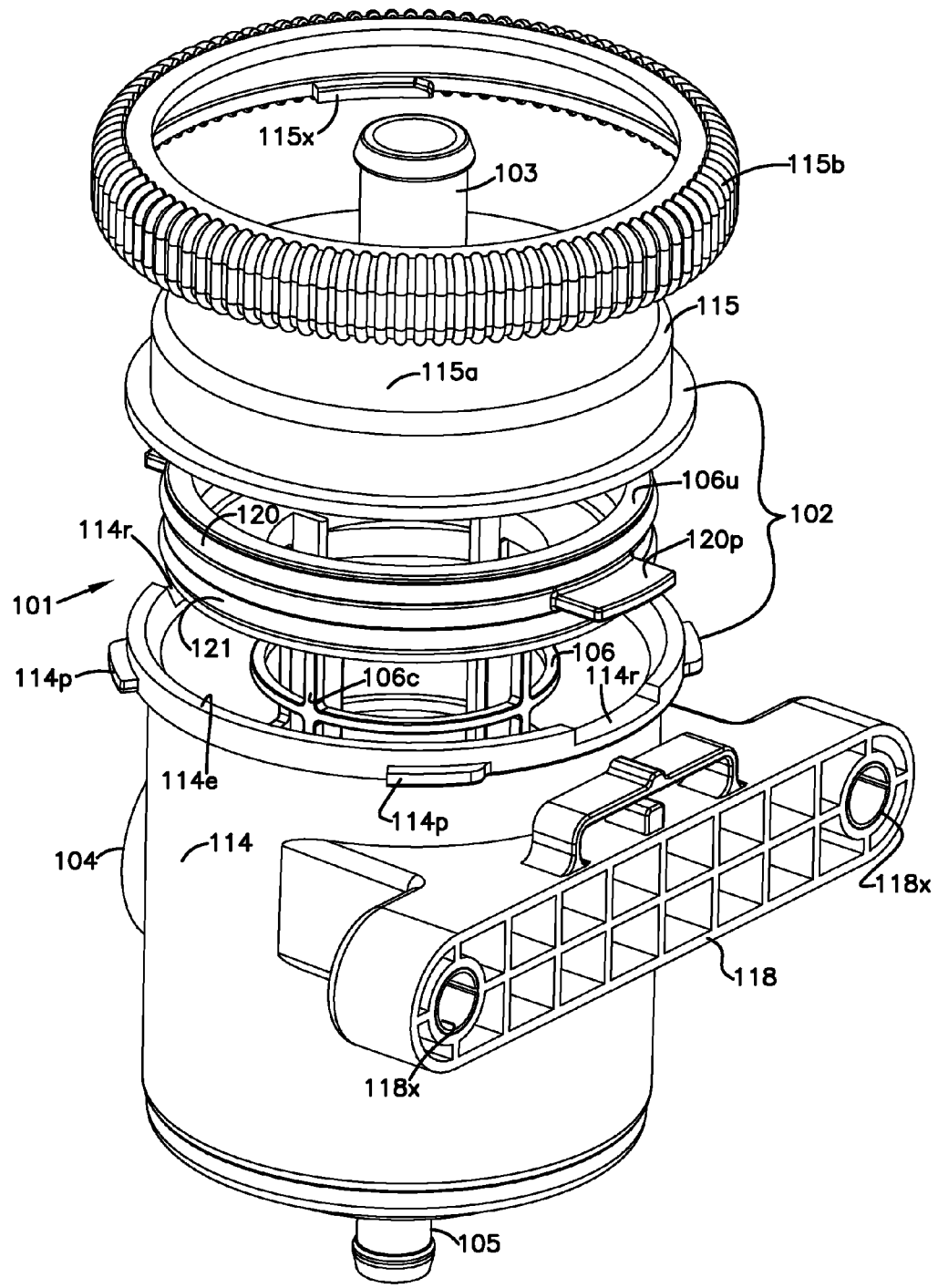
FIG. 28 is a schematic exploded top perspective view of a second embodiment of an assembly using selected principles according to the present disclosure.

In FIGS. 28-31, a second embodiment of an assembly including features generally in accord with the present disclosure is depicted. In FIG. 28, an exploded view of assembly 101 is depicted. Assembly 101 includes a housing 102 comprising housing base 114 and service cover 115; the service cover comprising central portion 115a and a mounting ring 115b. The assembly 101 includes a gas flow inlet arrangement 103, a gas flow outlet arrangement 104, liquid drain arrangement 105 and a mounting pad arrangement 118 including mounting pads 118x.

The mounting base 114 includes an upper end 114e with receiver recesses 114r therein. Also, the upper end 114e of the housing base 114 includes projections 114p thereon, to be engaged by lock members 115x on the mounting ring 115b when the mounting ring 115b is appropriately tightened.

In FIG. 28, the cartridge 106 is depicted but without the media thereon. The media can be positioned as is media 20, in the previously described embodiment.

The cartridge 106, then, induces perform 106p having an upper end piece 106u, a central cartridge support 106c and a lower end piece not viewable in FIG. 28, but indicated generally at 106f in certain other figures.

The upper end piece 106u includes two, vertically spaced; housing seals or seal members 120, 121, in the example depicted each comprising an o-ring surrounding an outer circumference of end piece 106u, although alternatives are possible. Positioned between the first and second housing seals or seal members 120, 121 (FIG. 30) are a plurality of vertical spacer projections 120p that extend radially outwardly and are sized to be lowered into receiver recesses 114r when the cartridge 106 is positioned for use.

Figure 29:
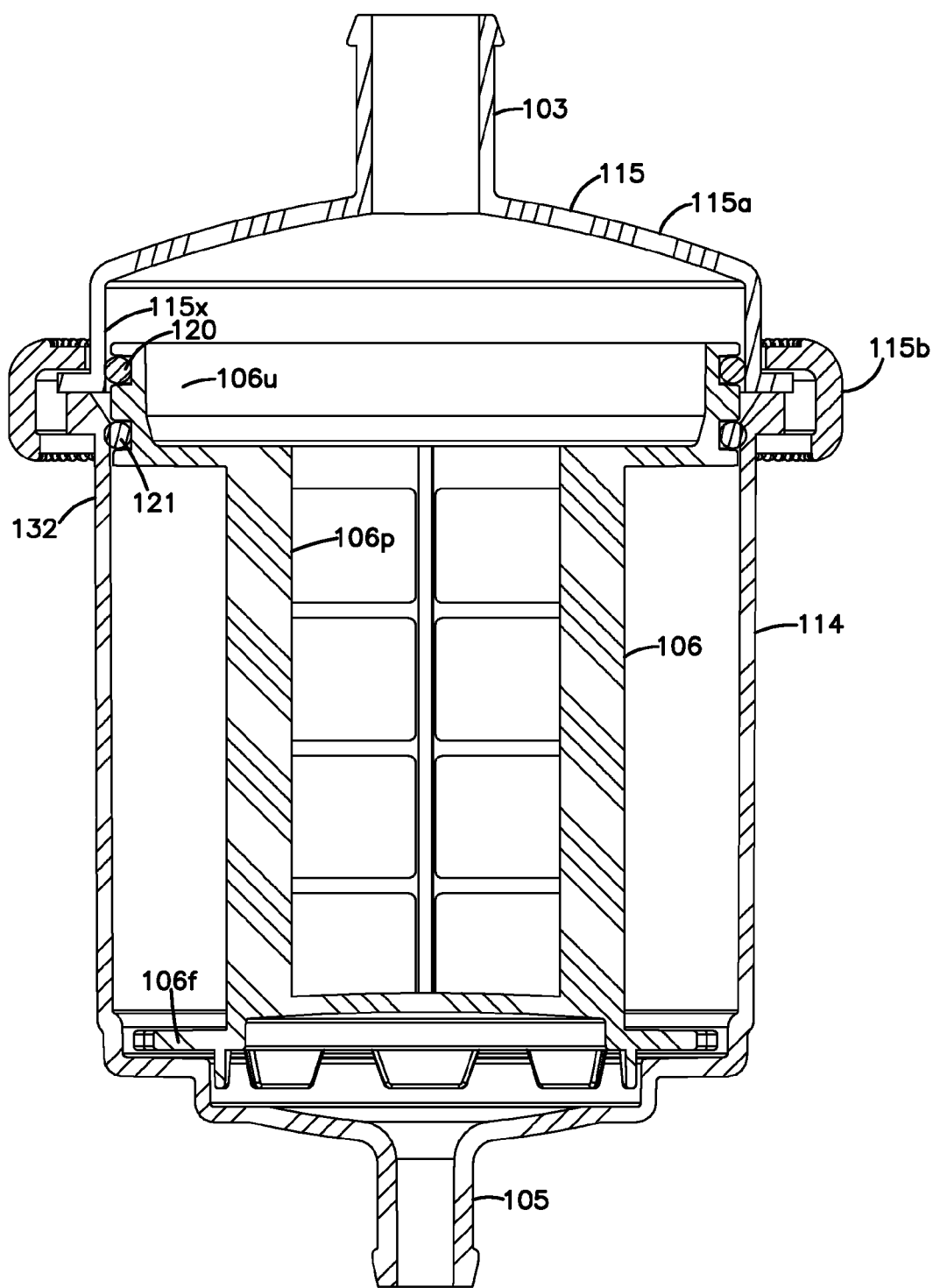
FIG. 29 is a schematic cross-sectional view of the assembly depicted in FIG. 28.

In FIG. 29, a cross-sectional view is shown. Again, for clarity, the cartridge 106 is depicted without the media, but the media would typically be positioned as previously described. Housing seal member 120 is configured to seal against outer portion 115x of the access cover 115; and, housing seal member 121 is configured to seal against a portion of sidewall 132 of housing base 114.

Figure 30:
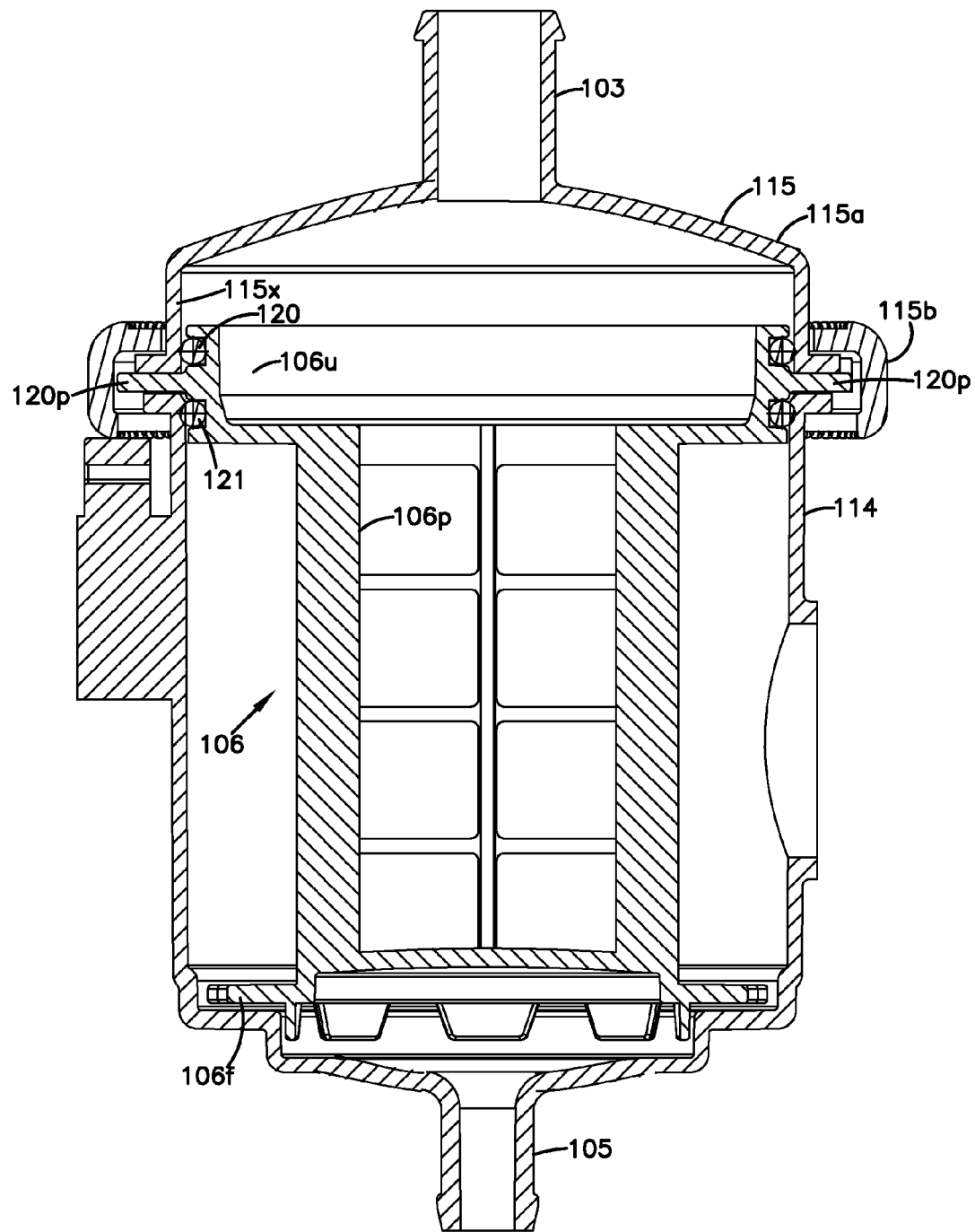
FIG. 30 is a schematic second cross-sectional view of the assembly depicted in FIGS. 29 and 30.

In FIG. 30, a second cross-sectional view is taken, in this instance the view passing through the projections 120p. It can be seen that the projections 120p operate as housing base/access cover (vertical) spacer arrangement, to keep the service cover 115, and in particular the centerpiece 115a sufficiently spaced from the housing base 114, so that the mounting ring 115b will tighten, when rotated.

Figure 31:
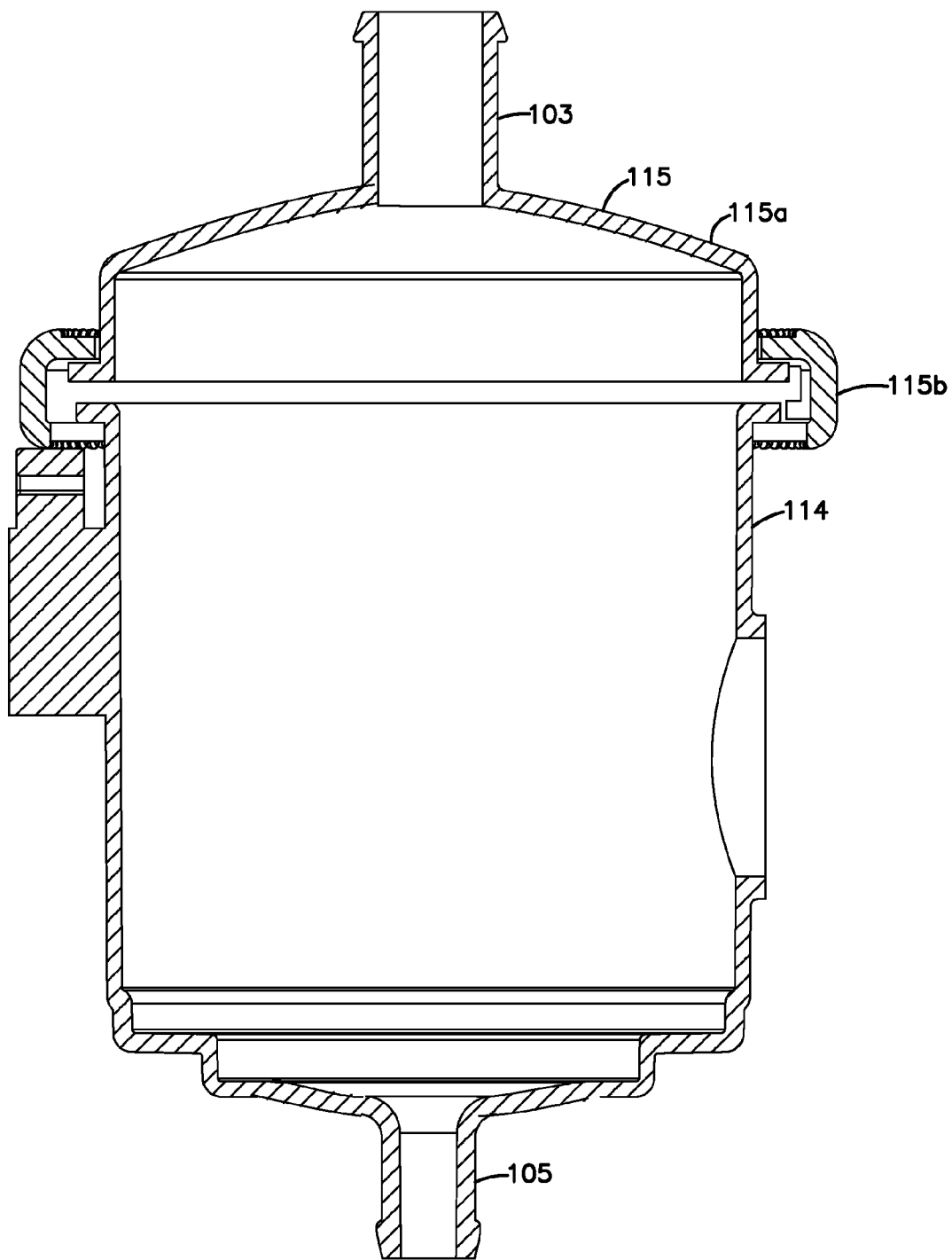
FIG. 31 is a schematic cross-sectional view analogous to FIG. 30, but depicting the assembly without a filter cartridge positioned therein.

In FIG. 31, the housing 102 is depicted without the cartridge in place. It can be seen that the centerpiece 115a of the access cover 115 is not appropriately positioned, thus the system will appear loose to a service provider attempting to tighten the mounting ring 115b.

IV. A Third Embodiment

In the embodiment of FIGS. 1-27, and in the second embodiment of FIGS. 28-31, the access cover in each instance was configured so that the mounting ring thereon rotated between locked and unlocked positions by a non-threaded rotational engagement interactions between portions of a mounting ring and on the housing. A threaded engagement, therefore, was not used. It is noted that many of the principles described herein can be applied in a system in which a threaded engagement is used. Indeed a threaded arrangement could have been used with the previously described embodiments. This will be understood, for example, from the embodiment depicted in FIGS. 32 and 33.

It also noted that in the first embodiment of FIGS. 1-27 and the second embodiment of FIGS. 28-31, the cartridge in each instance was configured so that a central preform or spool could be used around which the media was coiled between two end pieces. This, generally, required the seal arrangement and other structure on the upper end piece to be above the media. It is possible to implement the principles according to the present disclosure in arrangements in which a portion of the upper end piece or a portion of the seal or both actually surrounds the media, as opposed to being positioned above the media. This too will be understood from the arrangement of FIGS. 32 and 33. It is noted that these features can be implemented with many of the features of the embodiments of FIGS. 1-27, and FIGS. 28-31, if desired. It is also that such features can be in general accord with U.S. Ser. No. 61/503,008, incorporated herein by reference.

Figure 32:
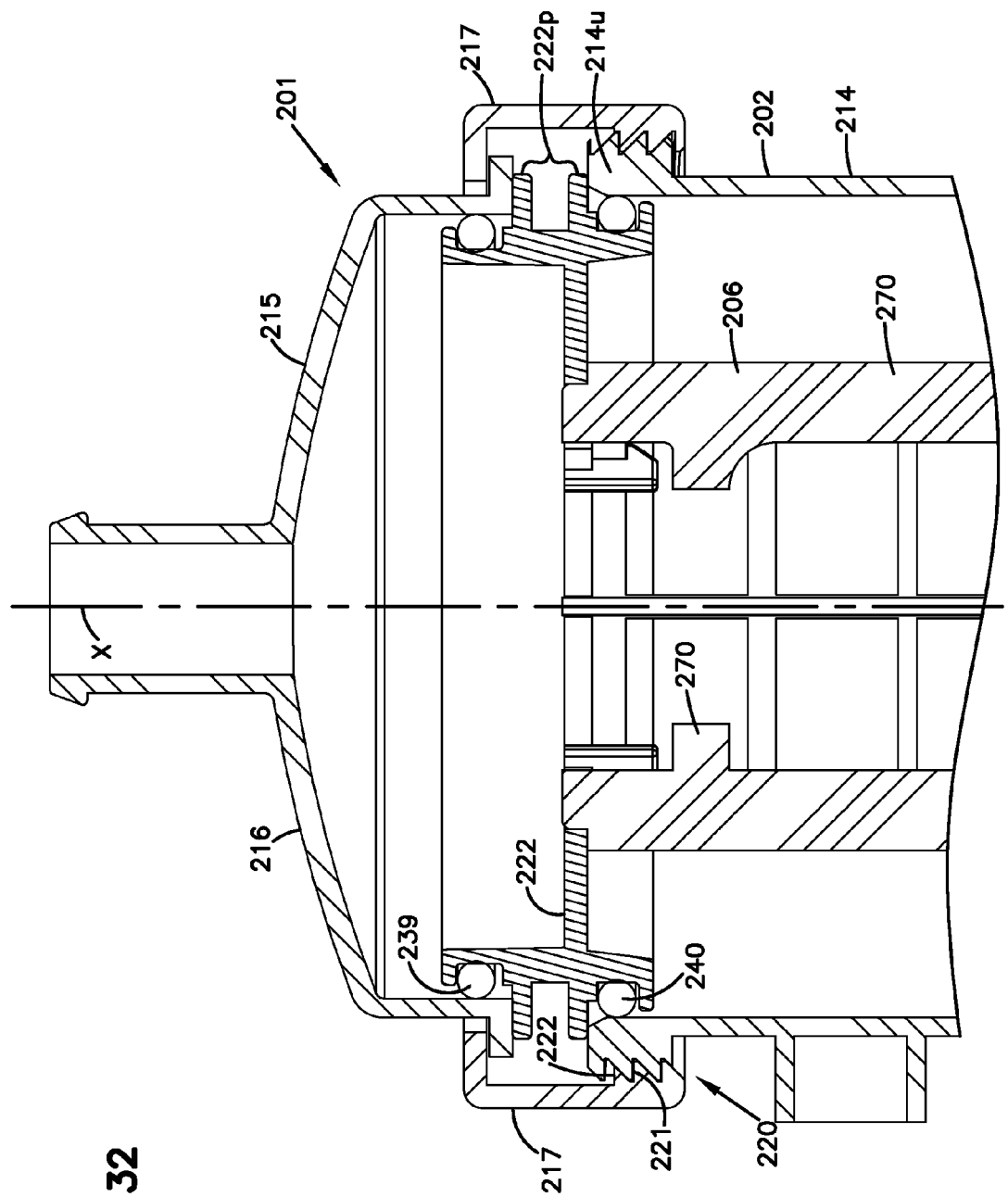
FIG. 32 is a fragmentary schematic cross-sectional view of an assembly including features corresponding to a third embodiment of the present disclosure.
Figure 33:
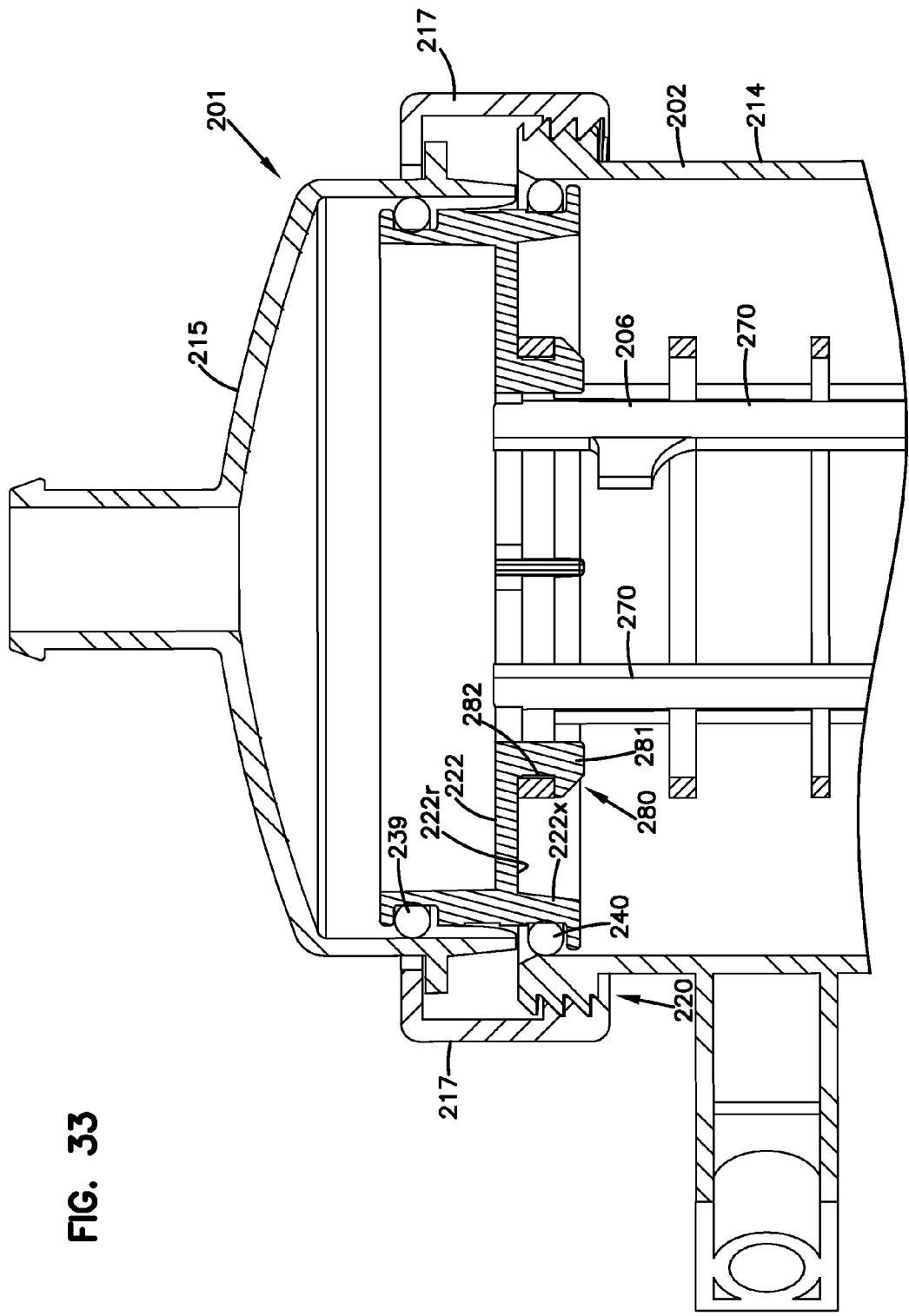
FIG. 33 is a second schematic fragmentary cross-sectional view of the assembly depicted in FIG. 32.

Referring to FIGS. 32 and 33, assembly 201 is depicted comprising housing 202 and internally received cartridge 206. The housing 202 comprises a service cover arrangement 215 and a housing base 214. The service cover arrangement 215 comprises center portion 216 and mounting ring 217. In this instance, the mounting ring 217 is configured for threaded engagement with the housing base 214. The threaded arrangement is indicated generally at 220 comprising threads 221 on the mounting ring 222 and threads 222 on the housing base. The cartridge 206 is again pictured without media, although media would be oriented typically as described in previous embodiments.

The cartridge 206 comprises an upper end piece 222 and would typically have a lower end piece, not shown, generally analogous to previously described lower end pieces. In this instance, the upper end piece 222 is attached onto a preform comprising central cartridge support 270. The attachment can, for example, be by snap-fit, heat weld, sonic weld on adhesive and an example is described further below. The upper end piece 222 is shown with (vertically spaced) housing seals or seal members 239, 240; the first 239 positioned to engage the housing cover 215 and, the second 240 configured to engage the housing base 214. The upper end piece 222 is shown with projection arrangement 222p thereon, which will be positioned between the central portion 215 of the access cover 215 and the upper end 214u of the housing base 214, to ensure appropriate vertical spacing for tight threaded engagement to be accomplished.

In general terms, then, the example assembly of FIGS. 32 and 33 includes a housing base/access cover spacer arrangement which is a projection arrangement on a first end piece of a filter cartridge that projects into a radial outward location further radially outwardly from a central axis X, than either of the first and second housing seals or seal members 239, 240. The housing base/access cover spacer arrangement operates generally as previously described. The assembly of FIGS. 32 and 33 show how these types of features can be implemented in an arrangement in which: a threaded engagement is used between the service cover 215 and the housing base 214; and, the cartridge includes a first end piece 222 that is attached to the central cartridge support 217.

In FIG. 33, an optional snap-fit arrangement or engagement between the upper end piece 222 and the central cartridge support 270 is shown generally at 280, where hook portion 281 on the upper end piece 222 engages a receiver 282 on the central cartridge support 270. With a snap-fit engagement, a portion of the upper end piece 222 and a seal arrangement thereon, such as seal 240, can be positioned to surround the media. A reason for this is that the media can be positioned on the support 206 before the end piece 222 is snap-fit in place. Thus, portions 222x of the end piece 222 that project downwardly around the media, do not block the media from being readily positioned in place.

Of course, in FIGS. 32 and 33, the cartridge 206 is depicted without media thereon. Referring to FIG. 33, typically the media will be provided around support 270 and projecting to a location such that when piece 222 is in place, the media will project into receiver 222r.

Referring to FIGS. 32 and 33, consider the situation when the cartridge 6 is not present. When the service cover 215 is lowered onto the housing base 214, and the rim 217 is rotated for the threaded mount, even if the service provider does not recognize the issue, the valve provider may keep rotating the mounting ring, until it rotates past the threads on the housing. Thus, the system will seem loose and the service provider will recognize that a cartridge is not present.

It is noted that in association with the embodiment of FIGS. 28-31, an option in which an end piece is secured to a central cartridge support is described. Such an option can be applied in other described embodiments herein, if desired.

V. Fourth Embodiment

Figure 35:
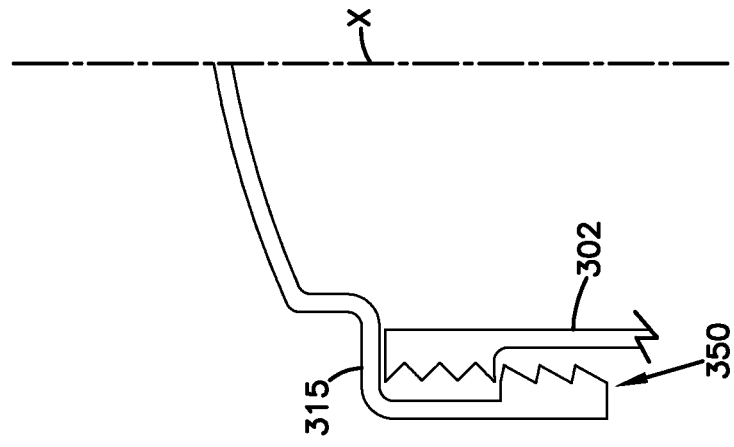
FIG. 35 is a schematic cross-sectional view of the arrangement depicted in FIG. 34, shown without a filter cartridge installed.
Figure 34:
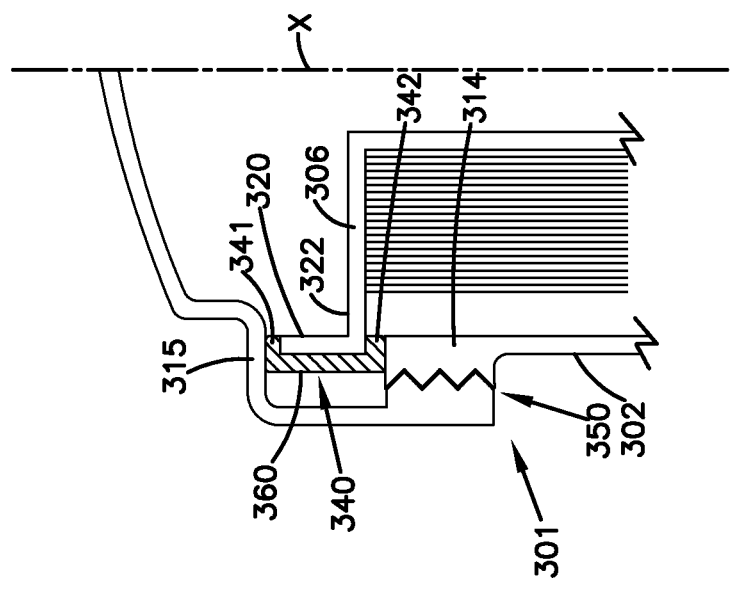
FIG. 34 is a schematic fragmentary cross-sectional view depicting selected features in accord with the present disclosure in a fourth embodiment.

FIGS. 34 and 35

In the previously described embodiments of FIGS. 1-33, the housing seal arrangements in each instance were radially directed seals. Alternate arrangements can be used. For example, the seal of the cartridge to the housing can be through vertically spaced, axially directed, seal members that engage the access cover and the housing base. An example of this will be understood from the schematic arrangements of FIGS. 34 and 35.

Referring to FIG. 34, an arrangement 301 is depicted comprising a housing 302. The cartridge 306 is positioned in the housing 302. The cartridge 306 includes an upper end piece 322 with housing seal arrangement 340 thereon. The housing seal arrangement 340 comprises a seal member 341 that engages service access 315, and a second seal member 342 that engages housing has 314. In general, each of seal members 341, 342 is a housing seal member that is axially directed. By this, it is meant that sealing portions are generally directed into the direction of central cartridge axis X. The seal members 341, 342 are vertically spaced, by spacer 320, positioned on end piece 322. In the embodiment of FIGS. 34 and 35, threaded engagement 350 between the housing access cover 315 and the housing base 314 is shown, but alternatives are possible.

In FIG. 35, it can be seen that when the cartridge 306 is not present, the spacer 320 is not positioned between the housing access cover 315 and the housing base 314. Therefore, as the service cover is rotated (threaded) a loose connection that will not tighten eventually results. This will immediately notify the service provider that the cartridge is not present.

Referring to FIG. 34, it is noted that seals or seal members 341, 342 are integral portions of a single molded-in-place member 360. While this is a convenient manufacture, an alternative in which the seal members 341, 342 are molded separately from one another, is possible.

VI. Some General Concepts and Features

A. An Example of Use—FIG. 36

Figure 36:
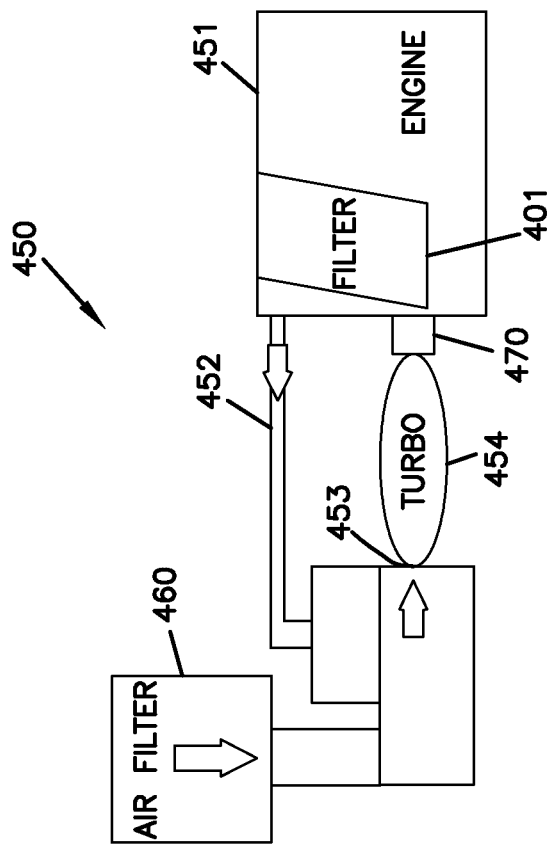
FIG. 36 is a schematic view of an equipment system using a crankcase ventilation filter assembly according to the present disclosure.

Attention is now directed to FIG. 36, wherein at 450 a typical equipment system is depicted, in which an assembly according to assembly 401 is used. The arrangement system 450 may be, for example, equipment powered by diesel engine, such as an over-the-highway truck.

Referring to FIG. 36, a filter assembly 401, in accord with descriptions herein, is depicted for filtering crankcase ventilation filter gases from engine 451. Filtered gas outlet flow from the filter assembly 451 is shown at line 452 optimally directed to an air induction system 453, from which the gases can directed through turbo 454 to engine air intake 470 for the engine 451. Thus, in the example system 450 depicted, filter assembly 401 is part of a closed crankcase ventilation filter assembly in which the filtered gases that leave the assembly 401 are directed back into the engine air intake 470. At 460, an air cleaner assembly or air filter system for the combustion air is depicted, also, directing filtered air to induction arrangement 453. Of course, filtered gas flow 452 can be directed to the air filter 460 or upstream, if desired.

Many of the techniques described in the present disclosure, are applicable in open crankcase ventilation filter systems. Here, the filter gas outlet flow from the filter assembly 451 would be directed to the atmosphere, instead of to an air induction system 453. This venting to the atmosphere may be preferred, when the filter gas flow in line 452 also includes condensed water as described for selected embodiments herein.

B. Crankcase Ventilation Filter Cartridges with First and Second Vertically Spaced Housing Seal Members In the examples described above, four embodiments of crankcase ventilation filter assemblies having first and second vertically spaced housing seals or members on a "first" end piece were described. In each instance the "first" end piece was the upper end piece in use, and had a central flow aperture therethrough. While the central air flow aperture in each instance was described as an "inlet" aperture by which gas to be filtered enters an open filter interior, in a reverse flow or "out-to-in" situation, the flow aperture in the first end piece would be a gas flow outlet aperture.

In general, the term "vertically spaced" in this context, is meant to refer to spacing between the seals or seal member (when sealing occurs) when a cartridge is oriented with a first end piece directed upwardly, i.e. in a normal use orientation. Another characterization provided is that the cartridge has a central axis X around which the media is positioned and the vertical spacing is spacing in the direction of the axis X, when the axis is oriented vertically.

Typically, the first and second vertically spaced seal members are vertically spaced by at least 0.5 mm, often at least 1 mm, usually at least 2 mm and usually not more than 50 mm, often not more than 40 mm, typically not more than 35 mm. Often the spacing is at least 5 mm and not more than 30 mm.

Typically, thus vertical spacing is provided by rigid structure on the cartridge. That is, seal members are separate and distinct from one another, and between them are provided a rigid structure portion of the first end piece that ensures the vertical spacing.

It is noted that in some examples, a third seal member can be positioned between the first and second vertically spaced seal members. When such is the case, while the third seal member may be vertically spaced from each of the first and second seal members, spacing may or may not correspond to the amounts characterized above.

There is no specific requirement as to whether the various ones of the seal member are integral portions of a single seal construction or separate seal members mounted on the filter cartridge. Further, there is no specific requirement as to the type of seal each seal member provides (radially directed, inwardly or outwardly directed, axially directed, upwardly or downwardly directed). Various example arrangements are described.

In selected arrangements provided herein, the cartridge includes a housing base/access cover spacer arrangement. Such an arrangement ensures that when the cartridge is installed in a housing for use, the access cover and housing base are spaced an appropriate distance apart to allow for tight engagement between the two; and, the housing base and access cover of the housing are typically configured so that when the cartridge is not present (and thus the spacer arrangement is not present) the access cover cannot be tightly engaged with the housing base. This provides an arrangement by which a service provider is immediately notified of the absence of a proper filter cartridge in the assembly. In selected examples depicted, the housing base/access cover spacer arrangement comprises a projection arrangement oriented to direct radially outwardly from a location positioned, in a direction of extension of the central cartridge axis of the cartridge, between the first housing seal member and the second housing seal member. In selected example arrangements, the spacer arrangement projects to a location radially outwardly from a maximum radial outward extension of each of the first housing seal member of the second housing seal member. This will be typical and convenient, although alternatives are possible.

In the examples depicted, the seals are generally "planar." That is, each seal is generally defined by a plane. In some arrangements, one or more of the seals can be "non-planar."

Examples are depicted which demonstrate that a variety of types of seal arrangements is used. In several arrangements, each of the seal members is a radially directed seal member. Specific examples in which each of the two radial seal members is a radially outwardly directed seal member are provided.

Examples are described in which the seal members are in planes generally parallel to one another, and in specific examples those planes extend generally orthogonal to the central cartridge axis. In selected embodiments, one of the radial seals is in a plane generally orthogonal to the central cartridge axis, and the other seal is not orthogonal to the cartridge central axis. It is generally described that typically the seal that is not orthogonal to the central axis, is in a plane that intersects a plane perpendicular to (i.e. orthogonal to) the central axis at a smallest acute angle of at least 1° typically not more than 30° and often within the range of 2°-20°, inclusive.

Within the variety of examples provided, are examples that demonstrate that the seal members can be two axially directed seals that are separated by rigid structure.

The vertically spaced seal members in the first end piece are generally configured so that each is positioned to seal with one of two separable housing components. The two separable housing components generally comprise: an access cover; and, a housing bottom or base.

In the assemblies depicted, although alternatives are indicated, the features are particularly configured for use in crankcase ventilation filter assemblies in which the access cover is secured to the housing base with a rotation (or rotatable) interlock or connection system. In the depictions provided non-threaded rotational engagements are shown; and, threaded rotational engagements are shown.

In examples the first and second vertically spaced housing seal members are radial seal members, and each have a largest perimeter cross-dimension. When the seals are circular and in a plane orthogonal to the central axis, this largest perimeter cross-sectional dimension is a diameter. Indeed, even when the seal is in a plane non-orthogonal to the cartridge central axis, if the seal is circular in that plane, the largest perimeter cross-dimension can also be viewed as a diameter. However, in some instances, with a slanted seal or a seal in a plane non-orthogonal the central cartridge axis X, the seal will be somewhat oval in shape, defining a circular pattern in projection into a plane orthogonal to the central axis.

Arrangements are depicted in which one of the seal members has a larger "largest" perimeter cross-sectional dimension than the other. This will be typical, but is not specifically required in all applications of vertically spaced housing seal members in accord with the present disclosure.

Typical embodiments are described in which the filter cartridge is provided with first and second end pieces, the first end piece having the first and second vertically spaced housing seal members thereon, the second end piece typically being a closed end piece, i.e. having no aperture therethrough in communication with an open cartridge interior.

C. Provision of a Housing Base/Access Cover Spacer Arrangement

According to the present disclosure, a crankcase ventilation filter cartridges are described which include a housing/ base access cover spacer arrangement thereon. In general, the term "housing base/access cover spacer arrangement" and variants thereof is meant to refer to a structure on the cartridge that provides spacing between the housing base and the access cover. This is used to ensure that a mechanism for a locking engagement between the housing base and the access cover is positioned to provide secure interlock only when the cartridge is in place. The particular housing base/access cover spacer arrangements depicted and described in the examples, are configured to operate with a crankcase ventilation filter assembly in which the housing is configured for the access cover to be secured to the housing with a rotation interlock arrangement, i.e. a rotatable mounting ring. Interlock arrangements are described which use non-threaded engagement, as well as ones that include threaded engagement.

The housing base/access cover spacer arrangement in some embodiments is a projection arrangement on the cartridge that extends to a location between selected portions of the access cover and the housing base. This projection is typically independent of seal members, i.e. does not comprise a seal member itself. Indeed, it typically projects radially outwardly to a location beyond a furthest extent of projection of any seal member.

In one embodiment in which axial seal members are used for the first and second seal members, the spacer arrangement is an extension between the two axial seal members that does not project radially outwardly from the cartridge. It is positioned, however, to be engaged by the housing, even when the housing cover is configured to be secured in place with a rotatable connection.

Typically, the spacer arrangement is configured to have a vertical space dimension of at least 0.5 mm, typically at least 1 mm, often 2 mm usually at least 3 mm or more, and in some instances 5 mm or more. It is typically not configured to provide a spacer larger than about 50 mm and typically not larger than about 40 mm, although alternatives are possible.

D. Implementation with a Rotational Alignment Arrangement for engagement between the Filter Cartridge and the Service Cover In example arrangements a rotational alignment arrangement was provided ensuring proper rotational orientation between the cartridge 6 and a portion of the service cover assembly 15 during use. In the embodiment of FIGS. 1-29, that rotational alignment arrangement was provided between projections 94 on the first end piece 22, and inner projection 90 on central cover portion 50 and was described in connection with FIGS. 26 and 27. In general, a rotational orientation arrangement provides that proper engagement of the cover section 50 and the cartridge 6 occurs. The particular rotational orientation depicted, is a projection/receiver arrangement in which the projection member 78 on the service cover cannot fully engage the access cover 50, unless a projection arrangement comprising projections 94 on the access cover is appropriately rotational aligned relative to a receiver arrangement comprising receivers or gaps 90r, 90x on the service cover arrangement 15. Alternatives are possible.

E. Implementation of Alternatives and Specific Features in the Various Embodiments Described It is noted that alternative features described with respect to the various embodiments, can be implemented with other embodiments. For example, the embodiment of FIG. 1 can be implemented with a threaded engagement arrangement, instead of a non-threaded rotational interlock between the access cover and the housing base. Indeed, also the arrangements of the various embodiments can be implemented with various features from the embodiment of FIG. 1. Further, in the embodiment of FIG. 30, the access cover is depicted as entirely rotatable for mounting on a housing on a housing base. It can alternately be mounted with a rotatable mounting ring.

Threaded mounting arrangements versus non-threaded mounting arrangements can be used alternatively in the various embodiments. The selection is a matter of choice for a given system.

It is noted that various embodiments are depicted in fragmentary view. Other features of the housing and cartridge in those embodiments can be variations of features previously described for other embodiments, although alternatives are possible.

VII. Usable Media

A variety of media appropriate for gas/liquid separation can be used, and the choice of one for the application of interest is not critical to many of the particular features described herein. Example usable media include those described in WO 2006/084282; WO 2007/0535411; WO 2008/115985; and, WO 2006/91594 incorporated herein by reference.

VIII. A Further Example Embodiment

FIGS. 37-56

In FIGS. 37-56, an additional embodiment is depicted. The arrangement of FIGS. 37-56 includes many of the features shown and described in the previous described embodiments. Indeed the embodiment of FIGS. 37-56 can be viewed as an improvement in, and variants to, the specific embodiment of FIGS. 1-27.

In general, features similarly characterized, described and/or depicted in the embodiment of FIGS. 37-56 provide similar function/operation/advantage to features described for the embodiment of FIGS. 1-27. Indeed, the embodiment of FIGS. 37-56 can be implemented with similar dimensions to those described for FIGS. 1-27, although alternatives are possible.

Figure 37:
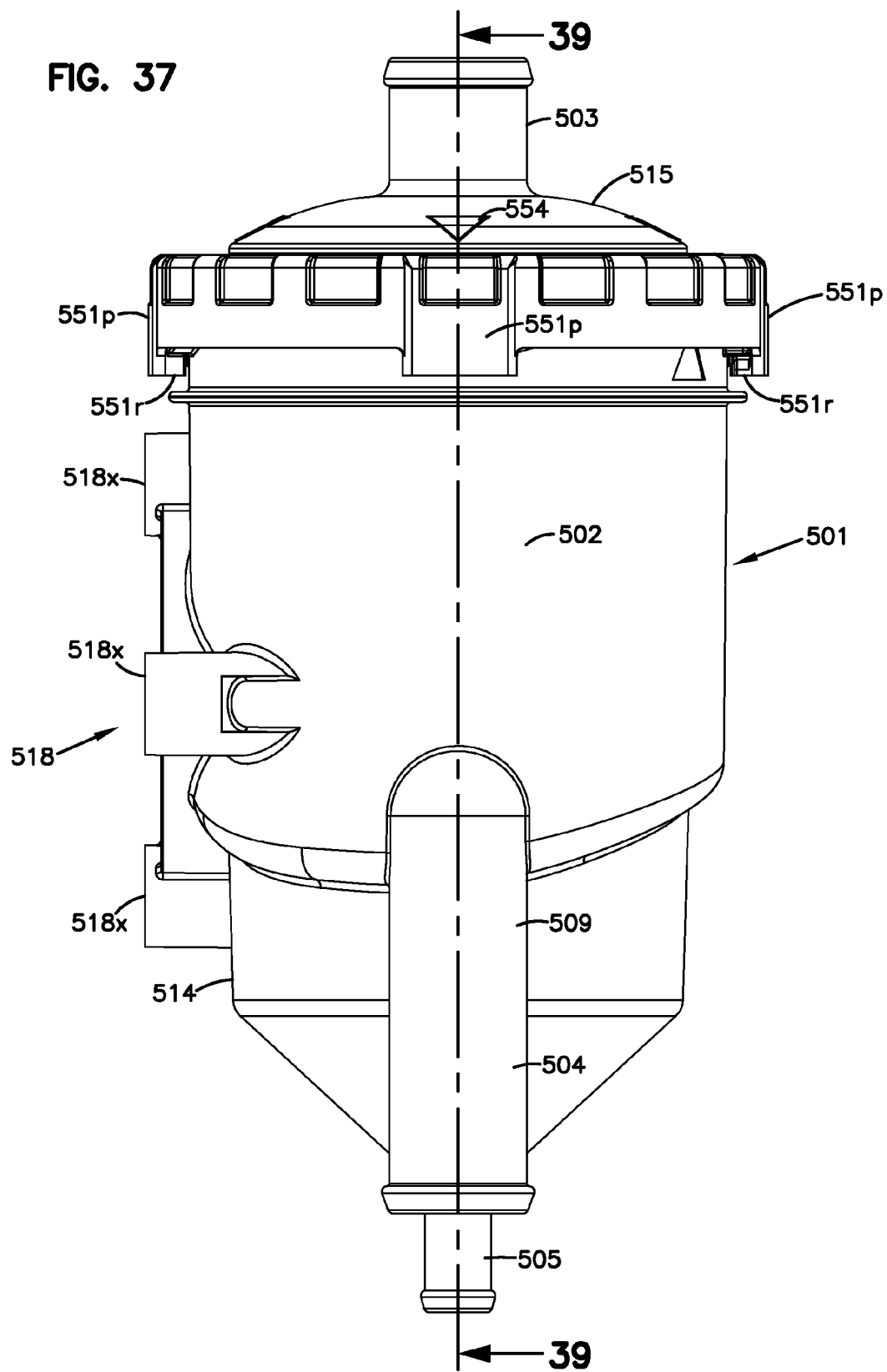
FIG. 37 is a schematic side elevational view of a fifth embodiment of the present disclosure.

Referring first to FIG. 37 at 501 a crankcase ventilation filter assembly is generally depicted. The assembly 501 generally comprises a housing 502 having: a gas flow inlet arrangement 503; gas flow outlet arrangement 504 and a liquid (oil) drain outlet arrangement 505. Within the housing 2 is a serviceable filter cartridge 506 (not shown in FIG. 37; see the cross-sectional view of FIG. 39). It is noted that the assembly 501 uses similar optional features for condensed water drainage as the arrangement 1 described above. Thus, outlet 504 is also a condensed water drain outlet arrangement 509. Of course, as with previously described embodiments, each of flow arrangements 503, 504, and 505 although depicted as a single tube, can be configured as a multiple tube or aperture arrangement.

Still referring to FIG. 37, the housing 502 generally comprises a housing base or bottom 514 having, removably secured thereto, an access cover or service cover arrangement 515. As with the access cover or service cover arrangement 15 of FIG. 1, cover arrangement 515 can be removed from a housing base 514 for service access to an interior 502i of the housing 502. This allows for installation and removal of internally positioned (serviceable) filter cartridge 506.

As with assembly 1, connection or mounting interaction between the service cover arrangement 515 in the housing base 514 is a rotational interaction arrangement; i.e. at least a portion of the service cover 515 is rotated relative to the housing base 514 to securely connect the two. Again, this is typical but not required in all applications of the techniques described herein.

As with the assembly of FIG. 1, the example gas flow inlet arrangement 503 is a top gas flow inlet arrangement, generally configured to project upwardly for gas flow entrance into the assembly 501. This is typical, although, again, alternatives are possible.

Still referring to FIG. 37, it is noted that assembly 501 includes, on the housing base 502, mounting pad arrangement 518, in the example mounted on the base 514. The particular mounting pad arrangement 518 depicted comprises mounting posts, pads or receivers 518x, typically each having a threaded metal insert for engagement by a bolt or similar connected arrangement, although alternatives are possible.

Still referring to FIG. 37, it is noted that for the particular example assembly 501 depicted, the gas flow inlet arrangement 503 is in the service access cover 515; and, the gas flow outlet arrangement 504 and coalesced liquid drain outlet arrangement 505 are provided in the housing base 514. Again, although alternatives are possible, such an arrangement is typical.

Figure 39:
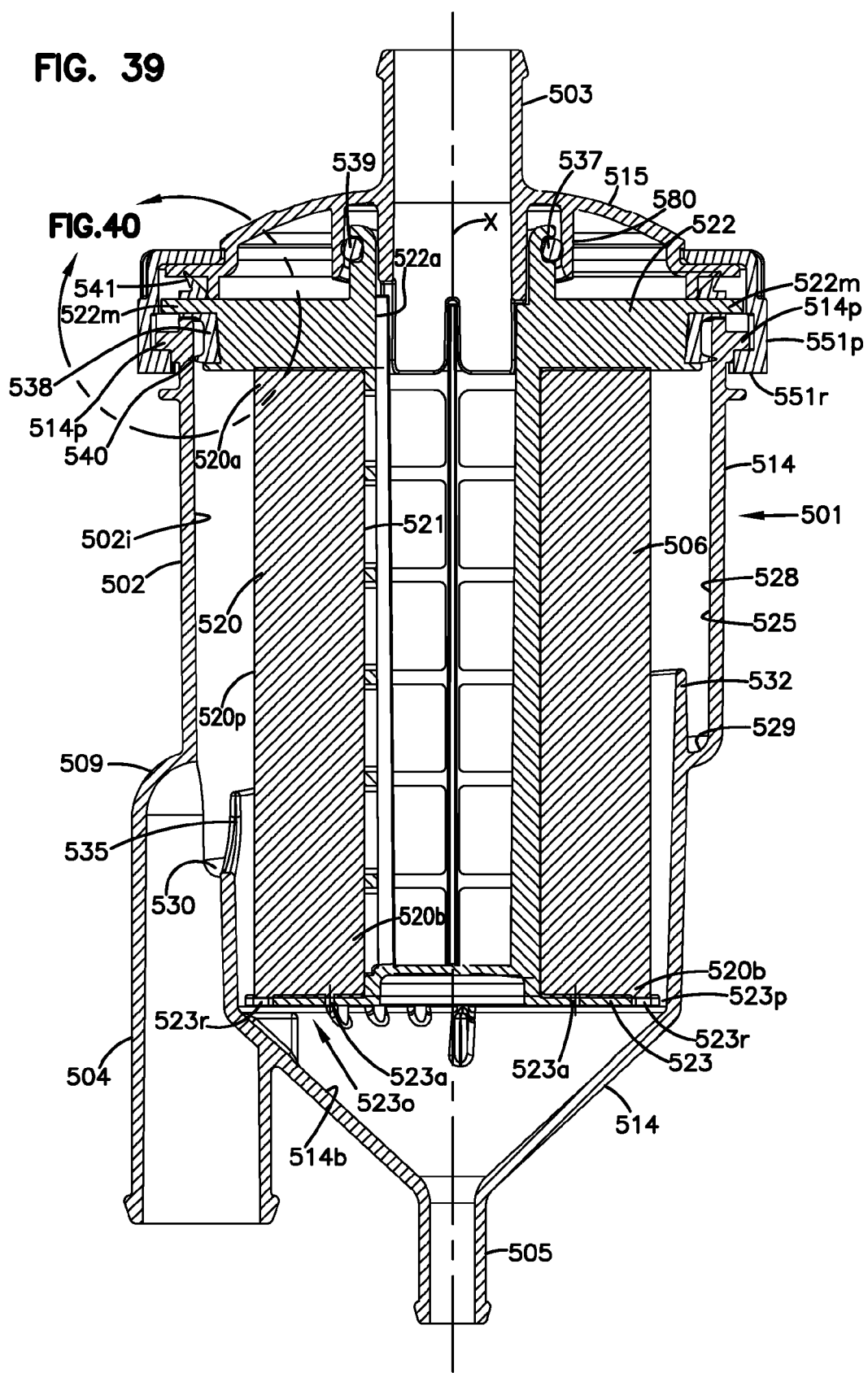
FIG. 39 is a second schematic cross-sectional view of the arrangement of FIG. 37, the view of FIG. 39 being taken generally along line 39-39, FIG. 37.

FIG. 39 is a cross-sectional view taken generally along line 39-39, FIG. 37. In FIG. 39, the cross-sectional view shows the cartridge 506 previously identified, operably positioned within interior 502i of housing 502. Referring to FIG. 39, in general, cartridge 506 comprises an extension of media 520 positioned around an open filter interior 521. One end 520a of the media 520 is positioned adjacent end piece 522. End 520a is an upper end, in use. A second end 520b in the example cartridge 506 depicted, is an end opposite end 520a, and is positioned adjacent end piece 523. Thus, for the example cartridge 506 depicted, the media 520 is positioned in extension between the first and second end pieces 522, 523.

As with previously described embodiments the housing 502, assembly 501 and cartridge 506 can be characterized as having a central longitudinal axis X, FIG. 39. In general, in descriptions herein, the direction of extension of the central axis X will be referred to as an "axial direction" and when features are characterized as "axially spaced" it is meant that they are spaced from one another in a direction of longitudinal axis X. Since longitudinal axis X is normally a vertical axis in typical use, such features may be characterized as "vertically spaced," with the term "vertical", "vertical direction" and variants referring to the same direction as the direction of longitudinal extension or axial direction.

Still referring to FIG. 39, in operation crankcase gases or engine blowby gases are directed into the assembly 501 through inlet arrangement 503. The gases are then directed through flow aperture 522a in end piece 522 and into the open filter interior 521. The gases then flow (with filtering) through the media pack 520 to annulus 525. The annulus 525 is in gas flow communication with filtered gas flow outlet arrangement 504.

As with the previously described embodiments, during operation, and within the media 520, liquid carried within the gases will coalesce and develop a liquid head. Under gravity, the liquid will tend to drain outwardly from the media 520 (and cartridge 506). Some of the liquid may reach a downstream (in the example outer) perimeter 520p of the media pack 520 before it drains downwardly at the lower end 514b of housing bottom or base 514, and eventually, under gravity and prompted by a funnel configuration as shown, to coalesced liquid drain outlet arrangement 505. Some of the liquid can pass directly downwardly from the media lower end 520b through use of a media axial overlap drain arrangement 523o. Although alternatives are possible, as with previously described embodiments herein, arrangement 523o can comprise an optional, advantageous, media axial overlap drain arrangement using principles described in WO 2007/053411 incorporated herein by reference.

In general terms, the media axial overlap drain arrangement 523o comprises one or more portions of the lower end 520b of the media 520 that are not directly blocked from drainage downwardly therefrom of liquid, by the lower end piece 523. In the particular example embodiment depicted, the media axial overlap drain arrangement 523o comprises spacers or apertures in and/or through the second end piece 523 (lower in installation) that allow drainage directly downwardly from end 520b of liquid. It is noted that in some applications the media axial overlap drain arrangement 523o can include or comprise portions of the media end 520b extending (radially outwardly) beyond any portion of extension of the end piece 523.

Referring to FIG. 39, one of the features of the media axial overlap drain arrangement 523o comprises a plurality of recess 523r in an outer perimeter 523p of the lower end piece 523, each recess extending radially inwardly to a location underneath (i.e. overlapped by) media 520. The second example feature comprises an aperture arrangement; in the example depicted comprising a plurality of apertures 523a through the end piece 523, at a location underneath the media 520. As with previously described embodiments, there is no specific requirement that the media axial overlap drain arrangement 523o comprise either or both of the specific types of features described and depicted. Further, when the media axial overlap drain arrangement is present there is no requirement that all of the liquid that drains from the media 520 drain via the media axial overlap drain arrangement 523o. Rather, some liquid can be directed to drain outwardly from the outer perimeter 520p of the media 520.

Still referring to FIG. 39, it is noted that should water vapor condense against an interior surface 528 of housing base or bottom 514, it can drain downwardly to condensed water vapor outlet 509, which, in this instance, also comprises gas flow outlet 504. Thus, the housing base or bottom 514 includes sidewall 532 and optional coalesced water collection/drainage arrangement 529. The optional water collection/drainage arrangement 529 depicted comprise drain channel or gutter 530 analogous to gutter 330 previously described. The gutter 530 is generally slanted to funnel or channel moisture to outlet 535 and into drain arrangement 509 (i.e. gas flow outlet 504).

As with previously described arrangements, the cartridge 506 is provided with a housing seal arrangement. The housing seal arrangement generally inhibits gas flow entering the housing 502 from bypassing media 520 and reaching gas flow outlet 504. The housing seal arrangement for the particular assembly 501 depicted can be understood by general reference to FIGS. 39 and 40.

Referring to FIG. 39, as indicated previously, the cartridge 506 comprises media 520, in the example depicted positioned between opposite end pieces 522, 523. For the assembly 501 depicted, the cartridge 506 is provided with a housing seal arrangement comprising first and second housing seal arrangements 537, 538 each having at least one seal or seal member 539, 540, respectively, thereon. In the example depicted, the housing seal arrangement comprises first and second housing seals or seal members 539, 540, each positioned on the first end piece 522. The first end piece 522 is typically configured as a rigid structural member (metal or plastic) which supports the seal members 539, 540.

As will be described in further detail below, although alternatives are possible, the end piece 522, in the example depicted, comprises: a portion of the spool including an internal support around which the media 506 is depicted; and, also end piece 523. When the cartridge 506 is configured in this manner, a reference to the end piece 522 is meant to refer generally to the structural member positioned adjacent to and in overlap with end 520a of the media 506, and not to the internal support surrounded by the media. That is, the first seal member 539 and the second seal member 540 are positioned on an end piece 522, that itself is positioned adjacent end 520a of the media 520.

In the example depicted, by analogy to previously described arrangements, seal members 539, 540 are axially (i.e. vertically) spaced. Again, by the term "vertically spaced" in this context, it is meant that the seal or seal members 539, 540 are spaced vertically from one another, when the cartridge 506 is oriented with central axis X extending vertically. By the term "axially spaced" and variants thereof in this context, it is meant that the spacing is in the general direction of extension of central axis X. Usually the amount of vertical spacing between first and second seals or seal members 539, 540 is at least 0.5 mm, usually at least 1 mm and, typically at least 2 mm, often at least 5 mm, for example at least 8 mm. Typically it is not more than 50 mm, usually not more than 40 mm, and often not more than 30 mm, although alternatives are possible. For example, in many embodiments this spacing is within the range of 5-40 mm, inclusive, often 8-30 mm, inclusive.

Typically, the seal members 539, 540 are isolated from one another (and are not integral with one another) as previously discussed for the embodiment of FIGS. 1-27, although alternatives are possible. The first and second seals or seal members 539, 540 can be formed integrally with one another as part of a single overmold or molded section of seal material, with regions appropriately spaced to form the desired seals. As previously indicated, herein when it is stated that the arrangement includes first and second seals or seal members, it is not meant to be indicated whether or not the seal or seal members are formed completely separately from one another and/or are or are not portions of a single integral region of seal material, unless it is specifically stated or unless it is indicated that each comprises structure that would be inherently be separate from one another.

Herein, when it is said that the first and second housing seal members 539, 540 are spaced vertically and/or axially as characterized, it is not meant to be suggested that there is not or cannot be an additional seal member, for example a third seal member, that is positioned between them, nor is it meant to be suggested that such a third seal member cannot be positioned vertically or axially spaced from one or both of the first and second housing seal members 539, 540, by less than the preferred amounts stated for spacing of the first and second seal members from one another. Indeed, as will be understood from further descriptions below, the particular cartridge 506 depicted includes a third seal member between the first and second seal members.

Typically, first seal member 539 is a housing seal or seal member positioned to releaseably seal against a portion of cover assembly 515; and, second housing seal or seal member 540 is positioned to seal against a portion of the housing base 514, for a housing 502 in which the cover assembly or base 514 are separable from one another. Thus, gas flow that enters through inlet 503 cannot reach outlet 504 without being filtered; and, gas flow that enters through inlet 503 is directed into aperture 522a and is inhibited from escaping out of the housing 501 between the access cover 515 and base 514.

Herein, when it is said that a housing seal or seal member is positioned to form a "releasable seal" or by variants thereof, as previously indicated it is meant that: the seal will be engaged when the cartridge 506 is properly installed in a housing 502; and, the seal will disengage when the cartridge 506 is separated from a portion of housing 502 against which it seals, without damage to either the housing or the seal.

Still referring to FIG. 39, it is noted that in the example cartridge 506 depicted, the second seal member 540 comprises a portion of a seal arrangement 538 that also includes an additional (third) seal member 541 that engages the cover assembly 515. This is discussed further below. In general, then, when it is said that a housing seal arrangement 540 is configured to engage the housing base 514, it is not meant to be specifically indicated, without more, whether the seal member 540 comprises a portion of a seal arrangement 538 that does or does not also have additional seal portion that engages elsewhere, such as portion 541 that engages access cover arrangement 515.

Figure 40:
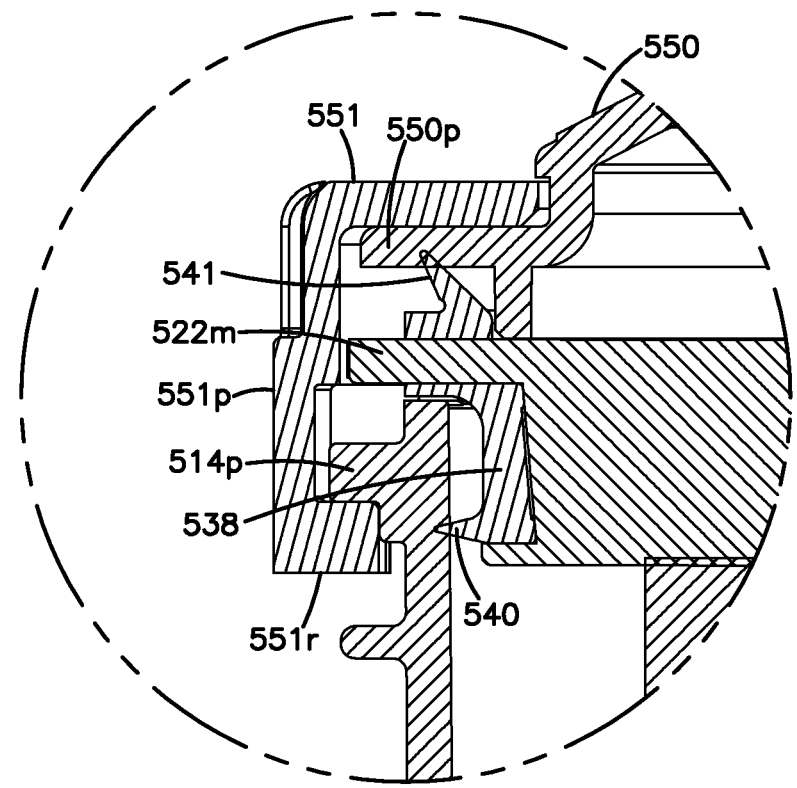
FIG. 40 is an enlarged fragmentary schematic view of an identified portion of FIG. 39.

Attention is now directed to FIG. 40, for an enlarged fragmentary view of a portion of FIG. 39, allowing for viewing of seal arrangement 538, seal member 540 and seal member 541 in greater detail.

Figure 38:
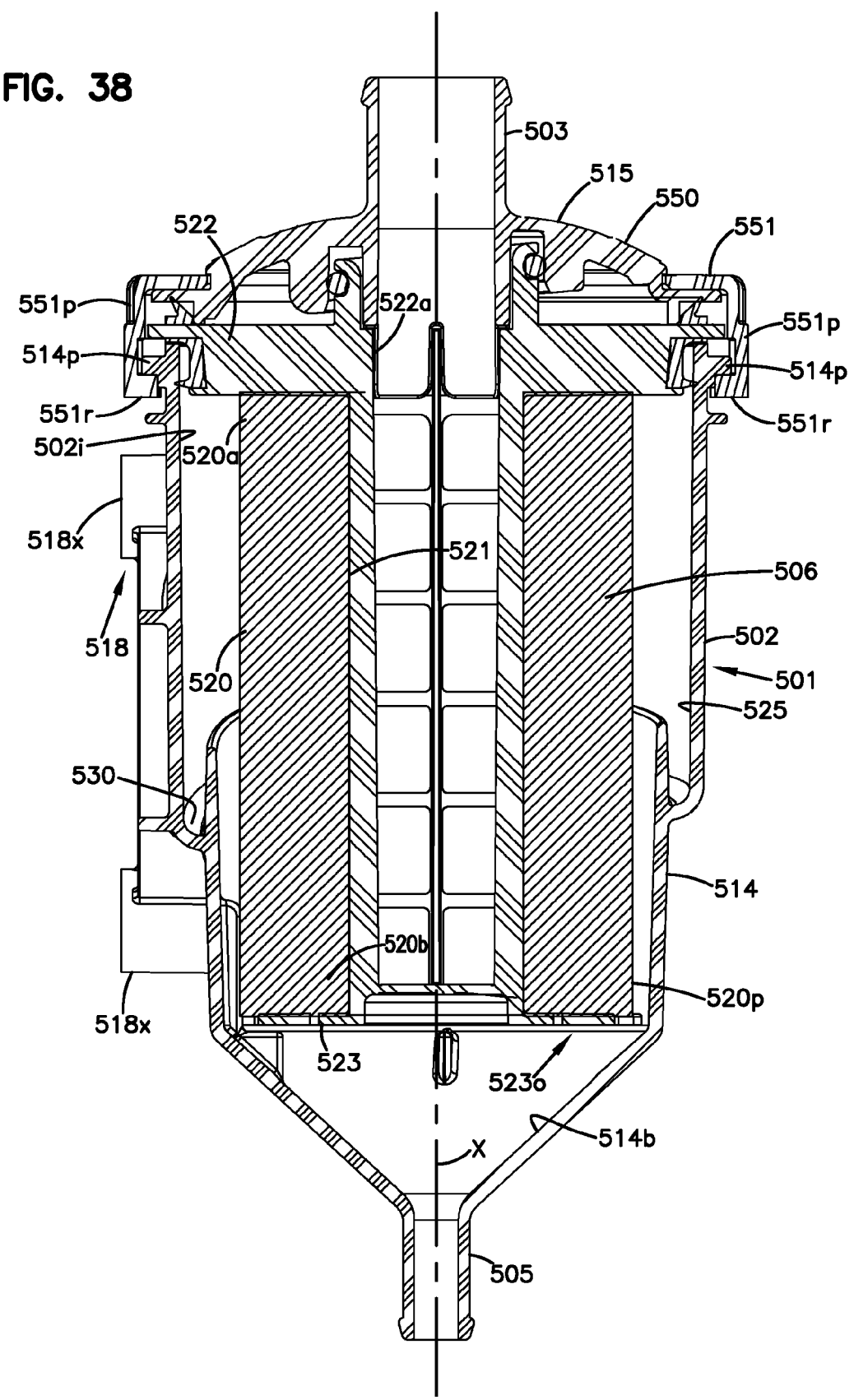
FIG. 38 is a first schematic cross-sectional view of the arrangement of FIG. 37.

Attention is directed to FIG. 38. FIG. 38 is a cross-sectional view analogous to FIG. 39, except taken at a different location. In general, the assembly 501 can be viewed as having been rotated counterclockwise from FIG. 39, if viewed from the top, sufficiently so that that the entire outlet tube 504 (FIG. 39) is no longer viewable. In FIG. 38, features corresponding to those previously described are numbered accordingly.

Figure 41:
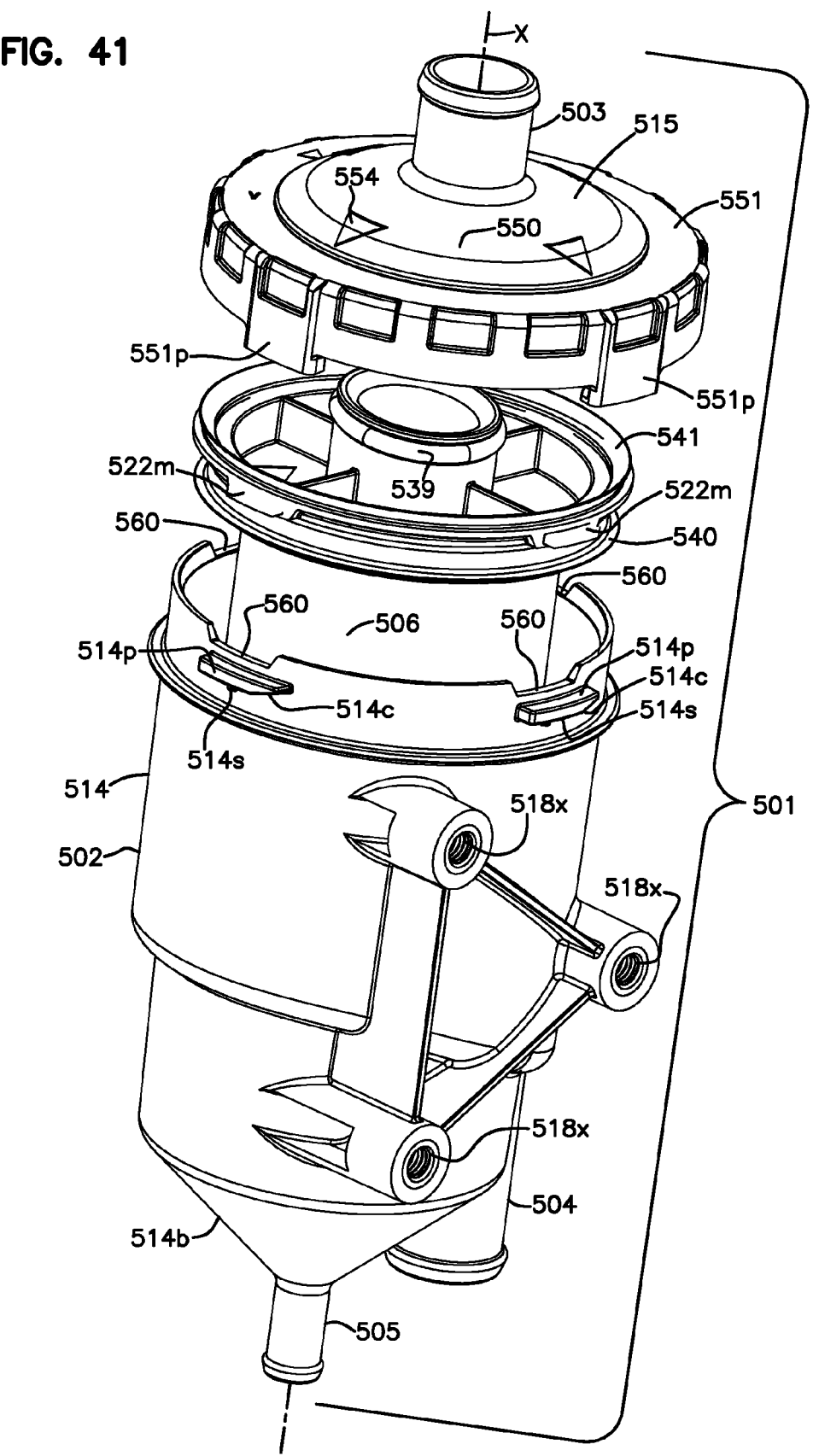
FIG. 41 is a first, schematic, exploded top perspective view of the assembly of FIG. 39.
Figure 42:
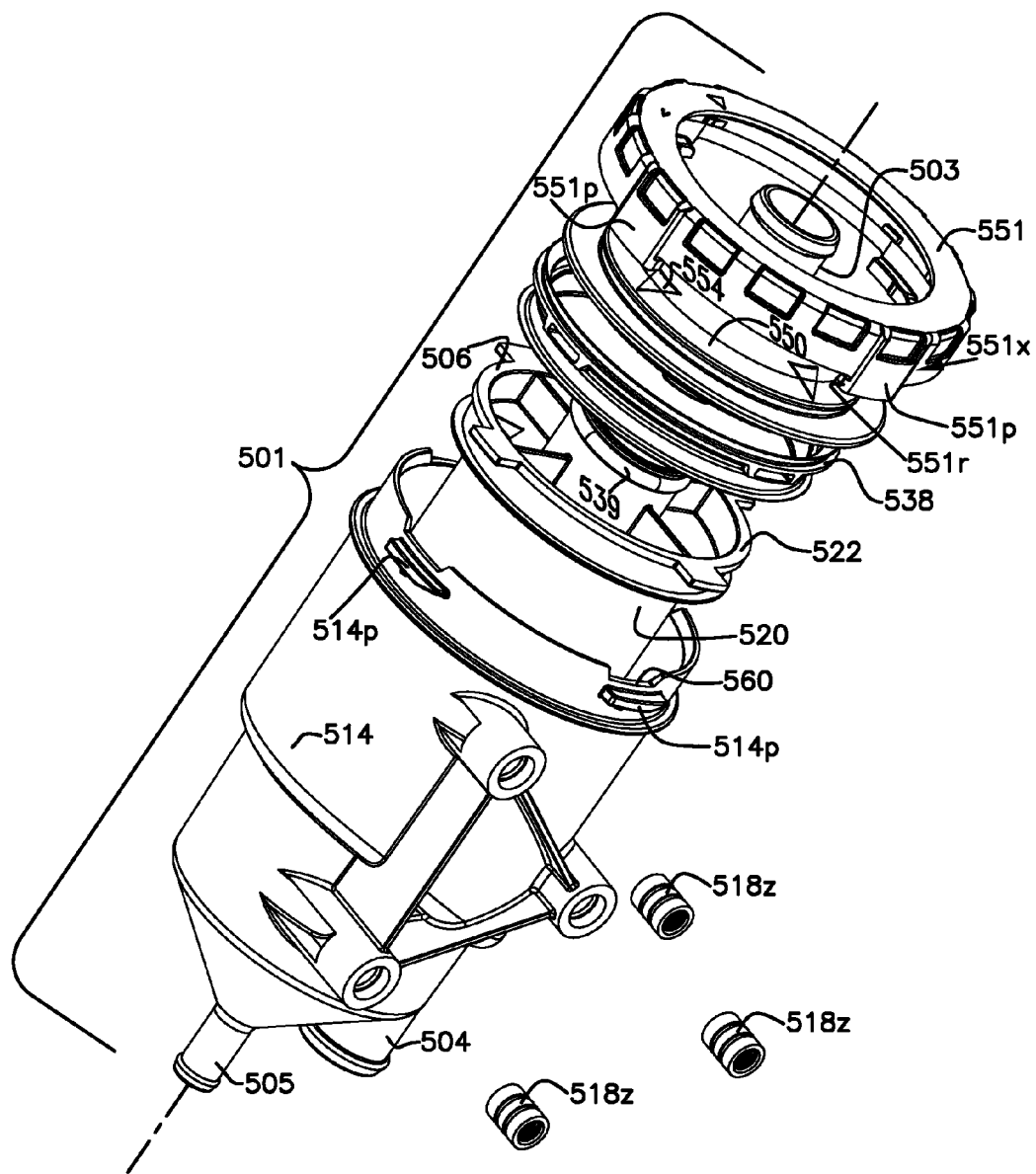
FIG. 42 is a second schematic, exploded, top perspective view of the arrangement of FIG. 39.

Attention is now directed to FIGS. 41 and 42, in which various exploded views of the assembly 501 are provided.

Referring first to FIG. 41, the assembly 501 is depicted with a cover assembly 515 separated from the housing base 514. Cartridge 506, partially removed from housing base 514, can be viewed. It is noted that the depiction of FIG. 41 is partially exploded, and generally reflects how the components would separate (in the field) during normal servicing.

As with the arrangement of FIG. 11, the cover assembly 515 for the particular assembly 501 depicted, comprises a center piece or central cover (portion) 550 and a peripheral mounting ring 551. For the example depicted, when the service cover assembly 515 is positioned in the assembly 501, the mounting ring 551 is rotatable relative to the centerpiece (central cover) 550. The mounting ring 551 is rotatable between locked (tightened) and unlocked (loosened) positions. When the mounting ring 551 is in the unlocked position, the access cover or cover assembly 515 can be removed from the housing base 514. When the mounting ring 551 is rotated to the locked (tightened) position, the cover assembly 515 cannot be separated from the housing 514. It is observed that in FIG. 41, the mounting ring 551 is depicted oriented rotationally in the locked or tightened position relative to the housing base 514, in the exploded view depicted.

Still referring to FIG. 41, it is noted that for the particular assembly 501 depicted, the mounting ring 551 and housing base 514 are configured so that: normally rotation to the tightened or locked positioned is a clockwise rotation, when viewed from the top; and, so that rotation to the unlocked orientation is a counterclockwise rotation, when viewed from the top. Of course, oppositely operating configurations are possible.

Attention is now directed to FIG. 42. FIG. 42 is a second top perspective (isometric) exploded view of the assembly 501. It shows further separation of components from FIG. 41, and indeed depicts how selected components can be made for assembly, as opposed to the way the parts would be separated during servicing.

For example, referring to FIG. 42, attention is directed to housing base 514. Here threaded inserts 518z are shown separated from mounting pads 518x. Normally once the base 514 is assembled with the threaded inserts 518z therein, the inserts 518z are not separated again during normal lifetime of the product. Also referring to FIG. 42, centerpiece 550 and ring 551 are shown exploded or separated. Normally, once the two parts are secured (for example snap-fit) together, during initial assembly of the arrangement 501, they are typically not again separated during the product lifetime.

Still, referring to FIG. 42, seal member or arrangement 538 is shown separated from end piece 522. For a typical assembly, once the seal member 538 is put in place on end piece 522, it is typically not again separated during the lifetime of use of the cartridge 506, although alternatives are possible. Seal member 538 is discussed further below in connection with other figures.

It is noted that even in FIG. 42, not all components are shown fully exploded. For example, seal 539 is depicted positioned on cartridge 506, as a seal member positioned therearound. Further, the media 520 is shown positioned as part of the cartridge 506.

Operation of the mounting ring 551, is generally analogous to ring 51, discussed in connection with the arrangement of FIGS. 1-27. It can be understood that the mounting ring 551 includes a lock projection arrangement 551x comprising a plurality of lock projections 551p each having a lower radially inwardly extending projection 551r, see FIGS. 39, 40. After the cover 515, FIGS. 37-41, is positioned in the housing base 514, the mounting 551 can be rotated until the lower projections 551r are positioned underneath projections 514p, FIG. 41, on the housing base 514. The housing base 514 and mounting ring 551 can be provided with configurations for interference fit to inhibit unlocking under vibration of equipment involved. Also, the projections 514p can be provided with a cammed engagement surface for initial engagement with the lock projections 551p, to facilitate locking. Such cammed arrangements are shown at 514c, FIG. 41.

Similarly to the arrangement of FIGS. 1-27, the mounting ring 551 is configured to rotate independently of cover center 550 during locking of access cover 515 in place, so that, after unlocking, the entire access cover 515 can be removed. Optional indicia 554 can be provided on the centerpiece 550, with additional indicia provided on mounting ring 551, configured to operate together to show when locking or unlocking has been achieved.

As with the arrangement FIGS. 1-27, the depicted engagement between the mounting ring 551 (i.e. the service cover assembly 515) and a housing base 514 is through a "non-threaded rotational engagement arrangement." The example rotational engagement arrangement comprises a plurality of holders or locking projections 551p, on the ring 551, which align (during locking) with a plurality of projections or holders 514p on the housing base 514 without the engagement using threads. Of course, in the alternative, a threaded arrangement (a form of rotational engagement arrangement) can be used with many of the principles of the embodiment of FIG. 1.

Figure 43:
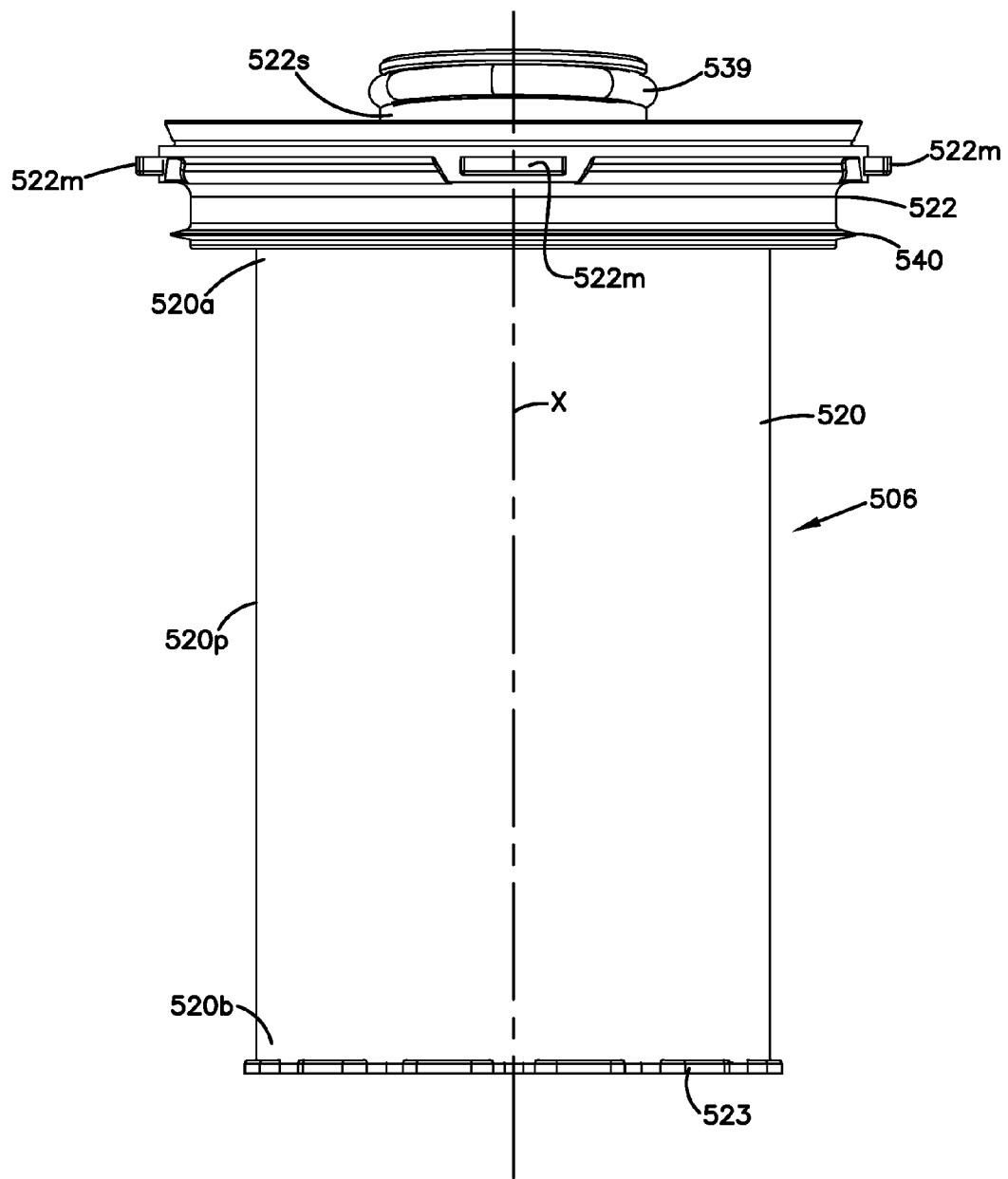
FIG. 43 is a schematic first side elevational view of a filter cartridge component of the arrangement of FIGS. 37-39.
Figure 44:
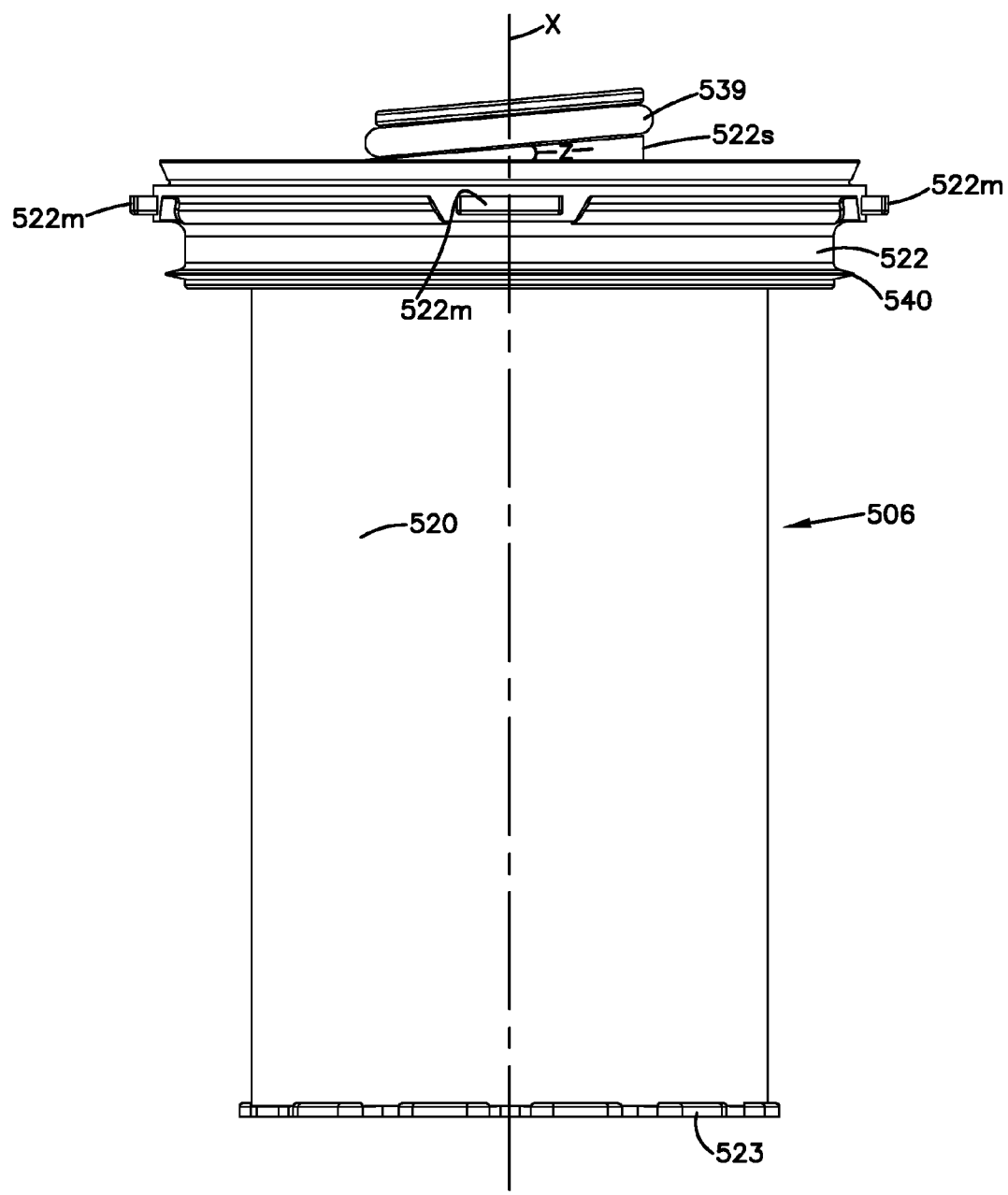
FIG. 44 is a second schematic side elevational view of the filter cartridge component of FIG. 43.
Figure 45:
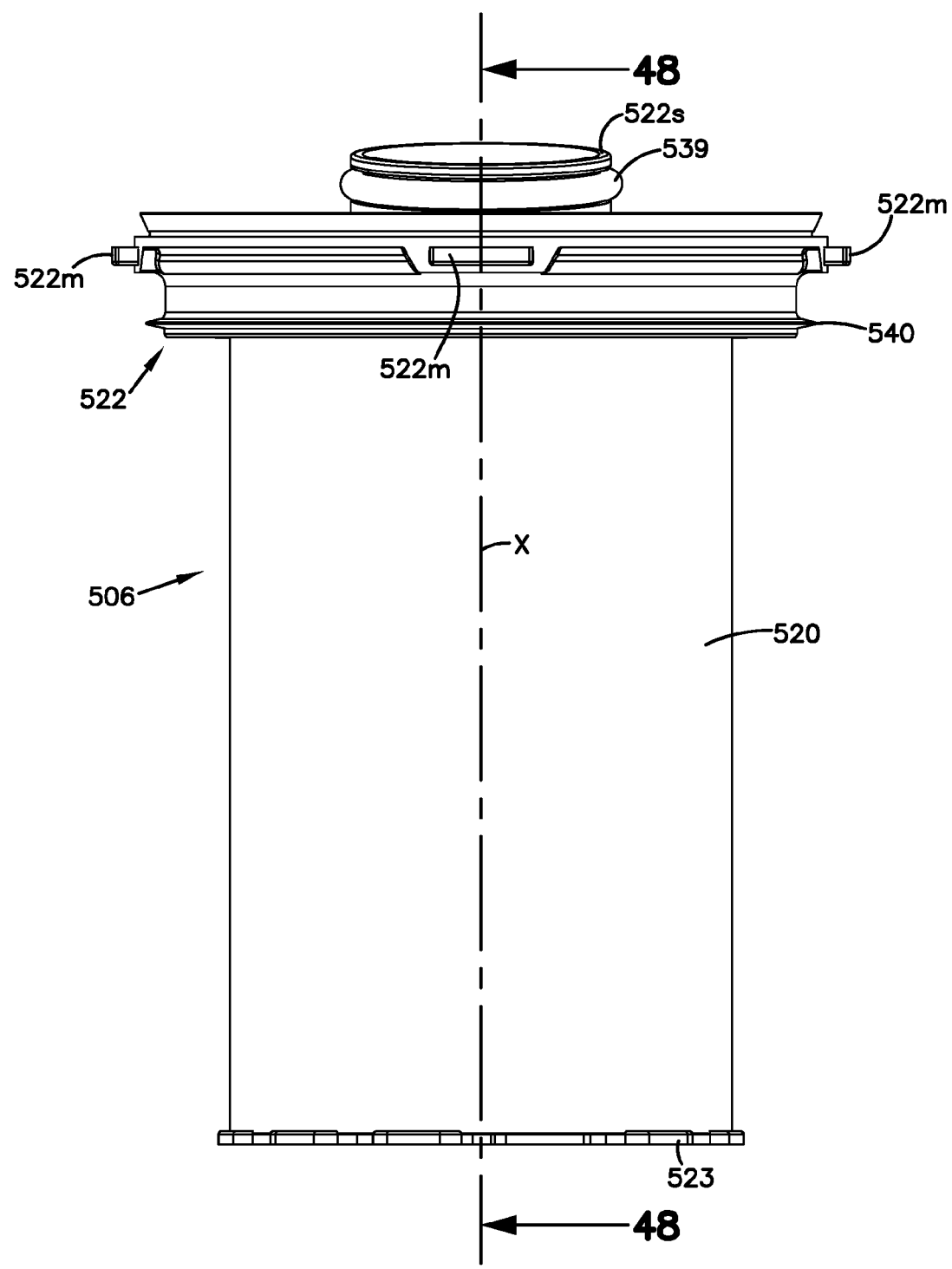
FIG. 45 is a third side schematic side elevational view of the filter cartridge component of FIG. 43.

Attention is now directed to FIGS. 43-54 with respect to the configuration of the cartridge 506 and components attached to the cartridge 506. In FIGS. 43-45, various side elevational views of the cartridge 506 are depicted. Referring to FIG. 44, the particular first seal member 539 depicted, defines a seal non-orthogonal to central axis X. Indeed, in the example the seal member 539 defines a planar seal that is non-orthogonal to central axis X. The view of FIG. 43 is toward the high side of seal 539, and the view of FIG. 45 is toward the low side of seal 539. The seal 539 is discussed further below.

Figure 46:
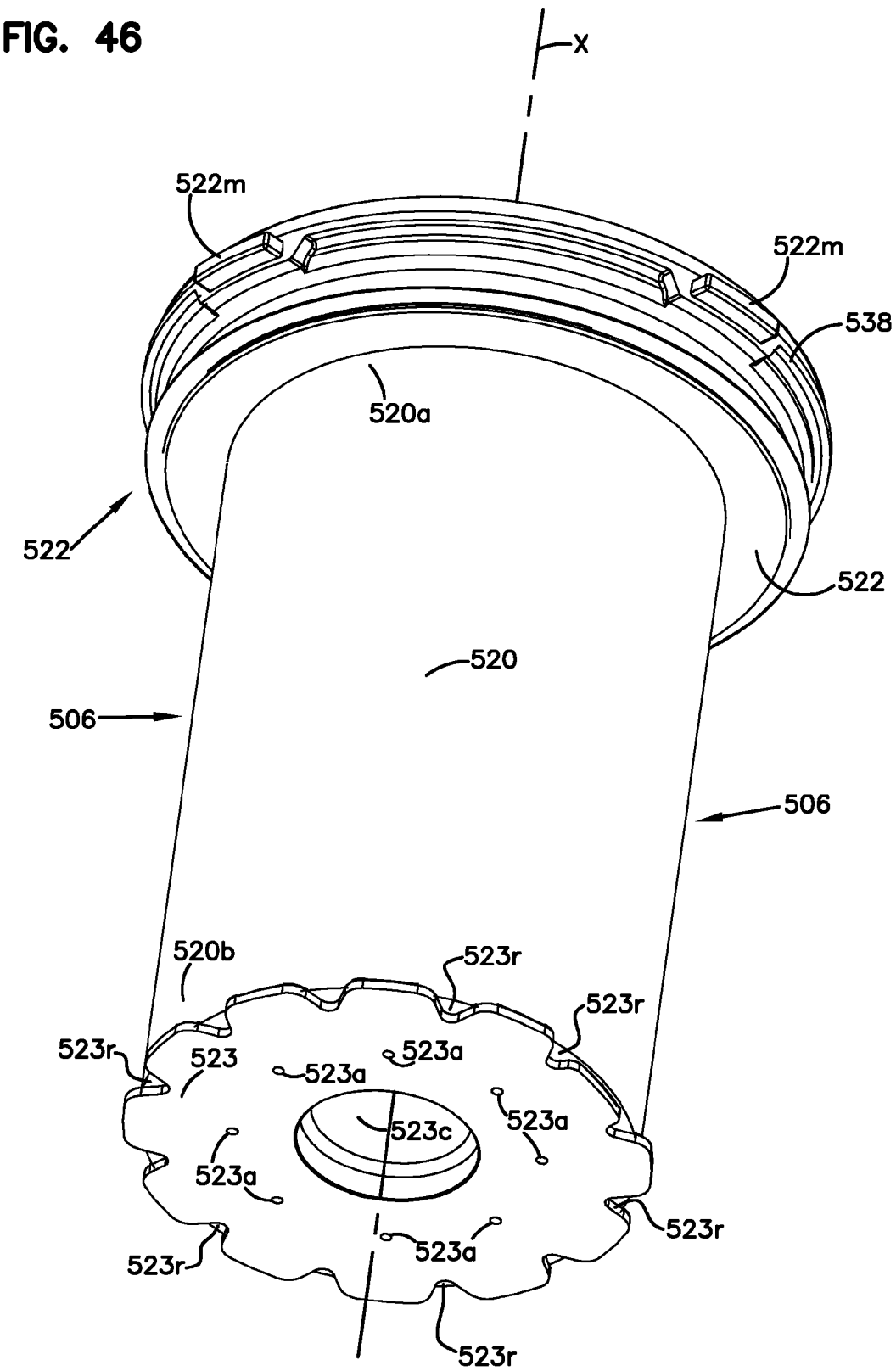
FIG. 46 is a schematic bottom end perspective view of the filter cartridge component of FIGS. 33-45.
Figure 47:
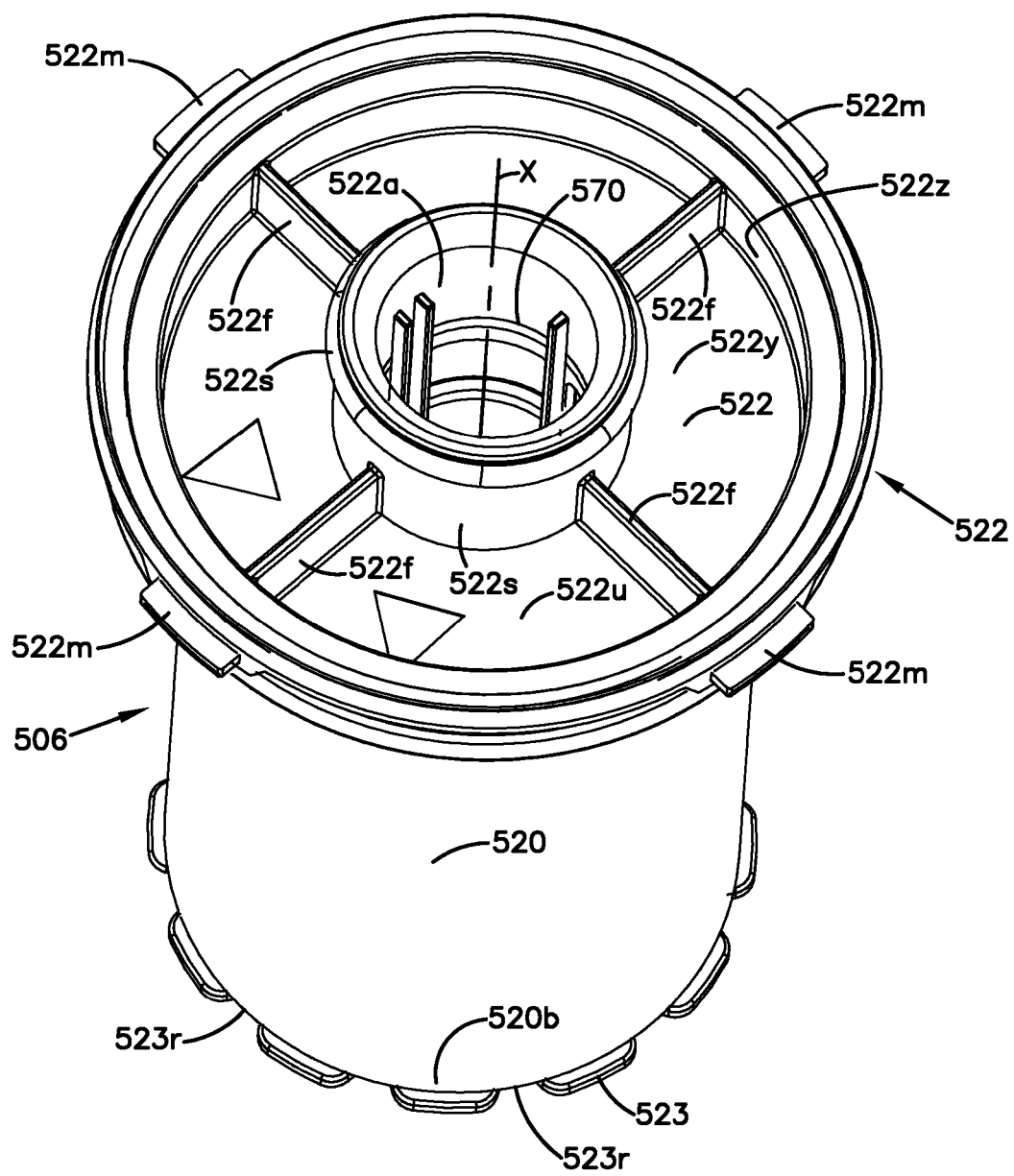
FIG. 47 is a schematic top end perspective view of the filter cartridge component of FIGS. 43-45.

In FIG. 46, a bottom isometric or perspective view of the cartridge 506 is provided, and in FIG. 47 a top isometric or perspective view of the cartridge 506 is provided.

Figure 48:
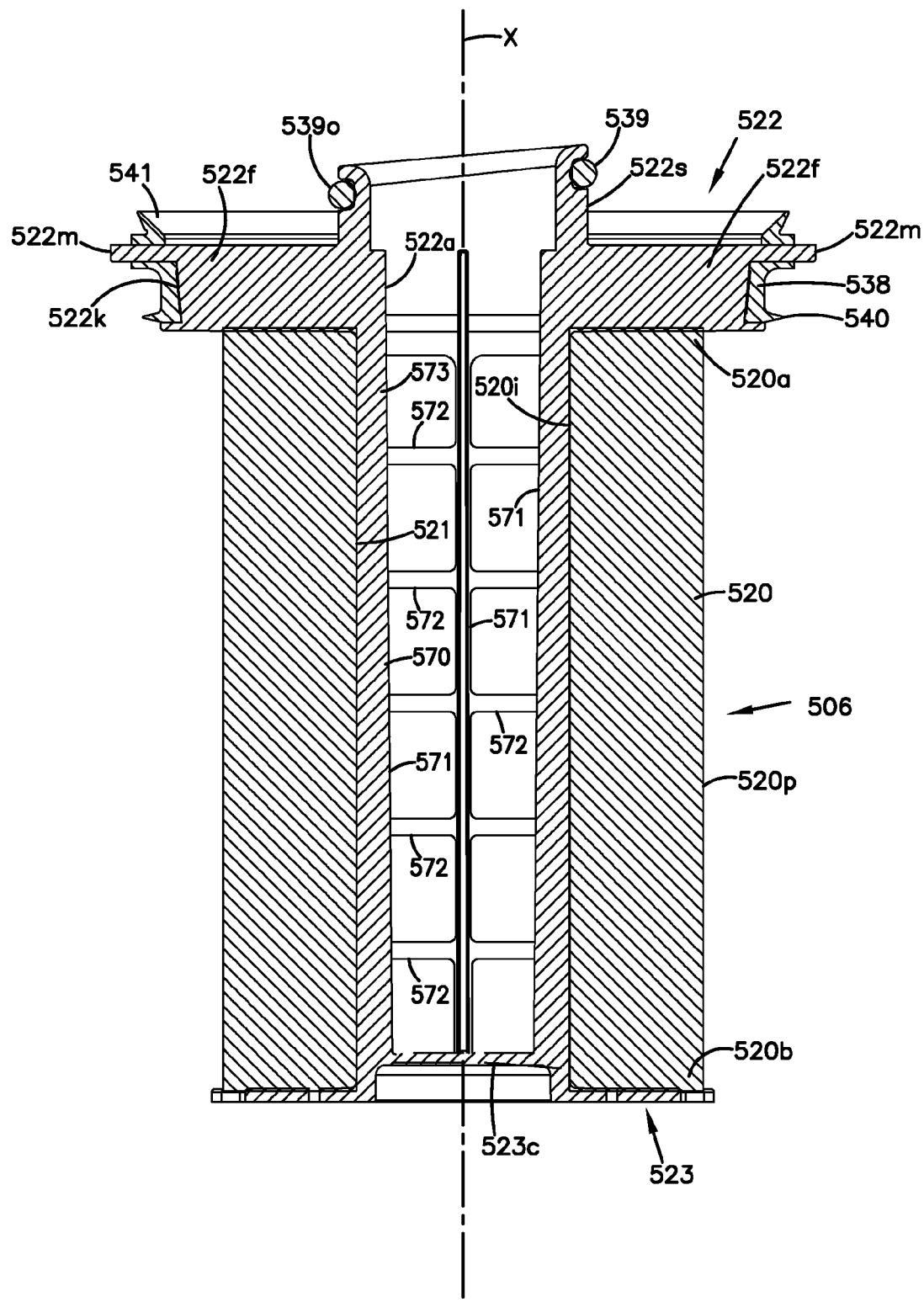
FIG. 48 is a schematic cross-sectional view of the filter cartridge of FIGS. 43-47; the view of FIG. 48 being taken generally along line 48-48, FIG. 45.

In FIG. 48, a schematic cross-sectional view taken generally along line 48-48, FIG. 43 is shown. Referring to FIG. 48, the cartridge 506, again, comprises an extension of media 520 (having opposite ends 520a, 520b) oriented surrounding an open filter interior 521 and axis X. In the example cartridge 506 depicted, one end 520a is oriented adjacent to, and overlapped by, first end piece 522. In the example depicted, the second end 520b is also engaged by an end piece, in this instance, second end piece 523. Thus, for the example arrangement 506 depicted, the media 520 is positioned in extension between end pieces 522, 523.

In general, and still referring to FIG. 48, in a typical cartridge 506, the media 520 is positioned surrounding a central cartridge support 570. In the example depicted, the central cartridge support 570 comprises a plurality of longitudinal extensions or ribs 571 interconnected by cross ribs or radial ribs 572, defining an open porous structure through which gas flow can occur during use.

Although alternatives are possible, typically the media 520 is a generally cylindrical construction, positioned around central axis X. The media 520 can be a coiled construction made from/with multiple windings or coils of media, around support 570, if desired. This will be typical. It is noted that typically the media 520 (before winding) will have a length (in the direction of extension between ends 520a, 520b) that is slightly greater than the distance between end pieces 522, 523. This will avoid gaps between the media 520 and the pieces 522, 523 when the media is installed, so typically an adhesive or potting between the media and the end pieces 522, 523 is not needed. Although not depicted, a rib arrangement or other interference feature can be placed on one or both of end pieces 522, 523 for interference engagement with the media 520 to facilitate avoidance of a leak path therebetween.

Still referring to FIG. 48, the example cartridge 506 depicted is shown with the central cartridge support 570 formed integral with the bottom end piece 523. This is typical, although alternatives are possible.

Also, the cartridge 506 depicted is shown with the upper end piece 522 formed integral with the cartridge support 570. This, too, is typical, although alternatives are possible.

Still referring to FIG. 48, when the end piece 520, central support 570 and end piece 523 are formed integral with one another, as shown, generally the resulting construction comprises a spool 573 around which the media 520 can be coiled, for convenient construction. Although alternatives are possible, this is a convenient system for use in many cartridge arrangements using principles according to the present disclosure.

Still referring to FIG. 48, the particular cartridge 506 depicted is shown with the bottom end piece 523 closed in extension across the open filter interior 521. That is, a central portion 523c of the cartridge 506 is closed, i.e. has no aperture therethrough, although alternatives are possible in some applications or principles described herein. Such a closed end piece 523 is typical for a cartridge 506 configured for "in-to-out" flow of gas during filtering, i.e. in which filtering normally occurs as the gases flow from an interior perimeter 520i of media 520 toward an outer perimeter 520p. It is noted that many of the features described herein can be applied in an assembly in which the cartridge is configured for flow in an opposite direction, i.e. from "out-to-in" during filtering.

Still referring to FIG. 48, attention is now directed to end piece 522. It is noted that for the particular cartridge 506 depicted, no seal member is positioned at a location surrounding any portion of the media 520, and no portion of the upper piece 522 projects downwardly to a location that surrounds the media 520. This is typical when the cartridge 506 is assembled using the preform or spool as described (comprising end piece 522, central support 570 and end piece 523 formed integral with one another) with coiling of the media 520 therearound, since such an arrangement facilitate the coiling. However, many of the principles described herein, can be applied in alternate arrangements, for example in which one or both of the end pieces 522, 523 and support 570 are formed separately from one or more of the others, and the portions are secured together during assembly, for example with a snap-fit, sonic weld, heat weld or adhesive.

In FIG. 48, first end piece 522 can be seen as being, in the example depicted, at a location "above" the media 520, in orientation for normal use. This is typical, again, when the cartridge 506 is assembled by using the preform or spool 573 as described, with a coiling of the media 520 therearound. Again, alternates are possible.

Referring to FIG. 47, cartridge 506 can be seen as having a perimeter ring 522z on the first end piece 522 that projects upwardly around an outer perimeter of the first end piece 522 and provides for recess region 522y above the media 520, FIG. 47. The perimeter projection 522z is typically a rigid structure configured, in part, to support one of the seals or seal members 540.

Still referring to FIG. 47, upper surface 522u of end piece 522 is generally surrounded by region 522z. Projecting upwardly from surface 522u, end piece 522 includes flow projection 522s. Seal member 539 is mounted on flow projection 522s. End piece 522 further includes optional support flanges 522f extending between perimeter portion 522z and projection 522s for strength. In FIG. 48, the cross-sectional view taken, is through two of the flanges 522f, so recess region 522y in end piece 522 is not viewable in that figure.

As indicated and referring to FIG. 48, the first end piece 522 includes a central aperture 522a therethrough, which is a gas flow aperture through a center of the end piece 522, typically centered on axis X. In the example assembly depicted, aperture 522a is a gas flow inlet aperture for the cartridge 506, since gas flow to be filtered passes into the cartridge interior 521 through aperture 522a. This is typical with "in-to-out" flow arrangements.

Still referring to FIG. 48, housing seal member 539 is mounted on a central projection 522s and in the example depicted, comprises an o-ring 539o. Although an o-ring is typical, alternatives such as molded-in-place seals are possible.

Seal member 540 comprises a portion of seal arrangement 538, which will typically be premolded and fit on end piece 522, with a portion recessed in peripheral recess 522k. The member 538 depicted, includes two seal members thereon: a radially outwardly projecting ring or rib comprising seal member 540 discussed previously; and, upper and outwardly directed seal flange 541. Seal flange 541 can be viewed as a seal flange configured to project at least in part in a direction away from the media 520 in an axial manner, i.e. at least in part in the direction of longitudinal axis X. The particular flange 541 depicted also extends radially outwardly away from central axis X, as it extends away from media 520 and end piece 522. The flange 541 can be viewed as an axial seal flange, since will generally engage the relevant housing portion with seal forces directed generally axially.

Referring to the cross-sectional view of FIGS. 39 and 40, the example seal ring 540 depicted defines a radially outwardly directed seal against an upper portion of an inside surface of housing base 514. Seal flange 541 is configured to engage, in the example, axially as a lip seal, peripheral flange 550p on center portion 550 of access cover 515. Seal 541 will inhibit gas flow into or out of assembly 501 between the cover assembly 515 and the base 514 during use. Seal 541 is advantageous, but is not required in all applications of the techniques described herein to obtain at least some advantage.

Figure 51:
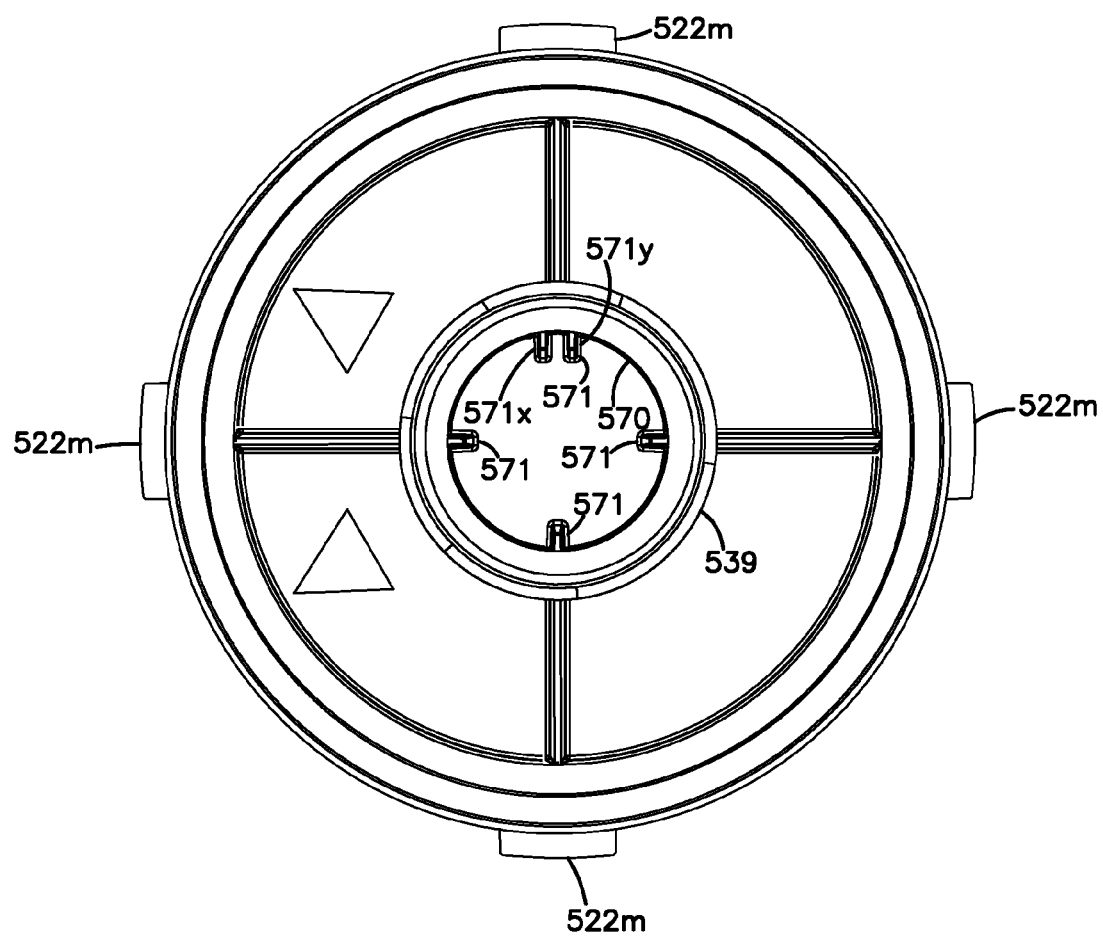
FIG. 51 is a top plan view of the filter cartridge component of FIGS. 43-49.
Figure 52:
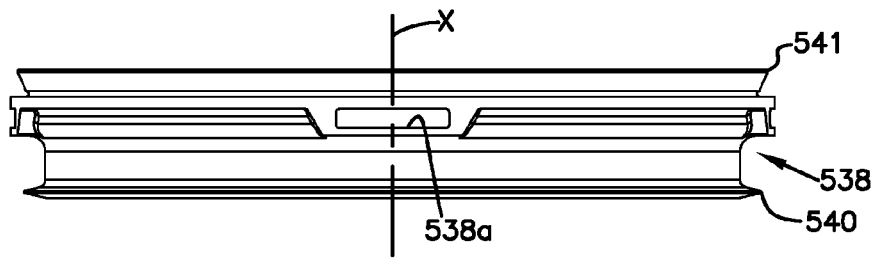
FIG. 52 is a schematic side elevational view of the seal member usable in the filter cartridge of FIGS. 43-51.
Figure 53:
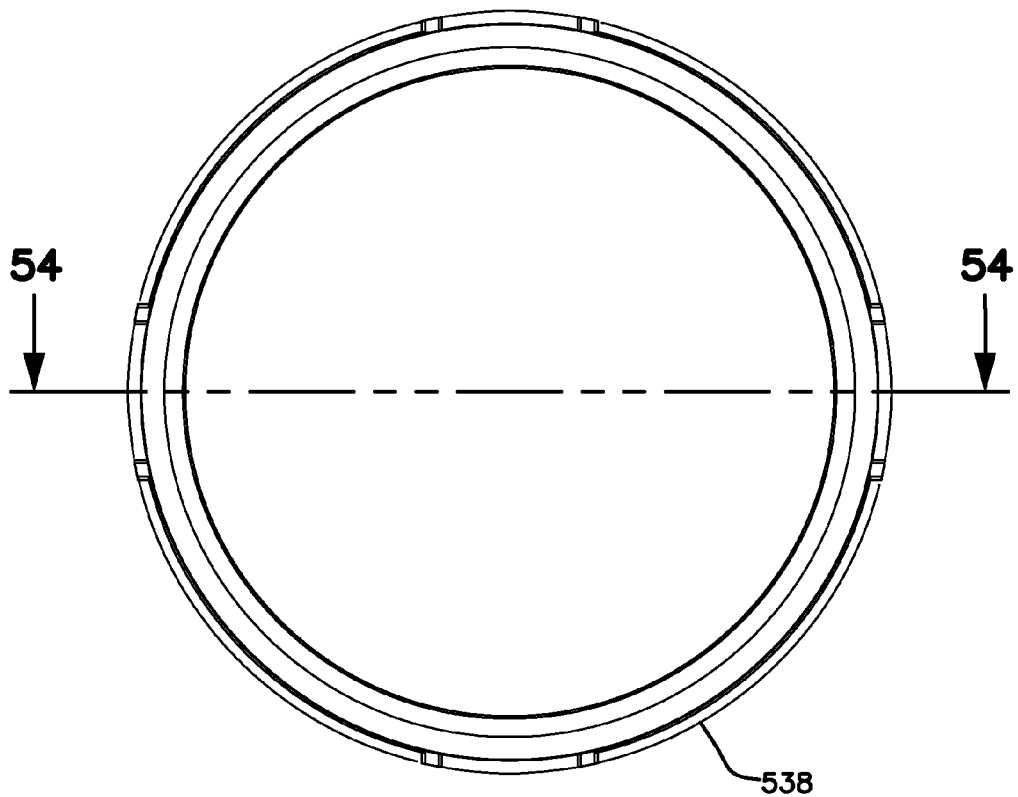
FIG. 53 is a schematic top plan view of a seal member of FIG. 51.
Figure 54:
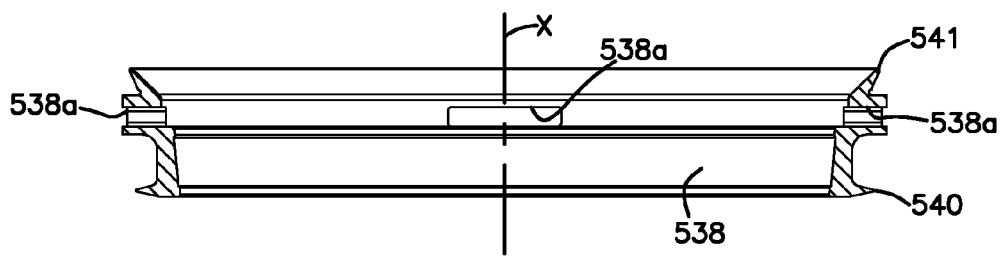
FIG. 54 is a schematic cross-sectional view of the seal member of FIGS. 52-53.

Seal ring 538 can be premolded from a rubber or rubber-like material such as AEM (ethylene acrylic like rubber, sometimes called AECM) and then be stretched to fit over the end piece 522. In FIGS. 52-54, seal ring 538 is shown separated from a remainder of the cartridge 506. In FIG. 51 a side elevational view is shown. In FIG. 52 a plan view is shown. In FIG. 53 a cross-sectional view taken along line 53-53, FIG. 52 is shown.

It is noted that the example seal ring 538 depicted has a plurality of apertures 538a therein (in the example depicted four). These apertures 538a are mounting apertures sized, located and spaced to allow portions of the end piece 522 to project therethrough when the seal ring 538 is mounted on a remainder of the cartridge 506. In FIG. 48 two of such projections 522m on the end piece 522 are shown projecting through two of these apertures 538a.

From the perspective views of FIGS. 46 and 47, it will be understood that the end piece 522 includes a plurality of projections 522m directed radially outwardly therefrom. It will also be understood that the seal ring 538 is configured to allow the projections 522m to extend therethrough, in radially outward projection. From a review of FIG. 41, it will be understood that projections 522m will nest into receivers 560 in an upper portion of the housing base 514.

It will also be understood, from a review of FIGS. 39 and 40, that if cartridge 506 is not present, the projections 522m will not cause the access cover 515 to be spaced sufficiently far from the housing base 514, for a tight interlock to occur when ring 551 is rotated. In this manner, the assembly 501 operates analogously to the assembly 1, FIGS. 1-27.

In more general terms, and analogously to the arrangement of FIGS. 1-27, the assembly of FIGS. 37-56 includes a housing base/access cover (or access cover/housing base) spacer (or vertical spacer) arrangement on the cartridge 506. The example housing base/access cover spacer arrangement, comprises a portion of the cartridge 506 (in the example depicted comprising portions of spacers or projections 522m and without seal material thereon) that becomes positioned between portions of the housing base 514 and access cover 515, when the cartridge 506 is properly installed. The spacing caused by the spacer arrangement ensures that the mounting ring 551 is not loose when rotated, i.e. it will properly tighten. If the spacer arrangement is not present, for example due to absence of the cartridge 506 from the assembly 501, the mounting ring 541 will be loose, i.e. will not tightly engage housing base 514.

In the example depicted, the housing base/access cover spacer arrangement comprises a projection arrangement (i.e. projection 522m) oriented to project radially outwardly from a location positioned, in a direction of extension of the central axis X, between the first housing seal member 539 and the second housing seal member 540. Also, the projection arrangement, of the spacer arrangement, in the example depicted comprising the members 522m, projects to a location radially outwardly from a maximum radial outward extent of projection or extension, from the central axis X the second housing seal member 540; and, in the example depicted, the maximum radial outward extension, from the central axis X of the first housing seal member 539.

Attention is now directed to FIG. 51, a top plan view of the cartridge 506. Here, projections 522m can be seen extending radially outwardly from a perimeter of end piece 522. Also ribs 571 within support 570 can be seen. It is noted that ribs 571x and 571y are positioned adjacent one another, and create a rotational indexing with a portion of the access cover 515 in use. In connection with this, attention is directed to the depiction of FIG. 55, which shows an underside isometric view of the end cover or end cover assembly 515. Central projection 565 can be seen as having a plurality of slots or receivers 566 therein. Projection 565 is sufficiently long so that it cannot fully lower into central aperture 522a, FIG. 51, unless the rotational alignment between the access cover 515 and the cartridge 500 is such that the pair of ribs 571x, 571y engages the wider slot 566x. This means that once the cartridge 506 is placed in the housing 514, the access cover 515 can only be properly positioned when projection 565 is in a selected rotational orientation relative to the cartridge 506; the same being true for a remainder of central section 550.

In general terms, the assembly 501 includes an access cover/filter cartridge (or filter cartridge/access cover) rotational indexing or alignment arrangement. That rotational indexing (or alignment) arrangement is an arrangement that provides that the access cover 515 can only be installed when selected rotational alignment with respect to the cartridge 506 is accomplished. For the example assembly 501 depicted, this rotational alignment arrangement allows for only one selected rotational orientation between the access cover 515 and the cartridge 506 during proper assembly. This single selected rotational arrangement, is when the pair of adjacent ribs 571x, 571y is received within the wider slot 566x. However in more general terms, it can be viewed as a projection/receiver arrangement for interaction between the cartridge 506 and access cover 515 that is indexed only to properly engage in selected orientation; in the example depicted, only one radial alignment, although alternatives are possible.

Referring again to FIGS. 43-45, for the particular assembly 501 depicted, and in particular the cartridge 506, the first seal member 539 is not orthogonal to the central axis X. Indeed, for the example depicted the seal member 539 defines a seal plane, that plane not extending orthogonally to the central axis X. In a typically arrangement, the seal 539 defines a seal plane extending at acute angle Z (FIG. 44) with a plane that is orthogonal to the central axis X, of at least 1°; usually not more than 30°; often within the range of 2°-20°; inclusive.

Now referring to FIG. 39, seal or seal member 539 is configured in the example depicted, to form an radial seal against seal flange 580 on central member 550 of access cover 515. As indicated the particular seal member 539 is an o-ring, and is configured to form an outwardly directed seal, although alternatives are possible.

Figure 55:
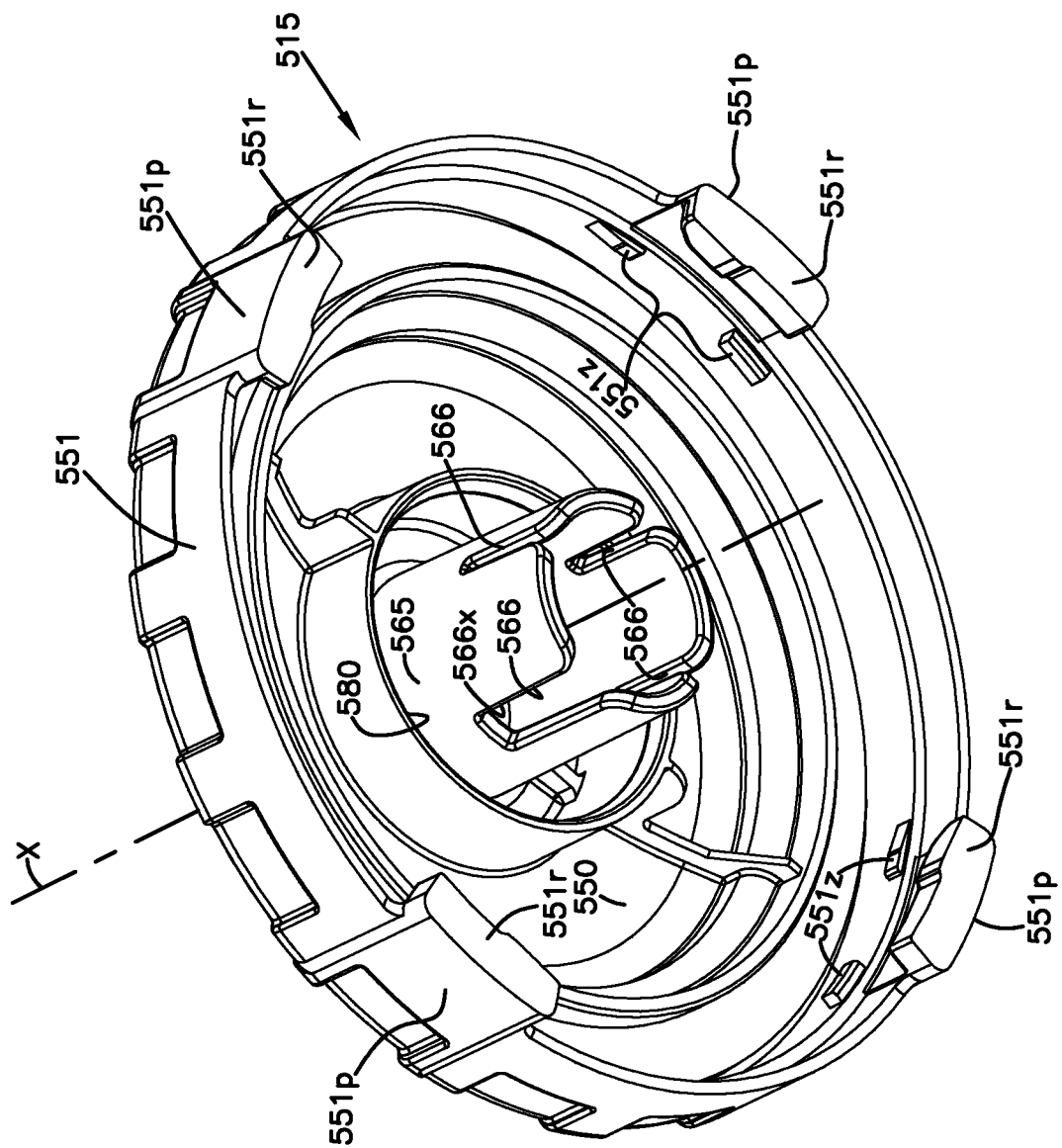
FIG. 55 is a schematic bottom view of an access cover component or assembly of the filter assembly of FIGS. 37-42.

The seal flange 580 is depicted in FIG. 55. The interior surface of the flange 580, which forms the seal surface with first seal member 539 of the cartridge 506, can be configured to only properly engage the seal member 539 in a single rotational orientation, since the assembly includes the above described rotational alignment arrangement between the access cover 515 and the filter cartridge 506.

Still referring to FIG. 55, features previously described include the central portion 550 and peripheral mounting ring 551 fit together to form assembly 515; locking projections 551p with radial inner projections 551r thereon. The projections 551r can be seen as having a detent or similar configuration to facilitate locking interaction with projections 514s, FIG. 41. Also, projections 551z, FIG. 55 can be used to facilitate interaction that will not readily separate, upon engagement with features in the housing base.

Figure 49:
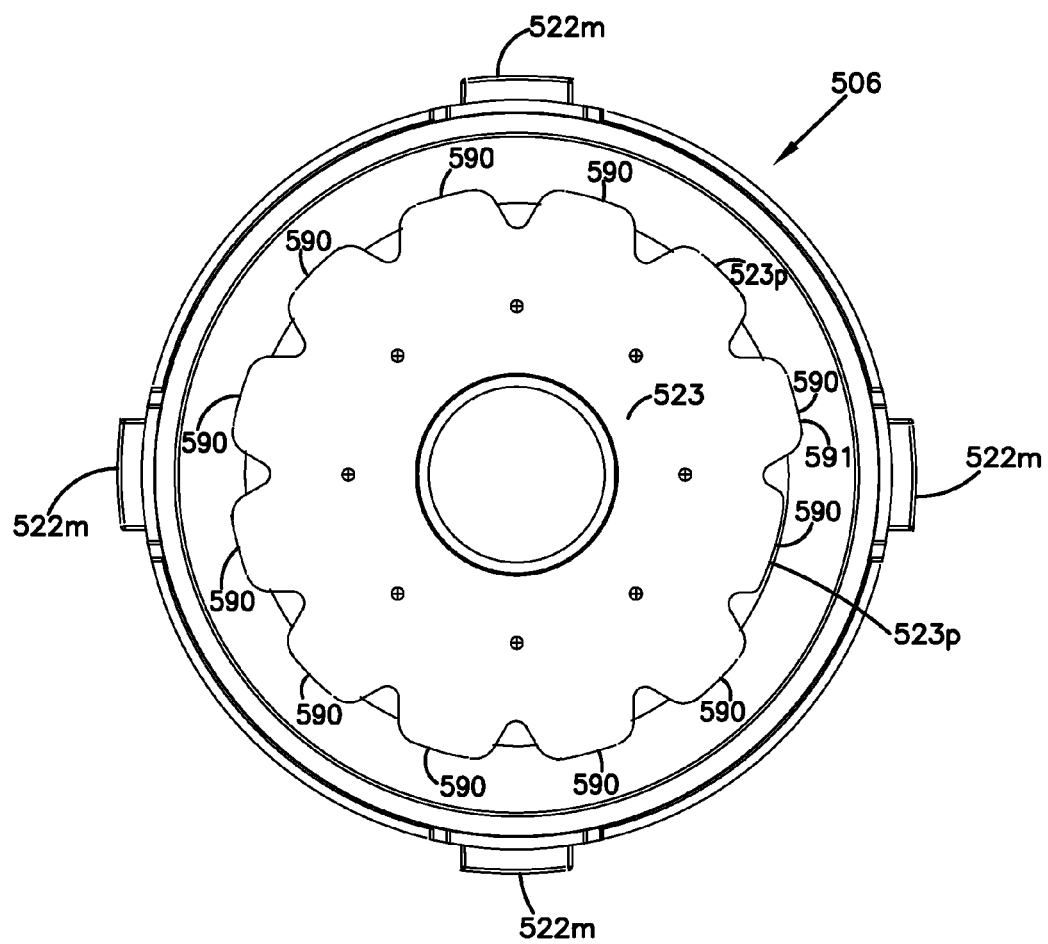
FIG. 49 is a schematic bottom plan view of the filter cartridge component of FIGS. 43-48.

Attention is now directed to FIG. 49, a bottom plan view of cartridge 506. The depicted lower end piece 523 has an outer perimeter 523p defined by spaced projections 590. It is noted that one of the projections 591 is shorter in radial outward extension, than a majority of (and in the example all of) the others. This helps provide for a preferred radial alignment or indexing between the cartridge 506 and the housing base 514 that can be understood in part by reference to FIG. 56.

Figure 56:
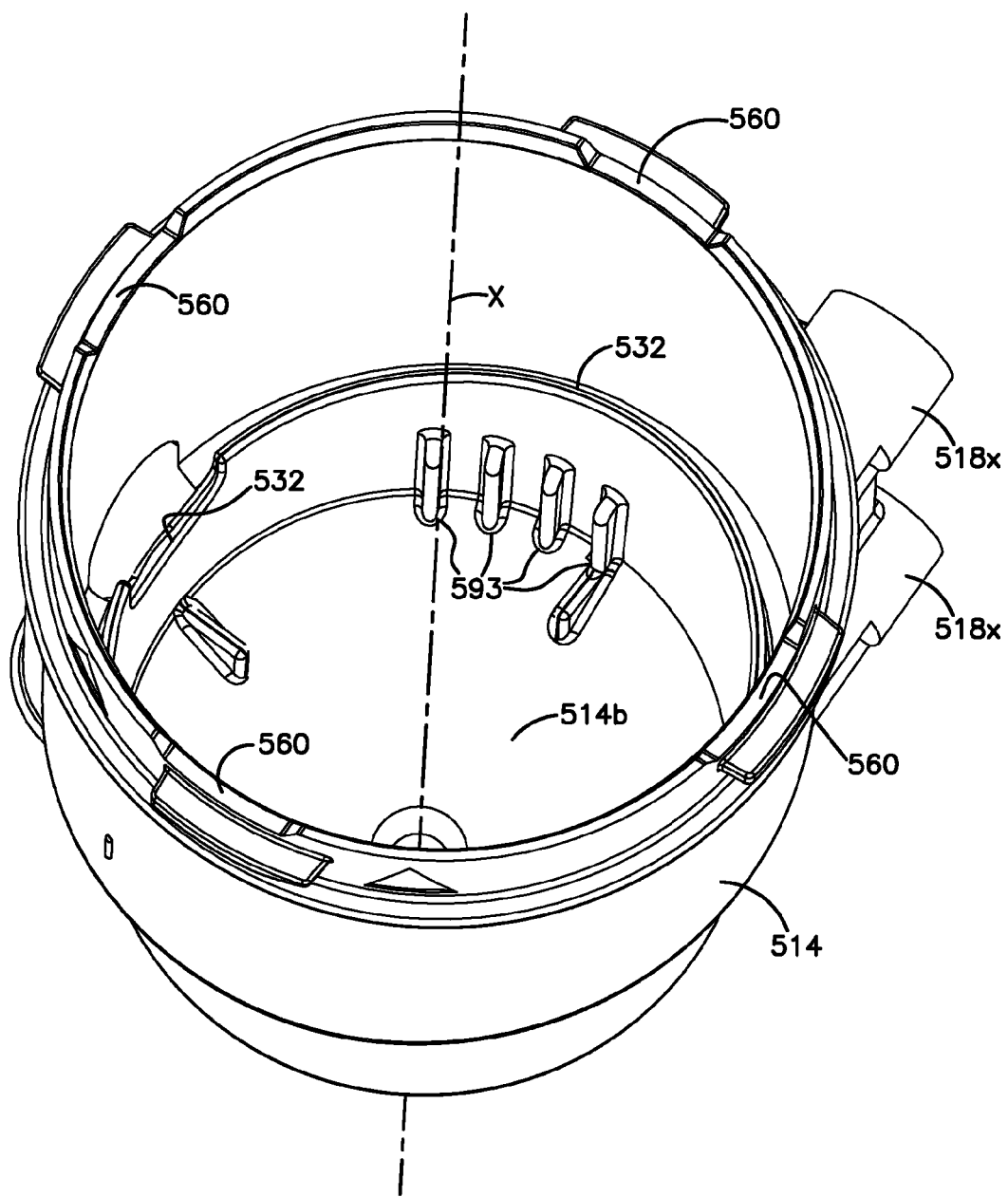
FIG. 56 is a schematic top perspective view of a housing base component of the assembly of FIGS. 37-42.

Referring to FIG. 56, the housing base 514 includes internal flange ring or wall 532 surrounding bottom 514b and projecting upwardly therefrom. Ribs 593 are provided along an interior of wall 532. Generally, any of the projections 590, FIG. 49 would interfere with ribs 593, preventing full lowering of the cartridge 506 into base 514, except for a radially shorter one 591. Thus, unless the cartridge 506 is rotated for a shorter projection 591 to align with ribs 593, the cartridge 506 cannot be fully lowered into the housing base 514. This means, for the example depicted, that the cartridge 506 can only be installed in the housing base 514 in a single selected rotational orientation. Of course, more than one projection could be made a short projection, to allow for an alternate number of rotational alignments.

In general terms, then, the assembly of FIG. 37-56 includes a housing base/filter cartridge (or filter cartridge/housing base) rotational alignment (indexing) arrangement. The rotational alignment (indexing) arrangement is configured so that the cartridge 506 can only be fully lowered into the housing base when selected define rotational orientation(s). This rotational alignment arrangement is provided in general by second end piece 523 having an outer perimeter which is non-circular and which has a size and shape that can only be inserted in the housing base 514 fully, in selected rotational orientations(s). In the example depicted, the outer perimeter of the lower end piece 523 is configured so that only one orientation is provided. Thus, the cartridge 506 can only be fully lowered if avoidance of interference with ribs 593 is provided, in the example depicted by shorter projection 591.

In the example depicted, rotational alignment between the access cover and housing base is provided by two general features. The first is the perimeter interference described in the previous paragraph. The second is that projections 522m can only engage recesses 560, FIG. 41, to complete lowering of the cartridge, if the cartridge 500 is properly rotationally aligned (in this instance in one of four rotational orientations). The particular housing base/filter cartridge rotational alignment arrangement depicted, then, only allows for a single rotational orientation upon full installation of the cartridge 506 into the housing base 514. Of course, in alternate applications, with many of the techniques described herein, the rotational alignment arrangement can be configured to allow for more than one rotational alignment.

In general characterizations, then, the rotational alignment arrangement between the housing base and the filter cartridge is a projection/receiver arrangement that only properly engages to allow full installation of the cartridge 506, when one or more proper, selected, rotational orientations between the two is achieved.

Figure 50:
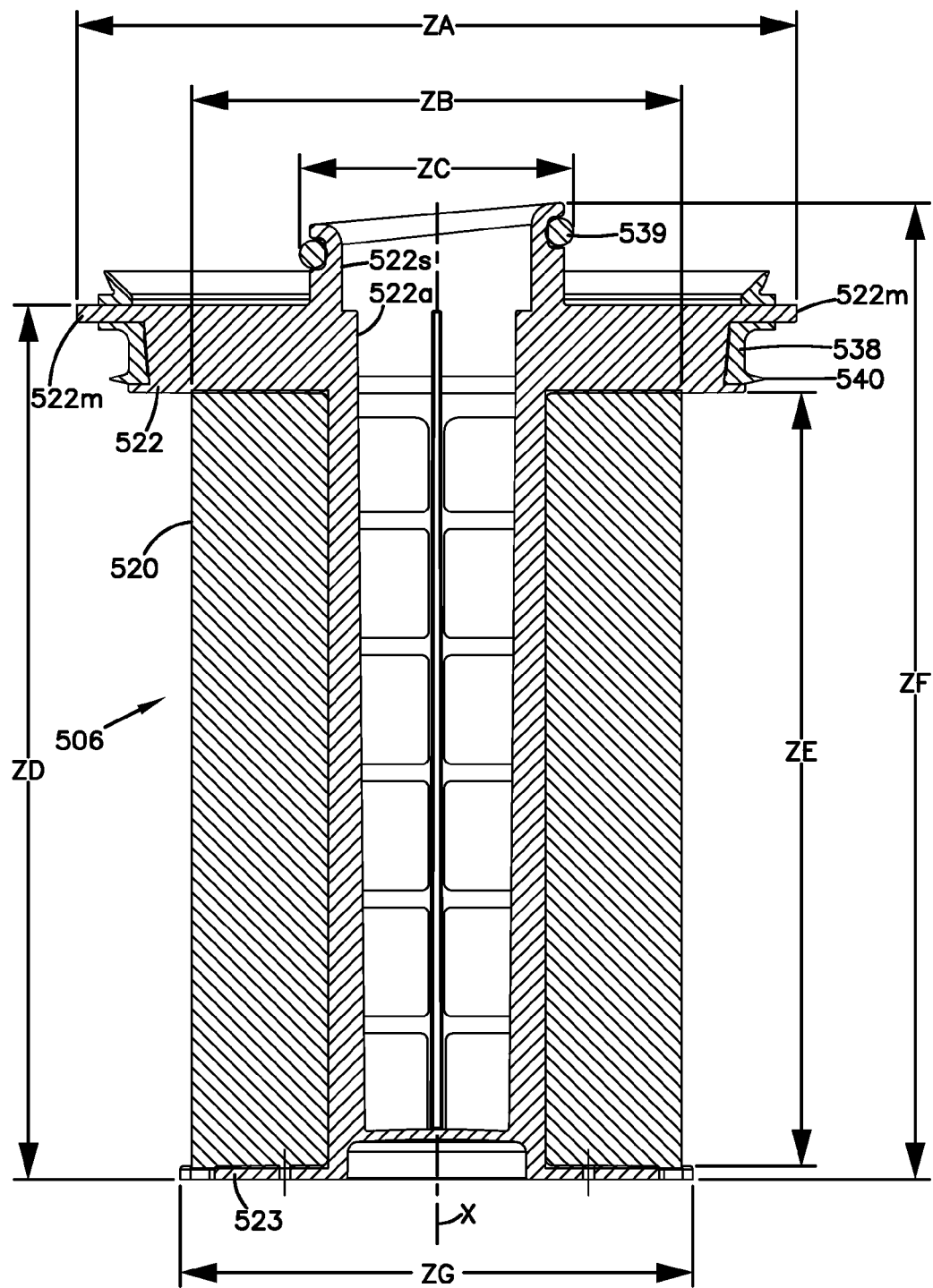
FIG. 50 is a schematic cross-sectional view analogous to FIG. 48, depicting example dimensions.

Attention is now directed to FIG. 50, a cross-sectional view of cartridge 506 generally analogous to FIG. 48. In 50, example dimensions of an example assembly are depicted for a general understanding of the principles. Of course, the principles can be applied in a variety of alternate assemblies, of different sizes. In FIG. 50, the example indicated dimensions are as follows: ZA=104.3 mm; ZB=71 mm; ZC=39.6 mm; ZD=126.8 mm; ZE=112.2 mm; ZF=141.6 mm; and, ZG=74.2 mm.

It is noted that in the example depicted herein, the seal member 539, seal member 540 and the seal member 541 each generally define a circular pattern. Alternatives for one or more of these seals are possible. For example, one or more of these seals could generally form an elliptical pattern. It might be particularly convenient for seal 540, which engages the housing base in a radial manner, to form a non-circular seal, if the housing portion at that location is not circular.

It is also noted that should seal members 539, 540 and 541 can be configured to be "planar", i.e. to define a plane of extension. While this is typical, it is not specifically required in all applications of the principles described herein.

IX. General Principles

According to the present disclosure, crankcase ventilation filter systems; components; features; and, methods of assembly and use are provided. There is no specific requirement that all of the features described in an example be incorporated in a given system for that system to obtain some advantage according to the present disclosure. Embodiments can be developed in which only selected ones of the advantages are achieved, without achieving all of the possibilities described herein.

The present disclosure can be used as providing a number of advantageous features and characteristics, for crankcase ventilation filter assemblies. Two of the feature types depicted that can be selectively applied to provide for particular advantage, include: a housing base/access cover spacer arrangement provided on the filter cartridge; and, an advantageous housing seal arrangement provided on a filter cartridge. These features can be implemented together, to provide advantage. However, there is no specific requirement that both features be implemented in the same cartridge, to obtain some advantage. In general terms, when both features (spacer arrangement and seal arrangement) are applied in the same cartridge, a particularly advantageous crankcase ventilation filter cartridge for installation in housing, in use, can be provided.

The crankcase ventilation filter cartridge generally comprises an extension of filter media surrounding and defining an open filter interior, and central (longitudinal) axis the media extending between defining first and second ends. The filter media can be cylindrical, but alternate shapes are possible. The media can be coiled, but alternate configurations are possible.

The cartridge includes a first end piece adjacent a first end of the media. Typically, the first end piece is positioned with the first end of the media abutting the first end piece, with the first end piece extending completely across the first end of the media.

The cartridge may include a second end piece at an opposite end of the media from the first end piece. The second end piece may be configured with portions extending completely across the second end of the media, but alternatives are possible to provide for preferred drainage downwardly from the media in use.

When the preferred housing seal arrangement depicted is used, the first housing seal arrangement includes a first housing seal member, typically positioned at on opposite side of the first end piece from the first end of the filter media. The first housing seal member can be characterized as having a largest first seal perimeter cross-dimension of D1. This perimeter cross-sectional dimension can be a diameter, or it can be a largest cross-dimension of the seal member, for example, projected into a plane orthogonal to the central axis X. Typically, it will be a largest cross-sectional dimension of a projection on the seal member into a plane orthogonal to the central axis X, if the seal member itself is not in a plane orthogonal to the central axis X.

A second housing seal arrangement is provided which includes a second housing seal member. The second housing seal arrangement is positioned on a first end piece. The second housing seal member is generally positioned to have a largest second seal perimeter cross-dimension of D2. D1 is less than D2, in some example applications.

Typically, the second housing seal member is spaced in a direction of extension of the central axis (i.e. spaced axially or vertically in use) from first seal member. Typically, the first seal member is spaced (axially or vertically) further from the media than the second seal member.

The filter cartridge can include both the advantageous seal arrangement and an advantageous housing base/access cover spacer arrangement. Typically, the housing base/access cover spacer arrangement comprises a projection arrangement oriented to project radially outwardly from a location positioned, in a direction of extension of a central axis, between the first housing seal member and the second housing seal member. The typical projection arrangement, of the spacer arrangement, projects to a location radially outwardly from a maximum radial outward extension, away from the central axis X, the second housing seal member. Typically, the housing base/access cover vertical spacer arrangement is also oriented to project radially outwardly from the axis X further than any portion of the first housing seal member.

The projection arrangement, of the base/access cover spacer arrangement, can comprise one or more spaced projections and typically comprises a plurality of spaced projections. Typical examples involve 3-6, inclusive, spacer projections, although alternatives are possible. The particular cartridge depicted in the embodiments of FIGS. 1-7 and FIGS. 37-56 each have four such projections.

Typically, the housing base/access cover spacer arrangement, on the filter cartridge defines a vertical spacer dimension of at least 0.5 mm, typically at least 1 mm, usually at least 2 mm and often more. The amount of vertical spacing provided is generally merely required to be enough to ensure that once the cartridge is installed, the access cover can be tightly secured to the housing base; and, such that if the cartridge is not installed, the access cover cannot be tightly secured to a housing base.

The housing base/access cover spacer arrangement can comprise a projection arrangement integral with the first end piece. Alternatives are possible.

In an example arrangement, depicted in connection with FIGS. 37-56, a third housing seal member is configured to form a releasable seal, with the housing in installation, at a location positioned in the direction of extension of the central axis between the first housing seal member and the second housing seal member. In an example depicted, the third housing seal member comprises an integral portion of a (second) housing seal arrangement, along with a second housing member.

In an example depicted, in FIG. 40, the third housing seal member is configured as a flexible flange directed at least partially axially away from the media, to be pressed upwardly in axial overlap against a seal portion (in the example a flange portion) of an access cover in use. In an example depicted, flexible flanges are also configured to extend radially away from the cartridge central axis X, in an oblique manner.

In selected examples arrangement depicted, the second housing seal member is configured to form a radially outwardly directed seal with a surrounding portion of a housing base, in use. In the example of FIGS. 1-27 the second housing seal member is an o-ring. In the example of FIGS. 37-56 the second housing seal member is a lip seal flange 540.

In the example assembly of FIGS. 1-27 and FIGS. 37-56, the first and second vertically spaced housing seal members are separate form one another and do not comprise integral portions of a continuous molded construction. Alternatives are possible.

Typically, the first and second vertically spaced seal members are vertically spaced by at least 0.5 mm, often at least 1 mm, typically at least 2 mm and not more than 50 mm, for example by at least 5 mm and not more than 40 mm, and often by at least 8 mm and not more than 30 mm. In typical examples, this spacing is by an amount within the range of 8-30 mm, inclusive.

In example arrangements such as those depicted in FIGS. 1-27 and FIGS. 37-56, the second housing seal member is defined in (or defines) a seal plane orthogonal to the cartridge central axis. Further, in the example of FIGS. 1-27 and 37-56, the first housing seal member is defined non-orthogonal to the central cartridge axis. In these examples, the first housing seal member defines a planar seal, in a seal plane non-orthogonal to this cartridge central axis. When the first housing seal is defined in a seal plane, but that plane is not non-orthogonal to the central cartridge axis, the plane is typically oriented at an acute angle within the range of 1°-30°, inclusive, relative to a plane orthogonal to the cartridge central axis, typically an acute angle within the range of 2°-20°, inclusive.

In certain example arrangements depicted D2 is at least 10 mm greater than D1, typically at least 20 mm greater than D1. In more general terms, D2 is often at least 0.5 mm larger than D1, typically at least 1 mm larger, and usually not more than 50 mm larger. Typically, the first housing seal member has a smaller outer perimeter than a largest cross-sectional dimension of the media, although alternatives are possible. In examples depicted, the second housing seal has a larger outer perimeter than a largest cross-sectional dimension of the media, although alternatives are possible.

According to an aspect of the present disclosure, a crankcase ventilation filter cartridge is provided that includes first and second end pieces, and an extension of media positioned between first and second end pieces. In examples depicted, the extension of filter media surrounds and defines an open interior. A housing seal arrangement is positioned on the first end piece. The housing seal arrangement includes first and second vertically (axially) spaced housing seals or seal members. The first end piece is typically an open end piece having a central gas flow aperture therethrough, in communication with the open filter interior.

The first and second vertically (axially) spaced housing seals or seal members can be portions of a single, integrally, molded seal material, or they can comprise separately mounted or molded members. In a typical example assembly, they are separate and each comprises an o-ring, however alternatives are possible. Unless it is specifically stated that the first and second housing seals or seal members are separate from one another, or each comprises an o-ring, or similar language is used, it is not meant to be indicated of whether they are members of a single molded member and are integral with one another, or are separate molded members.

Although alternatives are possible, in typical arrangements depicted the second end has no central aperture therethrough in direct communication with the open filter interior, i.e. it is closed with respect to its center. The second end piece can have, to advantage, a media axial overlap drain arrangement therethrough.

A variety of example arrangements with vertically spaced seal members on the first end piece are described. In some, the vertically spaced seals or seal members are radial seals or seal members. In one, the vertically spaced seals or seal members are axial seals or seal members. A variety of radial seals are described. Examples depicted show radial seals that are radially outwardly directed seal members, although alternatives are indicated as possible. In certain examples arrangements depicted, the radial seals are formed from o-rings, although alternatives are also characterized.

The radial seals can each be planar, and can be positioned in seal plane orthogonal to a central cartridge axis. Alternatives are described including at least one in which one of the seals is non-orthogonal to the cartridge central axis.

A variety of particular seal arrangements and seal relationships are shown and described, and a variety of vertical spacing is characterized and described.

Also, in accord with the present disclosure, filter cartridges are shown and described which include a housing base/access cover spacer arrangement thereon. Such cartridges are typically configured for use in a housing which comprises a housing base and an access cover. In typical applications, the access cover is secured to the housing base with a rotational interlock, although alternatives are possible in some instances. The various rotational interlock arrangements described include non-threaded interlock arrangements and threaded interlock arrangements.

The housing base/access cover spacer arrangement on the cartridge ensures that if the cartridge is not positioned in the housing, the access cover will not tightly mount on the housing base, providing an indication that a proper cartridge is not installed. In general, the housing base/access cover spacer arrangement involves rigid structure that ensures the spacing is present, when the cartridge is installed. In some examples, the rigid structure comprises a projection arrangement that extends to a location outwardly from any seal in the cartridge and which projects to a location between housing components during installation. In an example described, however, the spacer arrangement comprises a rigid extension (positioned between two axial seals) that does not project to a location radially outwardly from the seals or seal members.

Typically, the vertical spacer arrangement provides a spacing dimension of at least 0.5 mm, usually at least 1 mm and often 2 mm (sometimes at least 3 mm) or more, for example 3-40 mm, inclusive. In general, the amount of required is an amount, which, if not present, ensures that the access cover cannot be tightly mounted or appeared to be tightly mounted on the housing. With a rotational interlock arrangement, it is generally an amount of spacing sufficient that the mounting ring (or access cover) is loose and cannot be tightened or if an attempt is made to tighten it, it will reach a loose position.

Also in accord with the present disclosure, crankcase ventilation filter assemblies are provided. The assemblies generally include a housing having a gas flow inlet arrangement, a gas flow outlet arrangement and a coalesced liquid drain outlet arrangement. An example housing is depicted which also includes an optional condensed water drain outlet arrangement, isolated from the coalesced liquid drain outlet arrangement. The housing generally includes a cartridge in according with characterizations herein, operably positioned in the housing. By the term "operably positioned" in this context, it is meant that the cartridge is positioned for appropriate use within the assembly. Typically the housing comprises a housing base with an access cover arrangement thereon. The access cover arrangement (or service cover) of some examples comprises a central rigid cover portion and a perimeter mounting ring. The perimeter mounting ring is generally rotatable relative to the central cover portion and provides for mounting in the cover assembly on the housing base. Mounting rings with threaded engagement interaction for a housing base are described as well as mounting rings that use a non-threaded rotational engagement arrangement.

In an example embodiment depicted herein, the entire access cover is rotatable relative to the housing base, through a rotational interlock. Similarly, however, if the cartridge is not properly placed, the access cover will become loose as it is rotated.

A variety of housing features are characterized, to accommodate preferred cartridge features.

It is noted that structural variations from the specific example arrangements described are possible, in accord with many of the principles of the present disclosure. Further, there is no requirement that an assembly, housing, feature, component or method include all of the features characterized herein, in order to obtain some benefit in accord with the present disclosure.

What is claimed is:

1. A crankcase ventilation filter cartridge for removable installation in a housing, in use; the crankcase ventilation filter cartridge comprising:
    (a) an extension of filter media surrounding and defining an open filter interior and a central, longitudinal, axis;
        (i) the extension of filter media defining first and second ends;
    (b) a first; upper in use; end piece adjacent the first end of the filter media;
    (c) a first housing seal member positioned on the first end piece;
    (d) a second housing seal member positioned on the first end piece;
        (i) the second housing seal member being spaced, in a direction of extension of the central axis, from the first housing seal member; and (e) a third housing seal member configured to form a seal with a housing, in installation, at a location positioned, in a direction of extension of the central axis, between the first housing seal member and the second housing seal member:
        (i) the third housing sea member comprising an integral portion of a molded housing seal arrangement that includes the second housing seal member thereon:
    (f) a housing base/access cover spacer arrangement positioned on the filter cartridge and comprising a projection arrangement oriented to project radially outwardly from a location positioned, in a direction of extension of the central axis, between the first housing seal member and the second seal member;
        (i) the projection arrangement, of the housing base/access cover spacer arrangement, projecting to a location radially outwardly from a maximum radial outward extension at least one of the first housing seal member and second housing seal member; and,
        (ii) the projection arrangement comprising a tab on the first, upper in use, end piece projecting through an aperture in the molded housing seal arrangement.

2. A crankcase ventilation filter cartridge according to claim 1 wherein:
    (a) the projection arrangement, of the housing base/access cover spacer arrangement, projects to a location radially outwardly from a maximum radial outward extension of each one of the first housing seal member and the second housing seal member.

3. A crankcase ventilation filter cartridge according to claim 1 wherein:
    (a) the projection arrangement, of the housing base/access cover spacer arrangement, comprises plurality of spaced projections, each projecting through an associated aperture in the molded housing sea arrangement.

4. A crankcase ventilation filter cartridge according to claim 1 wherein:
    (a) the housing base/access cover spacer arrangement has a vertical spacer dimension of at least 0.5 mm.

5. A crankcase ventilation filter cartridge according to claim 1 wherein:
    (a) the housing base/access cover spacer arrangement comprises a projection arrangement integral with the first end piece.

6. A crankcase ventilation filter cartridge according to claim 1 wherein:
    (a) the projection arrangement of the spacer arrangement projects to a location radially outwardly from a maximum radial outward extension of the third housing seal member.

7. A crankcase ventilation filter cartridge according to claim 1 wherein:
    (a) the third housing seal member is configured as a flexible flange directed at least partially away from the media; to be pressed upwardly and axially against a portion of an access cover, in use.

8. A crankcase ventilation filter cartridge according to claim 1 wherein:
    (a) the first housing seal member has a largest first seal perimeter cross-dimension of $D_1$; and,
    (b) the second housing seal member has a largest second seal perimeter cross-dimension of $D_2$;
        wherein $D_1 < D_2$.

9. A crankcase ventilation filter cartridge according to claim 1 wherein:
   (a) the second housing seal member is configured to form a radially outwardly directed seal with a surrounding portion of a housing base, in use.

10. A crankcase ventilation filter cartridge according to claim 6 wherein:
    (a) the second housing seal member is defined in a seal plane orthogonal to the central axis.

11. A crankcase ventilation filter cartridge according to claim 6 wherein:
    (a) the first housing seal member is non-orthogonal to the cartridge central axis.

12. A crankcase ventilation filter cartridge according to claim 6 wherein:
    (a) the media has a first outer perimeter; and,
    (b) the first housing seal member has a smaller outer perimeter largest cross-dimension than the first outer perimeter of the media.

13. A crankcase ventilation filter cartridge according to claim 6 wherein:
    (a) the media has a first outer perimeter; and,
    (b) the second housing seal member has a larger outer perimeter largest cross-dimension than the media first outer perimeter.

14. A crankcase ventilation filter cartridge according to claim 6 including:
    (a) a second end piece adjacent the second end of the media;
        (i) the second end piece including a first member of a cartridge-to-housing base rotational alignment indexing arrangement thereon.

15. A crankcase ventilation filter cartridge according to claim 6 including:
    (a) a second end piece adjacent to the second end of the media having an outer perimeter including a plurality of spaced, radially outwardly projecting, projections.

16. A crankcase ventilation filter assembly according to claim 15 wherein:
    (a) one of the spaced, radially outwardly projecting, projections is shorter in radial outward projection, than at least a majority of the radially outwardly projecting projections.

17. A crankcase ventilation filter cartridge according to claim 6 wherein:
    (a) the first end piece includes a central tubular projection having a projection tip and extending through the first end cap; and,
        (i) the central tubular projection including an inner surface with a first member of a cartridge-to-housing cover projection/receiver arrangement thereon.

18. A crankcase ventilation filter cartridge according to claim 6 wherein:
    (a) the second seal member defines an elliptical, radially outwardly directed, seal.

19. A crankcase ventilation filter cartridge assembly according to claim 6 wherein:
    (a) the first end piece includes a central tubular projection extending in a direction away from the media to a projection tip;
        (i) the projection tip has an end surface defined in a plane non-orthogonal to a cartridge central axis.

* * * * *